US007003475B1

(12) United States Patent
Friedland et al.

(10) Patent No.: US 7,003,475 B1
(45) Date of Patent: Feb. 21, 2006

(54) COMPUTER IMPLEMENTED RESOURCE ALLOCATION MODEL AND PROCESS TO DYNAMICALLY AND OPTIMALLY SCHEDULE AN ARBITRARY NUMBER OF RESOURCES SUBJECT TO AN ARBITRARY NUMBER OF CONSTRAINTS IN THE MANAGED CARE, HEALTH CARE AND/OR PHARMACY INDUSTRY

(75) Inventors: Kenneth M. Friedland, Fort Lee, NJ (US); Karman Lai, Bayside, NY (US); Paul I. Wood, Montclair, NJ (US); Jen-Shyang Chen, Flushing, NY (US)

(73) Assignee: MedcoHealth Solutions, Inc., Franklin Lakes, NJ (US)

( * ) Notice: Subject to any disclaimer, the term of this patent is extended or adjusted under 35 U.S.C. 154(b) by 0 days.

(21) Appl. No.: 09/307,187

(22) Filed: May 7, 1999

(51) Int. Cl.
*G06F 17/60* (2006.01)

(52) U.S. Cl. ........................................................ 705/9

(58) Field of Classification Search ..................... 705/9
See application file for complete search history.

(56) References Cited

U.S. PATENT DOCUMENTS

| | | | | |
|---|---|---|---|---|
| 5,111,391 A * | 5/1992 | Fields et al. | .................... | 705/9 |
| 5,208,762 A * | 5/1993 | Charhut et al. | ............. | 700/216 |
| 5,619,695 A * | 4/1997 | Arbabi et al. | ............... | 709/100 |
| 5,890,134 A * | 3/1999 | Fox | .............................. | 705/9 |
| 5,943,652 A * | 8/1999 | Sisley et al. | .................... | 705/8 |
| 6,249,715 B1 * | 6/2001 | Yuri et al. | .................. | 700/111 |
| 6,256,967 B1 * | 7/2001 | Hebron et al. | ................ | 53/501 |
| 6,282,531 B1 * | 8/2001 | Haughton et al. | ............ | 706/50 |
| 6,289,340 B1 * | 9/2001 | Puram et al. | ................. | 705/11 |
| 6,321,205 B1 * | 11/2001 | Eder | .......................... | 705/40 |

FOREIGN PATENT DOCUMENTS

JP 2003-203121 A * 7/2003

OTHER PUBLICATIONS

Parks, Liz. "Patients and Pharmacists Benefit From Rx Automation." Drug Store News, vol. 21, No. 13, p. 128, Aug. 30, 1999.*

"Bergen Brunswig Corp—1995 Annual Report." Report No. 0178370, published Sep. 30, 1995.*

Casey, Richard George. Apr. 16, 1974. Abstract from UST921022.

Broadbent, Kent D. Sep. 23, 1975. Abstract from US3908080.

(Continued)

*Primary Examiner*—Susanna M. Diaz
(74) *Attorney, Agent, or Firm*—Irah H. Donner; Wilmer Cutler Pickering Hale and Dorr LLP

(57) ABSTRACT

A method of allocating resources includes scheduling jobs from among a plurality of resources of a work-producing system. The work producing system is a pharmacy. The method includes the steps of sorting, in a predetermined order, available resources to be utilized in the pharmacy by a last task assignment, a number of tasks performable, rate per task, and/or cost per hour, and determining one or more queues responsive to the sorting. The method also includes the step of normalizing the queue by dividing a current task queue by an average rate of the available resources for each task in the current task queue. The method also includes the step of assigning the available resources to one or more tasks with a predetermined normalized queue, subject to at least one task constraint.

76 Claims, 42 Drawing Sheets

OTHER PUBLICATIONS

Belady, Laszlo A. et al. Jun. 15, 1976. Abstract from US3964028.
Anbe, Yoshiharu. May 2, 1978. Abstract from US4087859.
Matsumura, Kazuhiro et al. Dec. 1, 1978. Abstract from JP53-137642.
Matsumura, Kazuhiro et al. Dec. 1, 1978. Abstract from JP53-137643.
Kohn, Leslie D. Dec. 28, 1982. Abstract from US4366536.
Horn, B. C. Apr. 27, 1983. Abstract from EP77685.
Mathieu, Michel et al. Aug. 9, 1983. Abstract from US4398290.
Hama, Yasuhiro. Aug. 20, 1984. Abstract from JP84-144981.
Akram, M. Aug. 30, 1984. Abstract from WO84/03406.
Azuma, Yoshiki. Apr. 3, 1985. Abstract from JP60-057464.
Fujishige, Nobuyuki et al. Oct. 8, 1985. Abstract from JP60-198671.
Fujishige, Nobuyuki et al. Oct. 17, 1985. Abstract from JP60-205666.
Fujishige, Nobuyuki. Nov. 6, 1985. Abstract from JP60-221867.
Wong, Sing Y. et al. Feb. 24, 1987. Abstract from US4646269.
Powell, R. A. Mar. 3, 1987. Abstract from US4648023.
Bayer, David A. et al. May 10, 1988. Abstract from US4744027.
Aradate, Hiroshi. Aug. 15, 1988. Abstract from JP63-196975.
Dec. 10, 1988. Abstract from RD-296067.
Beck, Roger P. et al. Jan. 9, 1990. Abstract from US4893270.
Karmarkar, Narendra K. et al. Apr. 3, 1990. Abstract from US4914563.
Cosand, A. E. Jun. 28, 1990. Abstract from WO90/07232.
Lark, Jay S. et al. Jul. 24, 1990. Abstract from US4943932.
Dinwiddie, J. M. et al. Nov. 22, 1990. Abstract from EP398697.
Shimoda, Hiroshi. Apr. 24, 1991. Abstract from JP03-99355.
Kurosawa, Yuichi et al. Apr. 30, 1991. Abstract from JP03-103978.
Kusakari, Kimiko. Mar. 18, 1992. Abstract from JP04-85659.
Dinwiddie, John M., Jr. et al. May 12, 1992. Abstract from US5113522.
Berger, R. J. et al. Jun. 10, 1992. EP489576.
Hornick, S. W. Jul. 23, 1992. Abstract from WO92/12492.
Wilke, William G. Sep. 1, 1992. Abstract from US5144254.
Takasugi, Kazuo et al. Nov. 10, 1992. Abstract from JP04-318675.
Matsunaga, T. et al. Dec. 16, 1992. Abstract from EP517953.
Matsunaga, Tomoko et al. Dec. 17, 1992. Abstract from JP04-365162.
Shinagawa, Toru. Apr. 6, 1993. Abstract from US5200600.
Dietrich, Brenda L. et al. Jun. 1, 1993. Abstract from US5216593.
Erickson, Daryl R. Jul. 20, 1993. Abstract from US5229584.
Austvold, Shawn M. et al. Aug. 10, 1993. Abstract from US5235673.
Chapman, William et al. Oct. 19, 1993. Abstract from US5255181.
Gupta, S. et al. Oct. 19, 1993. Abstract from US5255184.
Wilke, William G. Nov. 30, 1993. Abstract from US5267182.
Powell, R. A. Mar. 1, 1994. Abstract from US5291397.
Hartley, Richard I. et al. May 31, 1994. Abstract from US5317755.
Breslin, J. Jun. 14, 1994. Abstract from US5321610.
Georgiades, D. E. et al. Jun. 22, 1994. Abstract from EP602673.
Norden-Paul, R. et al. Jun. 28, 1994. Abstract from US5325478.
Bier, J. et al. Nov. 22, 1994. Abstract from US5367678.
Hara, Hirotaka et al. Dec. 22, 1994. Abstract from JP06-348685.
Chung, Jin-Chin et al. Apr. 4, 1995. Abstract from US5404469.
Deziel. Jr., L. B. et al. Apr. 11, 1995. Abstract from US5406476.
Bigus, J. P. Apr. 12, 1995. Abstract from EP647903.
Miller, H. R. Apr. 18, 1995. Abstract from US5408663.
Sato, Shinichi et al. May 2, 1995. Abstract from JP07-114602.
Ahamed, S. V. May 3, 1995. Abstract from EP651326.
Burks, J. L. et al. May 11, 1995. Abstract from WO95/128587.
Murakami, Yoshiki et al. Jun. 6, 1995. Abstract from JP07-146889.
Barkans, Anthony C. et al. Jun. 27, 1995. Abstract from US5428810.
Sep. 26, 1995. Abstract from JP07-248949.
Carmon, A. et al. Nov. 16, 1995. Abstract from WO95/30958.
Kobayashi, Y. et al. Nov. 28, 1995. Abstract from US5471408.
Kusakari, Kimiko. Dec. 8, 1995. Abstract from JP07-319848.
Guerra, L. et al. Mar. 26, 1996. Abstract from US5502645.
Cox, L. A. et al. Apr. 16, 1996. Abstract from US5508999.
Dey, S. et al. Apr. 30, 1996. Abstract from US5513118.
Cox, L. A. et al. May 7, 1996. Abstract from US5515367.
Barlow, C. et al. May 30, 1996. Abstract from WO96/16365.
Faaland, Bruce H. et al. Jun. 4, 1996. Abstract from US5524077.
Jun. 21, 1996. Abstract from JP08-163119.
Sederlund, Edward R. et al. Sep. 10, 1996. Abstract from US5555424.
Lee, Y. et al. Oct. 8, 1996. Abstract from US5564021.
Grice, Donald G. et al. Feb. 4, 1997. Abstract from US5600822.
Hausman, R. E. et al. Feb. 27, 1997. Abstract from WO97/07471.
Qiu, Yuping et al. Mar. 25, 1997. Abstract from US5615254.
Arbabi, M. et al. Apr. 8, 1997. Abstract from US5619695.
Dietrich, Brenda L. et al. May 13, 1997. Abstract from US5630070.
De, Kaushik. Jun. 10, 1997. Abstract from US5638380.
McCartney, M. J. Jul. 24, 1997. Abstract from WO97/26609.

* cited by examiner

TOTAL #OF RX'S IN QUEUE FOR EACH TASK DURING EACH TIME PERIOD

MAIL WANDING PHONE_RESAFE FRONT_QADR_CALL DUR AR EL

| | | | | | | | | |
|---|---|---|---|---|---|---|---|---|
| 0400 | 10034.0 | 0.0 | 0.0 | 0.0 | 0.0 | 0.0 | 0.0 | 0.0 |
| 0415 | 9784.0 | 67.5 | 0.0 | 182.5 | 0.0 | 0.0 | 0.0 | 0.0 |
| 0431 | 0684.0 | 594.0 | 0.0 | 155.5 | 6.0 | 7.0 | 25.7 | 5.2 |
| 0445 | 9434.0 | 161.5 | 0.0 | 238.0 | 12.0 | 14.0 | 26.4 | 5.2 |
| 0500 | 9184.0 | 67.5 | 0.0 | 320.5 | 18.0 | 21.0 | 27.1 | 5.2 |
| 0515 | 8934.0 | 67.5 | 0.0 | 403.0 | 24.0 | 28.0 | 27.8 | 5.2 |
| 0530 | 8684.0 | 67.5 | 0.0 | 485.5 | 30.0 | 35.0 | 28.5 | 5.2 |
| 0545 | 8434.0 | 67.5 | 0.0 | 568.0 | 36.0 | 42.0 | 29.2 | 5.2 |
| 0600 | 8184.0 | 67.5 | 0.0 | 650.5 | 42.0 | 49.0 | 29.9 | 5.2 |
| 0615 | 7934.0 | 67.5 | 0.0 | 733.0 | 48.0 | 56.0 | 30.6 | 5.2 |
| 0630 | 7684.0 | 67.5 | 0.0 | 815.5 | 54.0 | 63.0 | 31.3 | 5.2 |
| 0645 | 7434.0 | 67.5 | 0.0 | 898.0 | 60.0 | 70.0 | 32.0 | 5.2 |

COMPUTER IMPLEMENTED RESOURCE ALLOCATION MODEL AND PROCESS TO DYNAMICALLY AND OPTIMALLY SCHEDULE AN ARBITRARY NUMBER OF RESOURCES SUBJECT TO AN ARBITRARY NUMBER OF CONSTRAINTS IN THE MANAGED CARE, HEALTH CARE AND/OR PHARMACY INDUSTRY

BACKGROUND OF THE INVENTION

Field of the Invention

This invention relates to optimization of resource planning, including resource allocation and production planning, and more particularly, to optimization of resource planning for a multiple level process by use of an optimal resource allocation procedure in pharmacies.

The present invention also relates to resource scheduling to substantially optimally staff pharmacies on a day-to-day basis, and more particularly, to solving scheduling problems where resources perform a varying set of tasks and their individual rates (units/man hours) for each task can also vary. The resource allocation model (RAM) assigns the substantially optimal number of staff to areas in a pharmacy during specific times of the day at substantially the least cost while minimizing order turnaround time.

Background of the Related Art

The demand for resource allocation decisions generally occurs in a broad range of technological and industrial areas, such as the assignment of transmission facilities in telephone transmission systems, the control of the product mix of a factory, the deployment of industrial equipment, and inventory control. Resource allocation in this context generally means the deployment of specific technological or industrial resources for production of products or desired results.

Resource allocation decisions are typically subject to constraints such as limitations in availability of materials, equipment, time, cost, and other parameters affecting the outcome of a technological process. In addition, resource allocation decisions may also be subject to constraints relating to the utility of a particular resource in a particular application.

A particular allocation of resources may also be associated with a specific result, such as the cost or number of products produced. Resources should be allocated so as to satisfy all of the constraints, and simultaneously, to maximize a resulting benefit, such as by minimizing the costs or by maximizing the number of devices outputted by a manufacturing process.

Over the years many different resource scheduling algorithms have been developed. The simplest job scheduling algorithm is first come first served. This is similar to a bank office with a single active teller. Each customer comes in the door and gets in line. The customer is served only after all of the customers ahead in line are served. This algorithm suffers from the disadvantage that if the first customer has a very long transaction, all of the other customers must wait.

Another job scheduling algorithm is shortest job first. In this algorithm, each customer is asked how many transactions he needs to make. The customer with the least number of transactions is served first. This algorithm has the disadvantage in that it is hard to tell in advance how long it will actually take to serve the customer. The customer may have only one transaction, but the transaction may be extremely complicated and take 15 minutes. Another customer may have two transactions which will only take one minute each.

This difficulty in knowing ahead of time how long the transaction is going to take, has minimized the use of the shortest job first algorithm. Another problem with this algorithm is that a customer with a large number of transactions may never get served. If new customers keep coming in the bank, they will get served ahead of older customers that require more transactions. For this reason, it is desirable to introduce the concept of "fairness" in a job scheduler. A good scheduling algorithm is both efficient and fair.

To overcome these problems, priorities can be assigned to various classes of customers. Usually within a class, customers are served in first come first served order. Suppose for example that there are three classes of customers, private, small business, and large business, having priorities of 1, 2, and 3 respectively, where higher is better. If one customer of each class walks in the door at the same time, they will be served in this order: large business, small business, and private. It when the small business customer is being served, another small business customer comes in the door, he will cut in line before the private customer. This is generally called priority scheduling.

Even with the addition of priorities, job scheduling suffers from disadvantages, the primary being the inability to optimize job scheduling. Accordingly, another innovation has been to monitor the behaviour of the job in the system to determine where the job should stand in line. Thus, a customer would initially get in line at the appropriate place based on his priority. But if a customer is being served for an unusually long time, the customer would have to give up his spot and move back to a position in the line. In this way, the customers would each get served for at least some period of time during each time through the line. When all of the customers have the same priority, this is called round robin scheduling. In cases where customers have different priorities, a hierarchy of lines is developed, and customers who use too much time will get bumped to lower and lower priority levels. This scheduling method with varying priorities is called multilevel feedback queues.

One attempt at solving one or more of the above problems is disclosed in U.S. Pat. No. 5,630,070 to Dietrich, et al., incorporated herein by reference. Dietrich, et al, relates to a method for constrained material requirements planning, optimal resource allocation, and production planning. The method provides for optimization of a manufacturing process by designating the amounts of various manufactured products to be produced. The products include both end products and subassemblies to be employed in the manufacture of one or more of the end products.

In order to accomplish the optimization, the Dietrich, et al. method employs an objective function, such as the maximization of income, in a situation wherein there are limitations on the inventory of raw materials and tools to be employed in the manufacturing process. Data describing elemental steps in the manufacturing process for the production of each end product, as well as the quantity or demand for each end product which is to be supplied, are presented as a set of linear mathematical relationships in matrix form to be inserted in a computer which determines the optimum number of each end product in accordance with an optimization algorithm. The matrix contains bill of material data, and various constraints such as a constraint on the sum of products shipped and use as subassemblies, and constraints based on inventory, on available time for use of resources such as tools, and on inventory left over from an early production run for a later run.

U.S. Pat. No. 5,442,730 to Bigus, incorporated herein by reference, is another attempt to further enhance job scheduling optimization. In Bigus, a job scheduler makes decisions concerning the order and frequency of access to a resource according to a substantially optimum delay cost function. The delay cost function is a single value function of one or more inputs, where at least one of the inputs is a delay time which increases as a job waits for service. The job scheduler is preferably used by a multi-user computer operating system to schedule jobs or different classes. The delay cost functions are preferably implemented by neural networks. The user specifies desired performance objectives for each job class. The computer system runs for a specified period of time, collecting data on system performance. The differences between the actual and desired performance objectives are computed, and used to adaptively train the neural network. The process repeats until the delay cost functions stabilize near optimum value. However, if the system configuration, workload, or desired performance objectives change, the neural network will again start to adapt.

U.S. Pat. No. 4,648,023 to Powell, incorporated herein by reference, is another attempt to further enhance job scheduling optimization. In Powell, a control system controls the manufacture of small-order-quantity goods. A network of events, activities and baseline schedule dates is constructed. Availability of external components and actual internal progress are measured by a slack variable. Optimization is based on use of the slack variable for allocation of resources. Critical items are determined rapidly and in parallel. Cost estimation of schedule improvements are readily determined.

While the above optimization techniques have been used successfully in other industries as operational management tools, we have determined that the use of such techniques is new to the managed care, health care and/or pharmacy industry. For example, each pharmacy and/or mail order pharmacy currently expends a great deal of management and clerical resources preparing a daily staffing plan (schedule). Allocation of staff to function in order to meet mail order claims throughput targets is a manual and unstandardized process.

These highly distributed manual process involve (1) trial and error placement of parameters into Lotus spreadsheets, (2) visual inspection, evaluation, and discussion of calculated results by a team of 20+ people/managers of functional areas, (3) incremental group decision making, (4) iteration of steps 1 through 3 until group consensus determined that output calculations and management intuition as to the effects of the parameter changes were in agreement, satisfactory, and "optimal".

We have determined that the disadvantages of the current methods used in the managed care, health care, and/or pharmacy industry are (1) extreme cost of high-level process management personnel in terms of time and salary, (2) no single and/or generic decision support tool or methodology which is flexible and robust enough to adapt to the diversity in operational facility processes, (3) no robust and abstract definition of resource, (4) no flexible but uniform analytical methodology, (5) the problem is too complex for management to schedule resources to tasks or functions at specific times, and (6) the current process is suboptimal.

Accordingly, we have determined that it is desirable to provide a process for optimizing and/or improving the managed care, herein care, and/or pharmacy industry that reduces the amount of costly high-level process management personnel.

We have also determined that it is desirable to provide a process for optimizing and/or improving the managed care, health care, and/or pharmacy industry that provides a generic decision support tool or methodology which is flexible and robust enough to adapt to the diversity in operational facility processes.

We have also determined that it is desirable to provide a process for optimizing and/or improving the managed care, health care, and/or pharmacy industry that is robust and utilizes as abstract definition of resources.

We have also determined that it is desirable to provide a process for optimizing and/or improving the managed care, health care, and/or pharmacy industry that provides a flexible and/or uniform analytical methodology.

We have also determined that it is desirable to provide a process for optimizing and/or improving the managed care, health care, and/or pharmacy industry that allows management to easily schedule resources to tasks or functions at specific times.

We have also determined that it is desirable to provide an improved process for optimizing and/or improving the managed care, health care, and/or pharmacy industry.

SUMMARY OF THE INVENTION

It is a feature and advantage of the present invention to provide an enhanced method and apparatus for scheduling resources for a plurality of jobs.

Another feature and advantage of the present invention is to increase the performance of a computer system which schedules jobs from multiple users.

Another feature and advantage of the present invention is to provide a technique for translating user specified performance goals into the necessary delay cost functions needed to reach those performance goals.

Another feature and advantage of the present invention is to provide a process for optimizing and/or improving the managed care, health care, and/or pharmacy industry that reduces the amount of costly high-level process management personnel.

Another feature and advantage of the present invention is to provide a process for optimizing and/or improving the managed care, health care, and/or pharmacy industry that provides generic decision support tool or methodology which is flexible and robust enough to adapt to the diversity in operational facility processes.

Another feature and advantage of the present invention is to provide a process for optimizing and/or improving the managed care, health care, and/or pharmacy industry that is robust and utilizes an abstract definition of resources.

Another feature and advantage of the present invention is to provide a process for optimizing and/or improving the managed care, health care, and/or pharmacy industry that provides a flexible and/or uniform analytical methodology.

Another feature and advantage of the present invention is to provide a process for optimizing and/or improving the managed care, health care, and/or pharmacy industry that allows management to easily schedule resources to tasks or functions at specific times.

Another feature and advantage of the present invention is to provide an improved process for optimizing and/or improving the managed care, health care, and/or pharmacy industry.

The general strategy of the resource allocation model and process described herein is to (1) map operational processes in each mail order pharmacy, (2) simulate the operational process through dynamic modeling, (3) validate the operational model using pharmacy operations management feedback, (4) use the dynamic simulation as an architectural template, design algorithm to minimize cost and mail-order claim turnaround time while maximizing throughput by providing a daily or inter-daily staffing plan, and (5) integrate real-time data fees from time clocks and mainframe systems allowing timely and efficient utilization of resources.

The scope of the Resource Allocation Model prototype is to develop a generic software application to dynamically and substantially optimally schedule an arbitrary number of resources (humans, machines, teams, etc.) to an arbitrary number of tasks, functions, processes (filling bottles, packaging bottles, opening pieces of mail, etc.), subject to an arbitrary number of physical and temporal constraints (the maximum number of workstations in data entry is 60, telephone calls to doctors' offices can not happen before 9:00 am., a pharmacist can only fill 40 prescriptions per hour, etc.) while minimizing and/or maximizing an objective function (mathematical equation) which quantifies cost and throughput of the process flow over an arbitrary time horizon.

Conceptually, the resource allocation model and computer implemented process of the present invention centers around a generic software application applied broadly to mail-order and point of sale pharmaceutical distribution, supply chain, and pharmacy benefit management, as well as other areas of heath care and/or managed care. The model dynamically and optimally schedules an arbitrary number of resources (humans, machines, teams, and the like) to an arbitrary number of tasks, functions, processes (filling bottles, packaging bottles, opening pieces of mail, out-bound and in-bound customer service calls, and the like), subject to an arbitrary number of constraints (physical, logistical, temporal, and the like).

The structure of the resource allocation model substantially guarantees that resources will be scheduled in such a way to satisfy an arbitrary number of specified objectives: typically maximization or minimization of profitability, cost, efficiency, advantage, opportunity or penalty defined as mathematical functions. In the abstract, entities with variable attributes and of variable quantity are processed or undergo transformation through a network or networks of nodes. Each node of a network has an associated set of attributes and parameters. Node and network attributes may be defined qualitatively through nominal, graphical and/or symbolic conventions. Node and network parameters are specified as inputs, outputs, capacities, operational processes, functional behaviors, movement logics, or some other parameter defined dynamically.

To achieve the above and other features and advantages of the present invention, a method of scheduling jobs from among a plurality of job classes for service by a resource of a work-producing system, where the work producing system comprises a pharmacy, dispensary, drugstore, and the like. The method includes the steps of sorting, in a predetermined order, available resources to be utilized in the pharmacy by a last task assignment, a number of tasks performable, rate per task, and/or cost per hour, and determining one or more queues responsive to the sorting. The method also includes the step of normalizing the queue by dividing a current task queue by an average rate of the available resources for each task in the current task queue. The method also includes the step of assigning the available resources to one or more tasks with a predetermined normalized queue, subject to at least one task constraint.

One or more computer memory products are also provided, and one or more computers execute a program including the above process steps. A computer-implemented process is also provided.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the component set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor it is intended to be limiting as to the scope of the invention in any way.

These together with other objects of the invention, along with the various features of the novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

NOTATIONS AND NOMENCLATURE

Figure 1:
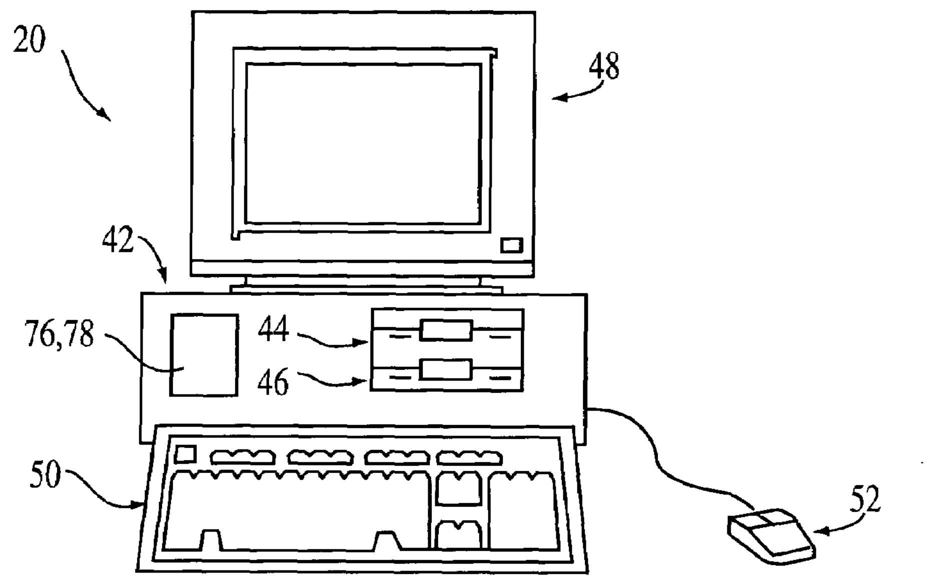
FIG. 1 is an illustration of a computer of a type suitable for implementing the resource allocation processes described herein.

The detailed descriptions which follow may be present in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT OF THE INVENTION

Resource Allocation Models are a specific application of linear, non-linear and integer optimization techniques which are used in manufacturing and transportation based industries, and more recently in the area in finance. Solving optimization models is generally known to be the most complex and difficult mathematical and computational problems.

There are four general components to the optimization model of the present invention: supply, demand, constraints and objectives. Supplies and demands can be thought of as polls of people, machines, facilities or mail order pharmaceutical claims; anything which is countable. In optimization models, supplies flow to where they are demanded. Constraints are limits placed on the flows from supplies to demanders. Constraints can also be capacities of the supplier's ability to produce or the demander's ability to accept and process. Objectives are goals or equations which take into consideration, simultaneously, all sources of supplies, all points of demand, all related limits and capacities imposed by constraints.

The overall purpose of the optimization process of the present invention is to minimize or maximize the objectives, typically cost, throughput, production capacity, availability. If an optimization model is properly formulated, and a true maximum or minimum value is found for the objective, no better possible solutions to the system, as defined, exist.

The scope of the resource allocation model of the present invention is to develop a "straw man" which could be used in defining and developing a formal software application to allocate resources within a pharmacy, such as a manual mail order pharmacy. The present invention reduces the amount of time and effort involving (1) pharmacy operations a management in daily flow meetings and mini flow meetings, and (2) manual and unstandardized preparation of daily staffing schedules. This would free up time for operations management to address more important operational issues.

The goal of the present invention is to develop a software application which dynamically (1) determines the optimal number of personnel needed within each functional area effecting customer order throughput, minimizes within pharmacy order turn around time, maximizes total daily facility throughput, and balances queue size and work load within and across functional areas, and (2) schedules a roster of available personnel to each functional area effecting customer order throughput to meet the management objectives stated in the point (1).

The following is a list of functions that are collateral features or services to the resource allocation model and computer implemented process of the present invention: (1) database, (2) reporting, (3) query tool, (4) payroll, (5) benchmarking and performance monitoring, (6) management of non-conformances, (7) scheduling administrative or other personnel which do not directly effect the speed of mail order claim processing, (8) long range planning tool, (9) order status or tracking tool.

the general strategy of the resource allocation model and process of the present invention is to (1) map operational processes in each mail order pharmacy, (2) simulate the operational process through dynamic modeling, (3) validate the operational model using pharmacy operations management feedback, (4) design algorithm to minimize cost and mail-order claim turnaround time while maximizing throughput by providing a daily or inter-daily staffing plan using the dynamic simulation as an architectural template, (5) integrate real-time data fees from time blocks and mainframe systems allowing timely and efficient utilization of resources.

The scope of the Resource Allocation Model prototype is to develop a generic software application to dynamically and optimally schedule an arbitrary number of resources (humans, machines, teams, and the like) to an arbitrary number of tasks, functions, processes (filling bottles, packaging bottles, opening pieces of mail, and the like), subject to an arbitrary number of physical and temporal constraints (the maximum number of workstations in data entry is 60, telephone calls to doctors' offices can not happen before 9:00 am., a pharmacist can any fill 40 prescriptions per hours, and the like) while minimizing and/or maximizing an objective function (mathematical equation) which quantifies cost and throughput of the process flow over an arbitrary time horizon.

Conceptually, the resource allocation model and computer implemented process of the present invention centers around a generic software application applied broadly to, for example, mail-order and point of sale pharmaceutical distribution, supply chain, and pharmacy benefit management. The model dynamically and optimally schedules an arbitrary number of resources to an arbitrary number of tasks, functions, processes, subject to an arbitrary number of constraints. The structure of the model and computer implemented process of the present invention guarantees that resources will be scheduled in such a way to satisfy an arbitrary number of specified objectives: typically maximization or minimization of profitability, cost, efficiency, advantage, opportunity or penalty defined as mathematical functions.

Entities with variable attributes and of variable quantity are processed or undergo transformation through a network or networks of nodes. Each node of a network has an associated set of attributes and parameters. Node and network attributes may be defined qualitatively through normal, graphical and/or symbolic conventions. Node and network parameters are specified as inputs, outputs, capacities, operational processes, functional behaviors, movement logics, or some other parameter defined dynamically.

Input and output structures of nodes and networks are defined by matrices of simple values or mathematical functions quantifying the flows of entities between and among nodes and networks of nodes. Additionally, each node or network of nodes is dynamic, and defined as existing for an arbitrary number of time periods each of fixed or variable duration. Higher order dimensional specifications of nodes, networks of nodes, and flow structures are allowable. All nodal structures and input-output structures may undergo transformational processes arriving at arbitrary states or passing through series of states. States or series of states may become attributes of all nodal, network, and flow structures.

Resources may be attributes of nodes. Resources may undergo transformational processes arriving at arbitrary states or passing through series or states. States or series of states may become attributes of resources. Higher order dimensional specification of resources is allowable.

Through both logical and physical data architectures, the resource allocation model is capable of storing and retrieving abstract model elements. The capability of storing historical and/or theoretical values, attributes and constellations of nodal networks and flows, provides multiple bases of comparison for monitoring, measuring, and evaluating real-time operational data and operational performance in the context of management insight.

Mathematical and statistical criteria and methodologies for both simple and multiple comparisons form a rigorous and rational basis for a process of evolutionary improvements in operational and system performance. Metrics of quality control and best practices may become attributes and parameters within the data architecture. Each comparand undergoing monitoring, measurement or evaluation is stored and labeled as a tableau or scenario.

Allowable comparisons of tableaus or scenarios are performed based on fundamental data type(s) (i.e., nominal, ordinal, interval, or ratio) contained within the tableau or scenario and evaluated in the context of an extensible expert rule base of operational, mathematical and statistical methods. Significance and performance criteria, the associated tableaus and scenarios, as well as all abstract model elements may be stored as simple parameters and attributes or as functional, logical, graphical or symbolic forms.

Theoretical values, attributes, and constellations of nodal networks and flows may be either interpolated or extrapolated from an extensible rule base of both classical and heuristic projection methodologies. Appropriate methodologies are applied to data elements based upon parameters, significance and performance criteria and fundamental data type(s). Generated output may be stored as parameters and attributes or as functional, logical, graphical or symbolic forms.

Functionality included in the design of the resource allocation model of the present invention is grouped into three major categories. Graphical User Interface (GUI), resource allocation model (RAM), supporting data files. The functional design of the Graphical User Interface provides the following features.

Input Person ID, Name, Person Type, Shift Assignment by Day of Week, Task Preference. Shift Name, Shift Start Time, Shift End Time, Lunch Start, Break 1 start, Break 2 Start. Person Type Categories, Eligible Tasks. Task Name, Rate per Task, Task Capacity, Task Color for Gantt Chart, Flow Percentages Between Tasks. Projected Incoming Volume by Task and Time. Start of Day Queues in each Task.

Output People Allocation: Number of people assigned to each task for each time period. Volume Data: Number of RX's processed in each task for each time period. Queue Data: Queue length for each task area by time period. Gantt Chart: Person Task assignment for each time period.

The resource allocation model is based on rate information, available personnel by shift and preference, starting queue, projected volumes, and flow percentage from task to task. The scheduling portion of the model assigns individual people to tasks throughout the day to optimize flow objectives.

Supporting Data Files Roster file: Person ID, name, Person Type, Shift Assignment by Day of Week, Task Preference. Shift Information: Shift, Start Time, End Time, Lunch Start, Break 1 Start, Break 2 Start. Type Information: Person Type, Eligible Tasks. Flow Data: Task, Rate per Task, Capacity, Gantt Chart Color, Flow Percentages. Starting queue Information: Projected Incoming Volume by Task and Time.

A robust and integrated system can be obtained by writing the system in Visual C++. The advantages of this approach are:

Greater portability to other platforms.

Increased performance in processing.

Flexibility in design and implementation.

FIG. 1 illustrates a computer of a type suitable for carrying out the invention. Viewed externally in FIG. 1, a computer system designated by reference numerals 20, 26, 32 and/or 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the processes described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well.

In addition, the computer system also optionally includes at least one infrared transmitter 76 and/or infrared receiver 78 for either transmitting and/or receiving infrared signals.

Figure 2:
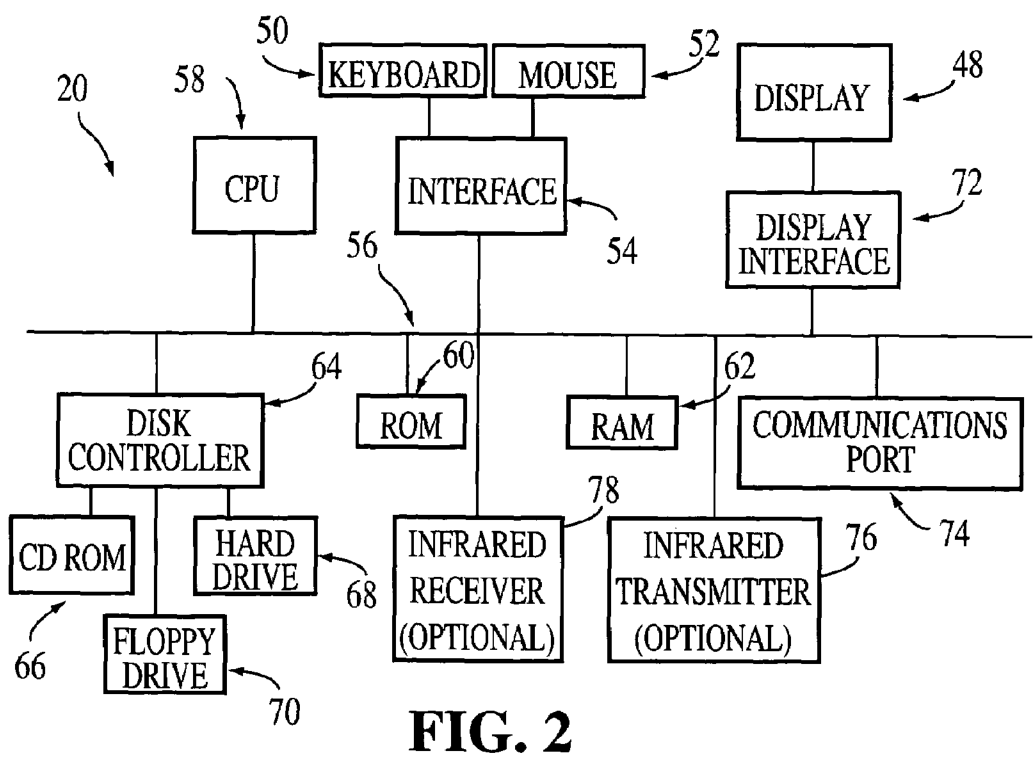
FIG. 2 is a diagram of the internal hardware of the computer illustrated in FIG. 1 in accordance with a first embodiment.

FIG. 2 illustrates a block diagram of the internal hardware of the computer of FIG. 1. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted from the device, and a display on the telephone may be used to display information. Communication with external devices occurs utilizing communication port 74.

In addition to the standard components of the computer, the computer also includes at least one of infrared transmitter 76 or infrared receiver 78. Infrared transmitter 76 is utilized when the computer system is used in the process described herein. Infrared receiver 78 is generally utilized when the computer system is used in conjunction with the telephone that is to receive the infrared signal.

Figure 3:
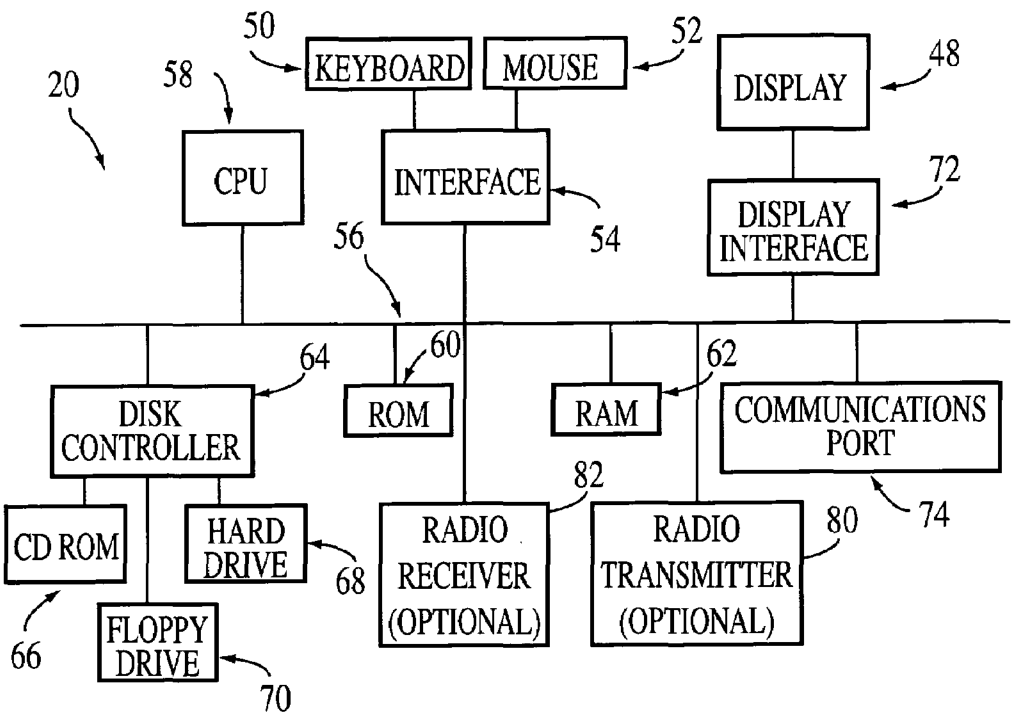
FIG. 3 is a block diagram of the internal hardware of the computer of FIG. 1 in accordance with a second embodiment.

FIG. 3 is a block diagram of the internal hardware of the computer of FIG. 1 in accordance with a second embodiment. In FIG. 3, instead of utilizing an infrared transmitter or infrared receiver, the computer system uses at least one of a low power radio transmitter 80 and/or a lower power radio receiver 82. The low power radio transmitter 80 transmits the identification signal for reception by the low power radio receiver 82. Once the low power radio receiver 82 receives the identification signal, the lower power radio signal 82 transmits the signal. The low power radio transmitter and/or receiver 80, 82 are standard devices in industry.

Figure 4:
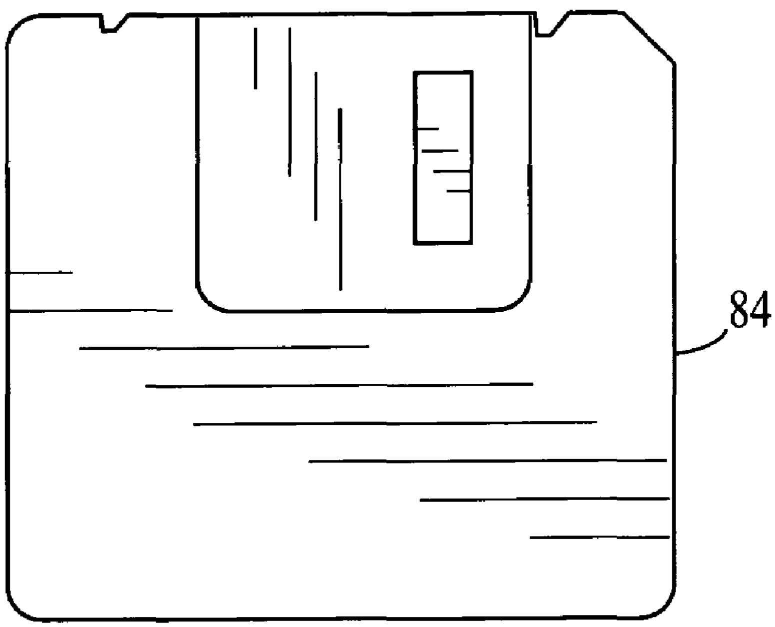
FIG. 4 is an illustration of an exemplary memory medium which can be used with the computer illustrated in FIGS. 1–3.

FIG. 4 is an illustration of an exemplary memory medium which can be used with disk drives illustrated in FIGS. 1–3. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 2–3 can also be used to store the program information that is used to instruct the central processing unit 58 to perform the operations associated with the present invention.

Figure 5:
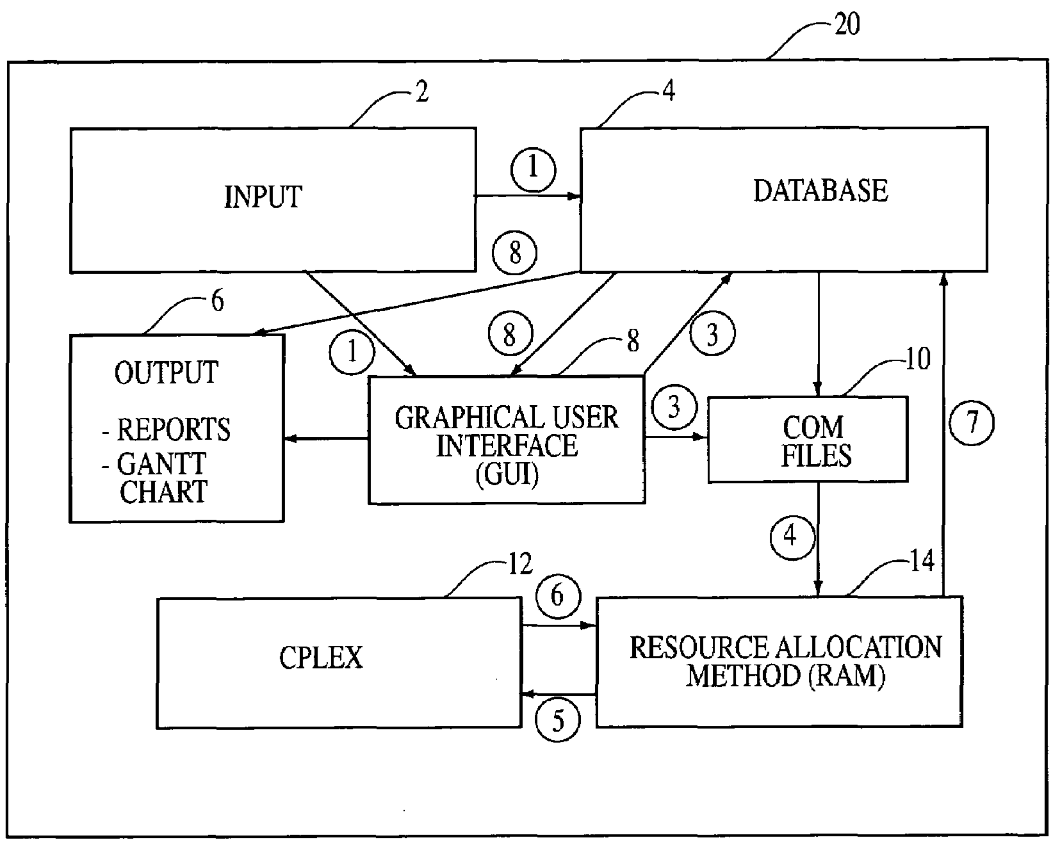
FIG. 5 is a block diagram of the computer implemented resource allocation model to dynamically and optimally schedule an arbitrary number of resources subject to an arbitrary number of constraints in the managed care, health care and/or pharmacy industry.

FIG. 5 is a block diagram of the computer implemented resource allocation model to dynamically and optimally schedule an arbitrary number of resources subject to an arbitrary number of constraints in the managed care, health care and/or pharmacy industry. In FIG. 5, input device 2 collects all the data required to drive the resource allocation model which includes a point level of information about performance skill sets including throughput information for each work station on the pharmacy floor as well as the forecast for known work that is scheduled to pass through the pharmacy in, for example, a given day over a given period. Input device 2 is, for example, a single or multiple terminal, computers, workstations, and the like, that may optionally be networked together or interactive with one another via a public and/or private network.

The throughout information represents the work that will occur in the pharmacy on a granular or detailed level. Beneficially, the present invention optionally utilizes or represents each prescription for each step of work along the process, and then optimizes the process regarding same. Graphical user interface (GUI) 8 interacts with input device 2 to permit the user to interact with the computer system 20 and also allows the user to input data that has not been captured by the computer system 20.

The information loaded into computer system 20, via input device 2 and GUI 8 comprises standard data relating to operating, for example, a pharmacy or mail service pharmacy. Data base 4 includes the information that is received by computer system 20, via input device 2 and/or GUI 8. Input as described herein includes the input the user enters in the computer system 20. The data base 4 includes information that is captured automatically by computer system 20.

For example, information captured by computer system 20 includes work left in the individual work stations from the previous day, and the like. Input 2 could also be changes to worker availability for a particular day or hour, so that workers who call in sick are taken out of the schedule.

Input device 2 also interfaces with data base 4 to keep track and/or store of all the data that has been input into the system, via, for example, a particular request. The optimization or resource allocation model uses the data base 4 to store the output 6 after the data has been entered into the system. That is, the data has to be stored somewhere to be able to be used at a later time, either to get reports out, run the optimization model or look historically at the simulation.

Output 6 represents the outputs from the computer system 20 which includes a variety of reports from the staff performance, combination of data as in the data base 4 to review, and a Gantt chart. The Gantt chart is the actual schedule or people to work stations, specific work stations within the pharmacy at a given time, and the like. COM Files 10 includes the files that integrate the data base 10 and additional constraints that the resource allocation model might includes for a particular pharmacy environment. For example, one constraint for the pharmacy network might be that workers cannot start on a given day or today earlier than 10:00 a.m. for whatever reason because something is going on in the pharmacy.

Resource allocation method (RAM) 14 is the actual mathematical representation of the pharmacy for the simulation. RAM 14 is the resource allocation method described herein.

Thus, once all the data is input, either from data captured by computer system 20 or in the data base 4 via input 2, then the user runs the simulation and the output 6 is the resulting optimized schedule. The schedule is optimized to, for example, minimize cost increase, optimize throughput through the pharmacy, optimize throughput with a contraint on cost, or optimize cost with minimal levels of through put required, and the like. The actual process used to optimize the scheduling and/or reallocation of resources is described below in detail.

RAM 14 plays games with the variables which are input into the pharmacy model to see which is going to end up being an optimum set of parameters for a given simulation. RMA 14 then outputs the results to the data base 4 which stores same. Output 6 receives the simulation results stored in data base 4 using the assistance of GUI 8.

Output 6 can be any type of text, graphic, video or other data output that, for example, includes types of people who need to be at particular work stations during a day, specific individuals that can perform specific tasks particularly efficiently, and the like. Thus, the resource allocation model and computer process described herein allows rescheduling and/or reallocating resources on the individual level, work assignment level, worker position level, and the like.

Thus, the present invention is able to handle the situation when specific workers are particularly good at specific tasks, or when workers are required to do different tasks for work diversity, and the like. For example, the present invention also considers various labor work rules that may constrain how assignments of workers to stations may be accomplished, or assignment of work tasks by seniority, and the like.

According to the accepted linear optimization techniques, as the size of the problem gets larger the time to solve it also increases. The problem becomes more difficult to solve and takes more time. In large pharmacies, the normal linear optimization techniques does not finish in the same day, and so rescheduling and/or reallocating resources in the same day in a dynamic fashion is impossible. Advantageously, the resource allocation model and process utilizing same is not based on standard linear programming techniques, and is therefore able to perform a simulation in a relatively short period of time, for example, fifteen minutes, which allows substantially dynamic rescheduling and/or reallocating of resources during the same to optimize, for example, pharmacy performance on a day-to-day or even hour-by-hour basis.

Significantly, we have determined that being able to perform substantially dynamic rescheduling and/or reallocating of resources of a day-to-day and even hour-by-hour basis is very important and provides unexpected benefits in controlling and/or managing, for example, pharmacy operations. For example, we have determined that, at times, work enters the pharmacy system in unexpected volumes that may require significant resource allocation and/or scheduling changes to accommodate same. Thus, incorporating in the simulation forecast information is very important to handle different work flow situations.

Figure 6:
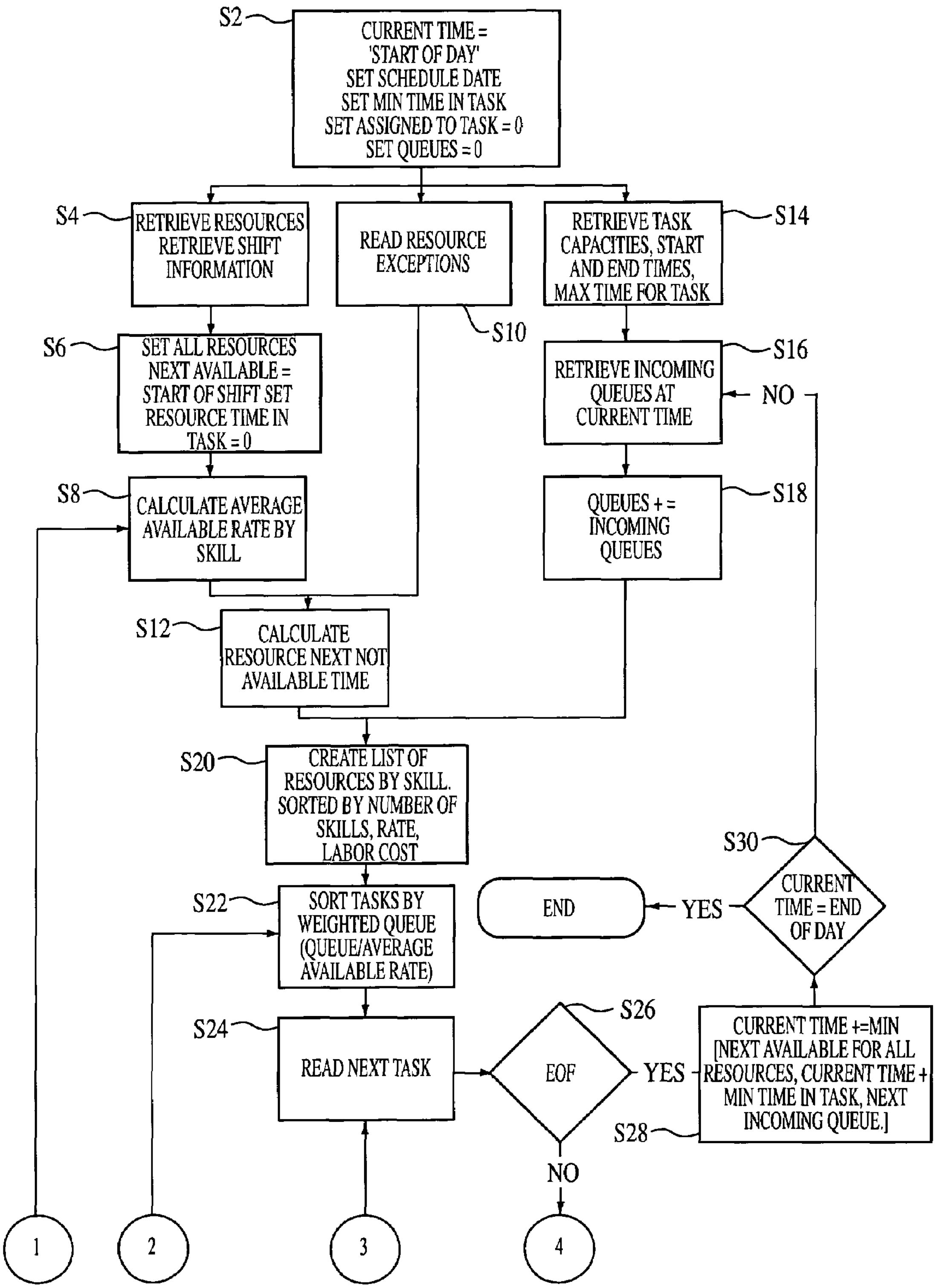
FIGS. 6–8 are flow charts describing the overall computer operations/processes performed by the computer implemented resource allocation model to dynamically and optimally schedule an arbitrary number of resources subject to an arbitrary number of constraints in the managed care, health care and/or pharmacy industry.
Figure 7:
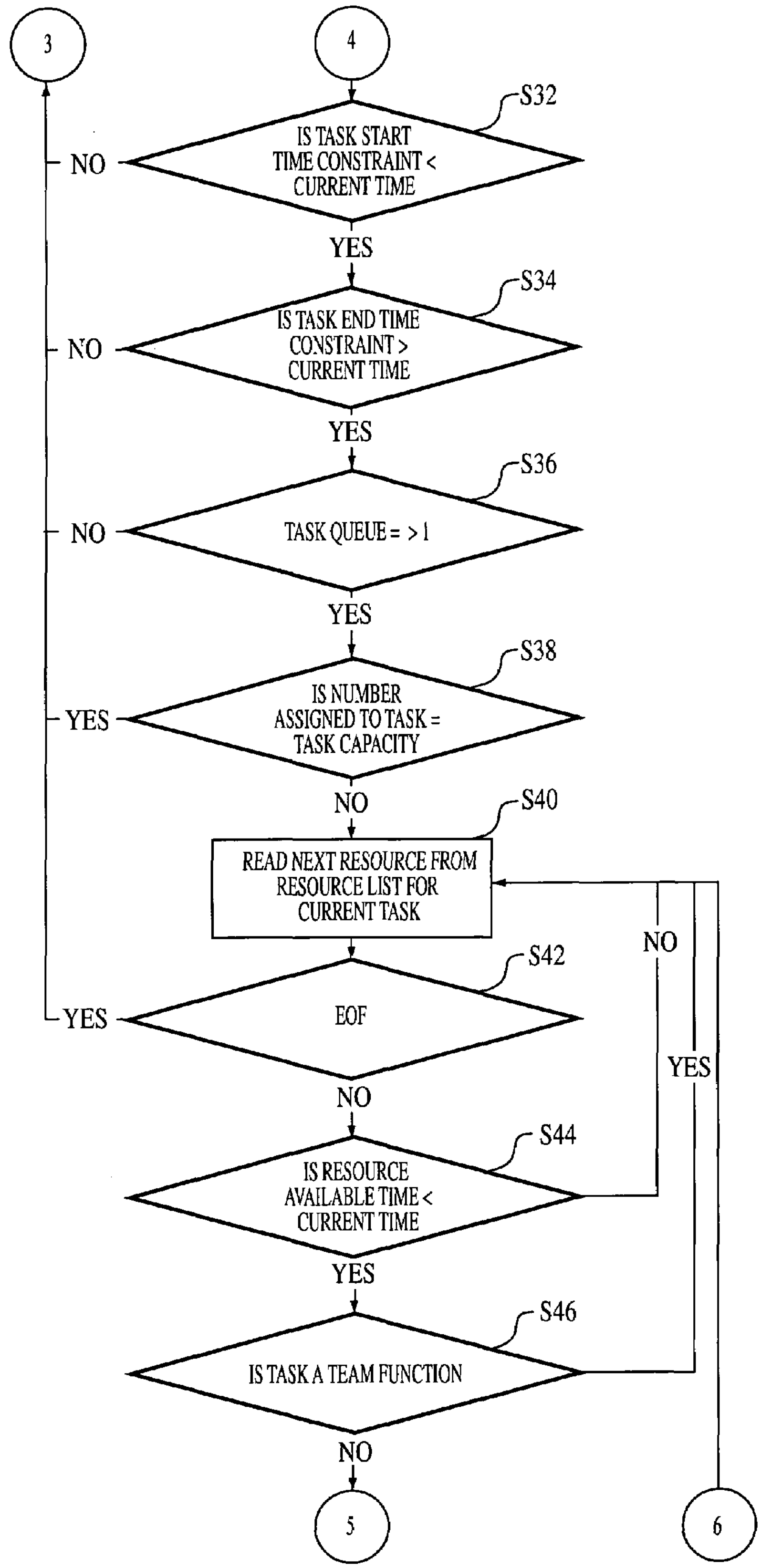
Figure 8:
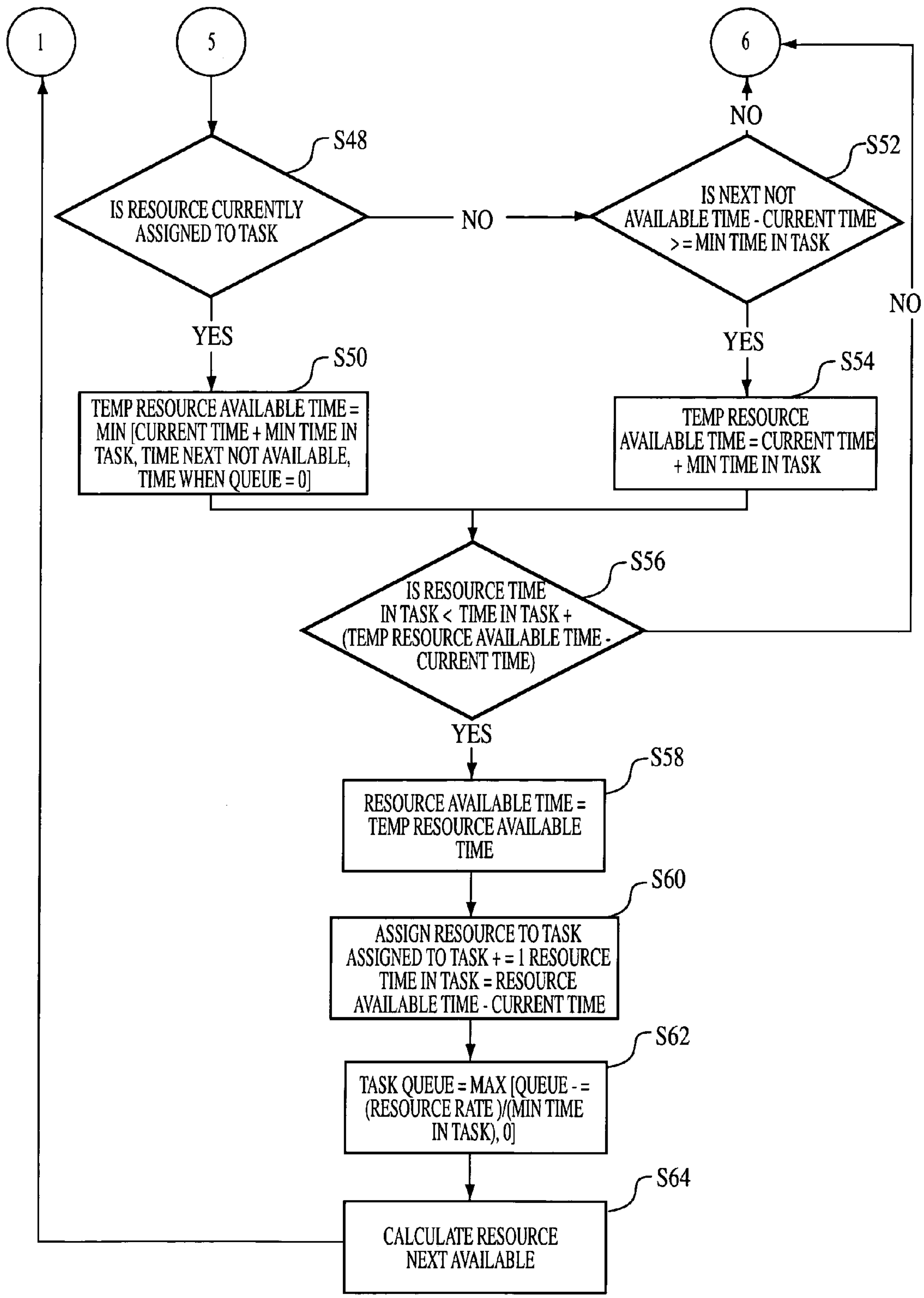

FIGS. 6–8 are flow charts describing the overall computer operations/processes performed by the computer implemented resource allocation model to dynamically and optimally schedule an arbitrary number of resources subject to an arbitrary number of constraints in the managed care, health care and/or pharmacy industry. The computer process described herein advantageously combines two techniques to create an efficient approach in solving scheduling problems, where resources perform a varying set of tasks and their individual rates (units/man hours) for each task can also vary. The work flow between tasks follows the behavior of, but is not limited to, a standard Markov Chain, incorporated herein by reference.

The first technique is to sort, in ascending order, the available resources by their last task assignment, the number of tasks they can perform, rate per task, and their cost per hour. The second technique is to "normalize" the queues by dividing the task's current queue by the average rate of the available resources for that task.

Resources are then assigned to a task with the largest "normalized" queue unless prevented by a task constraint. Task constraints include maximum resources capacity, defined start and end times, scheduled down time, and the like. If the current task has a team assignment constraint, resources are assigned to the task until the constraint is satisfied.

After an assignment, queues are recalculated and the assigned resource becomes unavailable until the minimum time in the task has expired. If the resource has been assigned for the maximum time of the task, the task is removed from resource's skill set. Resources are not assigned to a task if the assignment violates their end of shift constraint.

Time is then incremented to the time of the next event. Events include: a resource or task that becomes available, incoming work to the system, a queue reaches zero, or the minimum time in the task, and the like. The algorithm continues to loop until the end of time period is reached. This process has been shown to promote a steady state flow through a system and approach throughput levels close to optimal, with substantial speed advantages over conventional linear and integer programming methods.

In FIGS. 6–8, the computer process is initiated in Step S2. In Step S2, Current Time is set to Start of Day, and the Schedule Date and Minimum Time in Task are initialized. In addition, the Assigned to Task and Queues are set to zero. After Step S2, the process Steps S4, S6 and S8 are then performed, either in parallel or in series. In Step S4, the resources data and shift information data are retrieved from the data base.

In Step S6, all resources variable is set or initiated, New Available variable is set to Start of Shift, and the Resource Time in Task variable is set to zero.

In Step S8, Average Available Rate by Skill is calculated in a standard manner based on the workers available for a particular task. The Average Available Rate by Skill is then provided with the resource exceptions read to Step S10, to calculate the Resource Next Not Available Time in Step S12 in the standard manner, indicating when the time the resource will not be available.

In Step S14, the Task Capacities, Start and End Times, and Maximum Time for Task are retrieved, and in Step S16 the Incoming Queues at Current Time are retrieved.

In Step S18, the current queue, Queues+, is set to the Incoming Queues.

The resource allocation method described herein sorts the resources in Step S20. For example, this means that Bob can do ten (10) tasks, Mary can do five (5) tasks, and the like. According to one variation of the present invention, people who have the least amount of skills have a higher priority, and therefore, are scheduled first. The resource allocation method attempts to schedule these types of resource as soon as possible because later tasks may require more skilled workers that might otherwise be unavailable. Of course, this specific priority scheme is not a necessity or specifically required for other features of the present invention, and may be omitted in the appropriate circumstances.

In accordance with the resource allocation method, skills are defined by the number of tasks that can be performed by a worker. For example, a skill might be the ability to enter ten lines of data into a computer. A resource type, for example a pharmacist, has a list of skills or tasks that can be performed based on predetermined qualifications. Thus, a clerk cannot perform the same skills as a pharmacist. A pharmacist may, for example, perform five tasks, and at a later time, the pharmacist may perform six tasks. Tasks, therefore, are transferable within a resource type.

After all the resources are sorted, all the tasks are also sorted. The tasks are sorted by, for example, a waited queue in Step S22. The weighted queue represents the amount of work that is actually in the queue divided by the average available rate for that task. The sorted tasks represent the rate of all the people available to do that task at the particular time. The rate represents the rate at which the worker does the work.

For example, there may be a thousand pieces of work to be done here and a hundred pieces here. Depending on the rate at which the separate tasks are performed, It may take less time to perform the thousand pieces of work rather than the hundred pieces of work. Similarly, it may be possible to process 2,000 pieces a minute for one class of tasks, but it may take an hour to process a single different task. Thus, the resource allocation method optionally does not look at the aggregate amount of work, such as the average pieces, but actually determines how much time it is going to take to actually complete processing those tasks.

Thus, the resource allocation method optionally considers the reality that certain tasks are processed at different rates. The resource allocation method takes the first task that has the most outstanding work, and then reads the next task in Step S24. The method checks or determines whether the end of file condition occurs in Step S26, indicating that all tasks have been processed at this point. If all tasks have been processed, then the method performs time incrementation, as described in more detail below in Step S28 and S30.

The current time is defined by the method described herein at Step S28 as whenever something happens. The resource allocation method generally defines the event of something happening, as when somebody has finished a task, there is more work coming into the system, or if somebody is available, such as a worker coming off a break, a meeting or lunch.

The resource allocation method schedules people at the current time. For example, at four o'clock, people are scheduled to do tasks at four o'clock. The next thing that is happening, for example workers are available at 4:15, results in the resource allocation method incrementing the time to 4:15, and new constraints and new people are available to be scheduled at 4:15. The resource allocation method increments time throughout the day, until the end of the defined day, for example, working hours. The resource allocation method does not schedule any more work at the end of the day, or a predetermined time interval before or after the end of the day. Thus, the current time is generally defined as the time that is scheduled for the next task.

The next available for all resources is generally defined as the next available individual that becomes free for any task. Current time plus minimum time in task is defined as the time at which a resource, such as a worker, is required to be in a task. For example, a worker may be required to be in a task for 15 minutes. Thus, for example, when it is four o'clock, the next event that is going to happen is that a worker/resource will become free because the task will be completed, or the time is 4:15 and resources cannot be scheduled earlier because the resources have to be at a task for at least 15 minutes.

The next incoming queue describes the next event that will occur. For example, mail might come in at 4:10. Thus, the next event will be mail coming in at 4:10. The next event is the first event that will occur. When current time equals end of the day, e.g., quitting time, the process completes. Thus, in Step S28, the incremented current time is defined as the minimum or earliest of any of the above events: next available for all resources, current time+minimum time in task, and next incoming queue. In Step S30, the current time is defined as the end of the day, when the work day has completed.

At Step S26, the resource allocation method determines whether it is the end of file. If no end of file is determined, then there are more tasks to be assigned resources and completed. When there are additional tasks to be scheduled and completed, the resource allocation method again schedules the next task. The resource allocation method determines the task's start time to determine whether the task can be started. For instance, doctors calls cannot be started before 9:00 a.m. Therefore, the resource allocation method determines in Step S32 whether a specific task may begin.

At Step S34, the resource allocation method also determines whether the task end time constraint is greater than the current time. For example, non-emergency doctors calls cannot be made after 5:00 p.m. At Step S36, the resource allocation method determines whether the task queue greater than or equal to 1. Step S36 determines whether there is additional work to be done for that task when the task queue is greater than or equal to 1. For example, depending on how fast the people work, the worker might finish the work, and more work may be coming in from a previous task. Therefore, at any time, the resource allocation method checks to determines if there is work coming from, for example, another part of the pharmacy, before going on and scheduling additional work.

In Step S38, the resource allocation method determines whether a number assigned to task equal to task capacity. Thus, if the task capacity has not been exceeded, the resource allocation method assigns more people or resources to fill up the additional capacity. In addition, if there is only ten stations for filling the bottles, the resource allocation method will not assign eleven people. In Step S40, the next resource or individual that is available is read from the list for the current task. If end of file for the resources has been reached, then there are no additional resources to be scheduled.

If no additional resources need to be scheduled for a particular task as defined in Step S42, then it is determined whether the resource available time is less than the current time in Step S44. The resource available time less than the current time determines whether the selected resource is available. As described above, current time is defined when the next event is scheduled.

Thus, the resource allocation method advantageously determines specific events requiring resources to be allocated thereto, and also determines whether the resources are available now to do that task. For example, a particular resource may not be able to do a task because his shift has not started, or because the resource/worker is at lunch. If the selected resource is not available, then the resource allocation method selects another resource who hopefully is available now.

Thus, at Step S46, when a resource has been determined to be available and capable of performing the requisite task, the resource allocation method determines whether the task requiring performance is a team function, and if so, the resource allocation method then collects more people/resources to complete the task.

At Step S48, the resource allocation method has determined a particular resource is generally available for assignment, and further determines whether the selected resource meets additional criteria for assignment/allocation. Thus, in Step S48, the resource allocation method determines whether the resource is currently assigned to a similar or same task. For example, the resource might be going mail, and the resource allocation method assigns the resource to mail again. On the other hand, the resource may be doing something else such as billing, coming off lunch, or the like.

Thus, as described above, at Step S48, the resource allocation method determines whether the resource is currently assigned to this task. One reason for performing Step S48 is that the resource allocation method defines a minimum time in task. For example, someone/resource has to do a task for at least 15 minutes. If the person/resource has been in mail for an hour, the resource allocation method may, for example, assign the resource for another five minutes for a mail task.

Thus, the resource allocation method allows the resource to be scheduled to a task for 65 minutes. On the other hand, if the resource was doing an entirely different task, such as prescription filling, the resource allocation method optionally and advantageously does not assign the resource for five minutes of mailing tasks, because that type of resource allocation will violate the minimum time in task constraint, such as 15 minutes.

If the person is currently assigned to the task, then the resource allocation method also optionally determines how much time the resource can be in the task in Step S50. For example, the resource or worker may have a break coming in which case only five minutes, for example, may be available for the resource, and therefore, this resource will be unassignable. On the other hand, the resource may have no break coming, and the resource allocation method may re-assign or assign the resource in accordance with constraints, described previously.

The time next not available is defined by the resource allocation method as describing when or for what time interval the resource is going to be occupied, or when there is no more work in the queue to be performed. For example, a resource might have a meeting scheduled at 10 o'clock. The current time is 9:50, and therefore, the resource may be utilized for 10 minutes only. Thus, the resource allocation method also estimates how much more work there is in the queue to keep this person/resource busy.

If the resource is not currently assigned to the task in Step S48, then the resource allocation method determines in Step S52 whether the next not available time minus current time is greater than or equal to minimum time task, and if not, then the resource allocation method selects another resource to perform the task. But, if the worker has enough time to satisfy that constraint, then the resource allocation method sets the time in task as, for example, the minimum time in task, and the worker will perform the assigned task.

The resource allocation method then defines the temporary resource available time, which is the preliminary or temporary time of assignment of the worker to the task in Step S54. The temporary resource available time is then set to the current time incremented by the minimum time in task in Step S56.

After either of Steps S50 or S54, the resource allocation method determines whether a maximum time in task constraint has been satisfied in Step S56. More specifically, the resource allocation method determines in Step S56 whether the time in task plus temporary resource available time minus the current time is greater than the maximum resource time in task, and if not, then the control of the process is returned to Step S40. For example, the resource allocation method may assign a worker to do checking for more than two hours, and if the resource allocation method attempts to assign the worker to checking for over two hours this maximum time in task constraint will be violated.

If the maximum resource time in task is less than the time in task plus temporary resource available time minus the current time, then the resource allocation method sets the resource time to be equal to the temporary resource available time in Step S58. Next, the resource allocation method assigns the resource to the task in Step S60.

In addition, the assigned to task variable, which is the capacity constraint, is incremented by 1. For example, if there are only a maximum of ten places for people doing mail, the resource allocation method will not assign an eleventh position. Thus, this step of the process relates to resource capacity. The resource allocation method further assigns the resource time in task equal to the resource available time minus the current time in Step S60. The resource available time minus the current time indicates how much extra time this person has to do the work.

Next, in Step S62, the resource allocation method sets the task queue, which is the number of pieces that is left in the task to be performed, equal to the maximum of the queue decremented by how much work was performed by the resource that was just assigned, or zero.

Thus, every time the resource allocation method assigns someone to the task, that queue is reduced by the amount that person can actually do. If the resource allocation method does not assign a resource to perform the task, then the queue will not be decremented, or decremented by zero. In Step S64, the resource allocation method calculates the when the resource person next available, and the process returns to Step S8. An exemplary program listing implementing the above described process is provided in Appendix A.

As described above, the purpose of creating the Resource Allocation Model (RAM) is to provide managers with a tool to determine how to substantially optimally staff their pharmacies on a day-to-day basis. The RAM assigns the optimal number of staff to areas in a pharmacy during specific times of the day, at the least cost while minimizing order turnaround time.

As described above, the RAM is an interactive program that is divided into three sections: Flow, Schedule and Reports. The user inputs data into the Flow and Schedule sections, runs the RAM, and then information is transmitted to the Reports section. The user then has the ability to view the results on a display, and/or actually schedule or order work flows responsive to staff the pharmacies on a day-to-day basis, as well as future basis.

Figure 9:
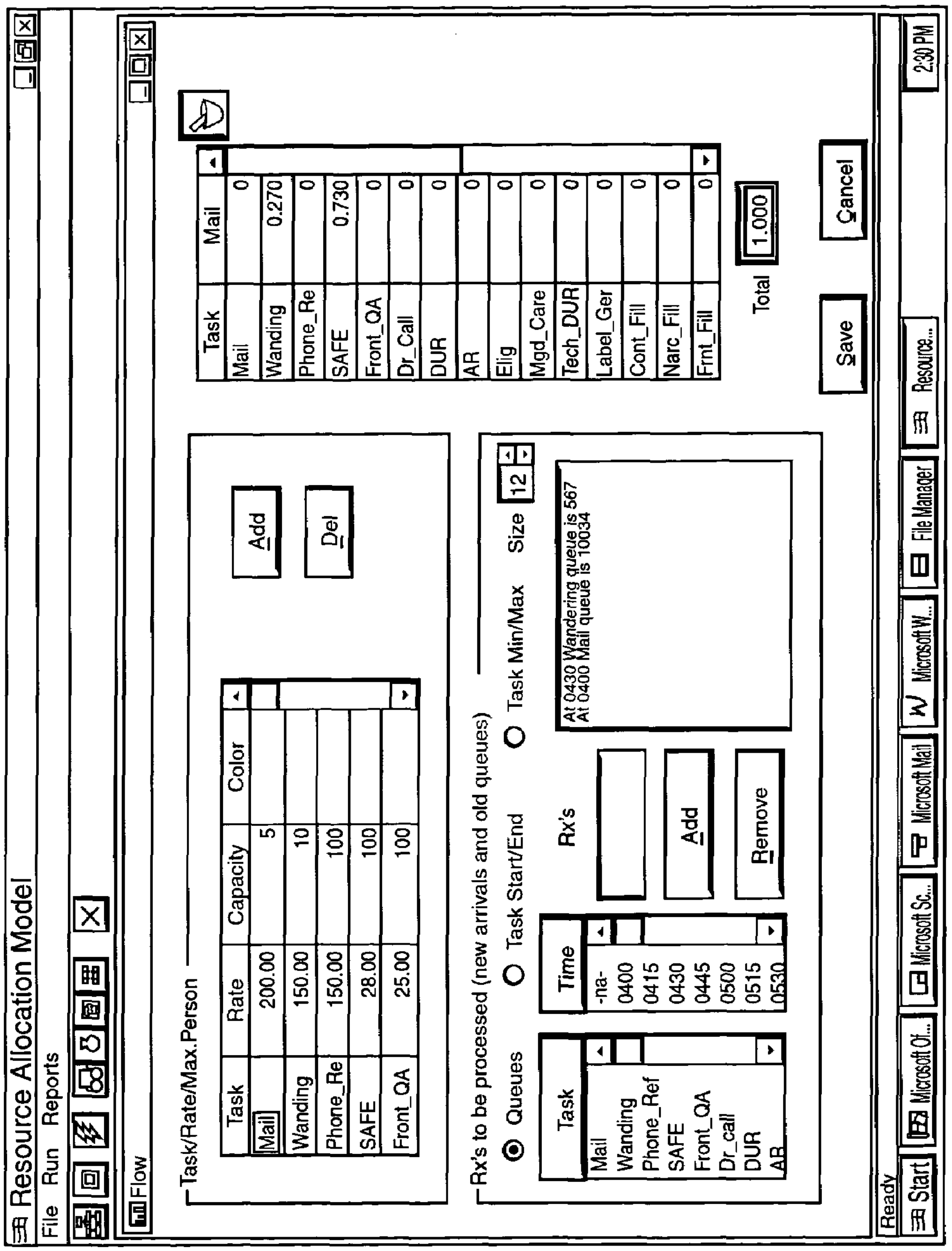
FIG. 9 is an illustration of an example of the Flow section in the resource allocation model.

An example of the Flow section in the RAM is illustrated in FIG. 9. As discussed above, the RAM uses the resource allocation method described herein to solve the optimization and scheduling problems posed by assigning the optimal or substantially optimal number of staff to areas in a pharmacy while minimizing order turnaround time. In addition, a graphical user interface (Powerbuilder) is provided so that the user can easily operate the RAM.

Figure 10:
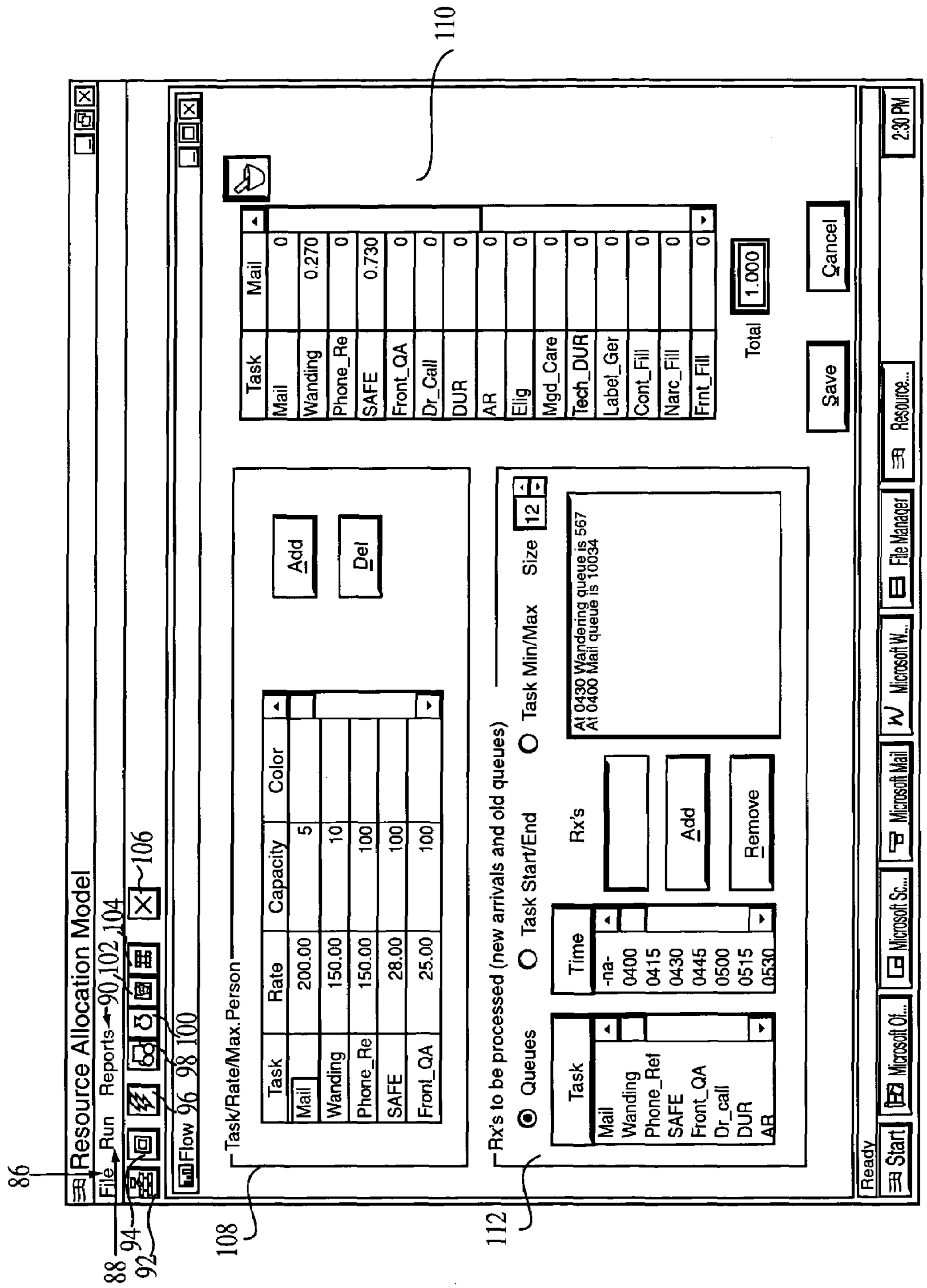
FIG. 10 is an illustration of an example of the resource allocation model menu bar including the elements: file, run, and reports.

The RAM's menu bar contains three elements: File 86, Run 88 and Reports 90, as illustrated in FIG. 10.

There are eight icons beneath the RAM's menu bar. The eight icons, as read from left to right, are Open Flow 92, Open Schedule 94, Run RAM 96, Rx Cum Report 98, Rx Proc Report 100, People Report 102, Gantt Chart 104, and Exit 106.

Instead of selecting an item from the RAM's menu bar and then selecting from another menu, the user can just click on an icon. When the mouse pointer is placed on an icon, a tiny dialogue box will identify the icon.

If the user wants to run the RAM, the user can either select Run from the RAM's menu bar and then select RAM or simply click on the third icon from the left. The Flow section is divided into three subsections: Task/Rate/Max.Person 108, Task-to-Task Flow Percentage 110, and Rx's to be processed 112 (new arrivals and old queues).

Task/Rate/Max.Person 108

In this subsection, any Task that is performed in the pharmacy is listed along with its average Rate, Capacity, and Color Code.

The average Rate for each Task varies by the quantity and by the type of item being processed per hour. As an example, an individual working the Mail area may process 200 envelopes per hour, while an individual in the standard SAFE area may process 28 prescriptions per hour.

The Capacity for a Task is dictated by the physical size of the Task area in the pharmacy. If the user assigns a Capacity of five to the Mail area, then a maximum of five workers are able to work in the Mail area simultaneously. A Color is assigned to each Task so that the different Tasks that each worker performs are clearly delineated on the Gantt chart. The User is able to add or delete Tasks.

To Add a Task

1. Click in the Task column and then click the Add button.
2. Enter the Task name and press the Tab key.
3. Enter an average Rate and press the Tab key.
4. Enter a Capacity and press the Tab key.
5. Select a Color that no other Task has been assigned and press Enter.

Once a new Task has been added, it will appear in all three of the Flow section's subsections. The user needs to assign percentages in the Task-to-Task Flow Percentage section 110 and constraints in the RX's to be processed 112 (new arrivals and old queues) section where appropriate.

To Delete A Task

Click in the Task column and then click the Del button. The task as well as its average Rate and Capacity will be deleted. In addition, the Task will be deleted from the Task-to-Task Flow Percentage and RX's to be processed (new arrivals and old queues) subsections.

To Modify a Task, Rate, or Capacity

1. Click in the cell that needs to be modified and highlight the value.
2. Enter the correct value and press Enter.

Task-to-Task Flow Percentage 110

Figure 11:
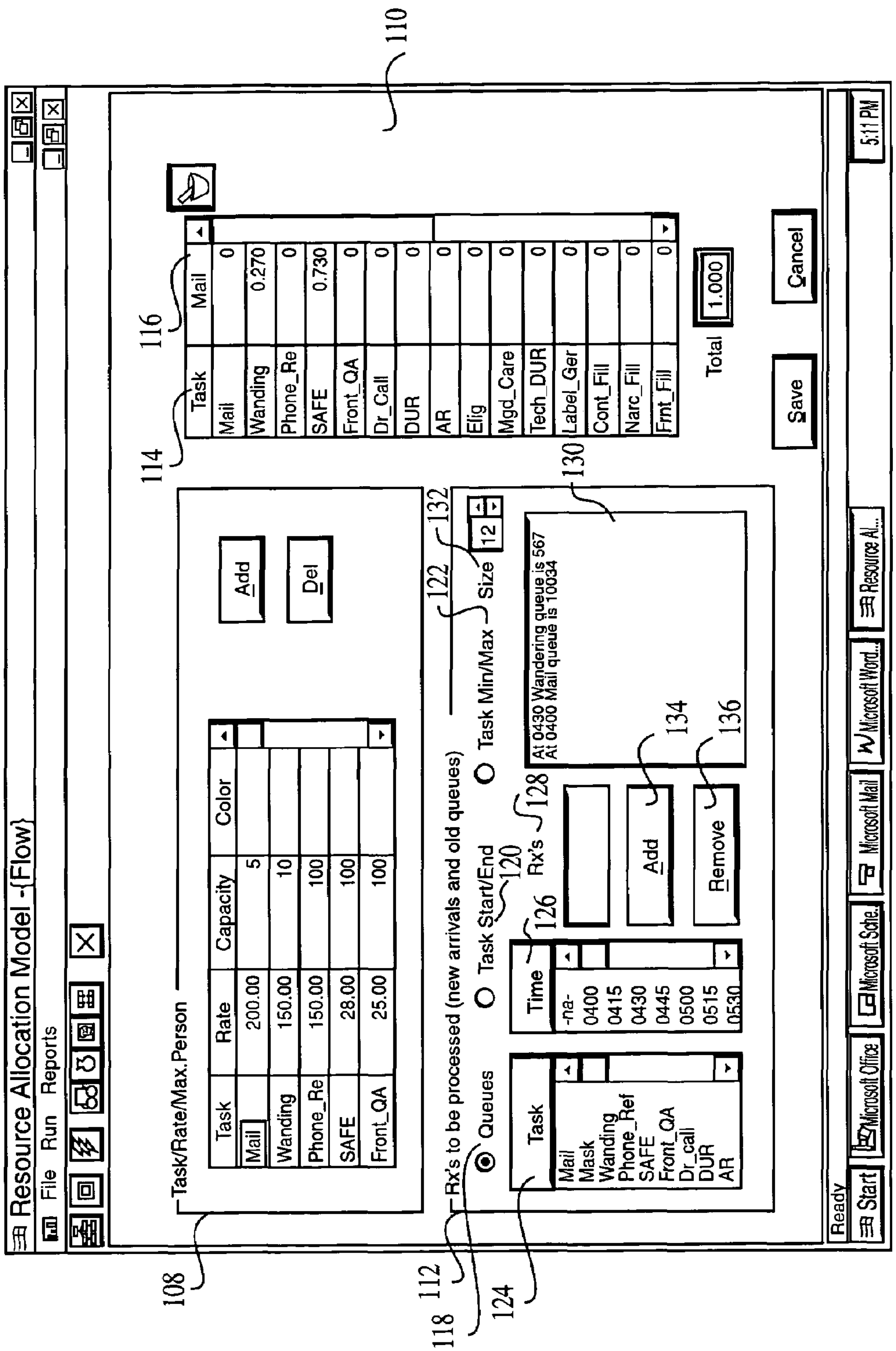
FIG. 11 is an illustration of an example of the Task-to-Task Flow Percentage.

In this subsection, there are two columns as illustrated in FIG. 11. The left column 114 shows the complete Task list, and the right column 116 shows a Task and the percentage of prescriptions that flow from this Task to the other Task(s) in the Task list.

As shown, for example, in FIG. 9, prescriptions from Mail flow either to Wanding or to SAFE. Since 27 percent (0.27) of the prescriptions from Mail flow to Wanding and 73 percent (0.73) of the prescriptions from Mail flow to SAFE, the percentage of prescriptions that flow from Mail to other Tasks is zero. A Total appears below the right column, which sums the percentages in the right column. The percentage must equal 100 percent (1,000) in order for the RAM to function.

When the Total value is 1,000, the value is green. If the Total value does not equal 1,000, the value will turn red and the RAM will not function. Standard Save and Cancel buttons appears beneath the Total.

To Modify The Task-To-Task Flow Percentage

1. Click on the Task that needs to be modified in the Task list from the Task/Rate/Max.Person subsection 108. The selected Task will appear at the top of the right column in the Task-to-Task Flow percentage subsection.
2. Click in the cell containing the percentage that needs to be modified.
3. Type in the appropriate value, and the click the Save button.

For example, if the percentage of volume flowing from Mail to Wanding and SAFE changes from 0.27 and 0.73 respectively to 0.35 and 0.65 respectively:

1. Click on Mail in the Task/Rate/Max.Person subsection 108.
2. In the Task-to-Task Flow Percentage subsection 110, click in the cell to the right of Wanding and enter 0.35.
3. In the Task-to-Task Flow Percentage subsection 110, click in the cell to the right of SAFE and enter 0.65.
4. In the Task-to-Task Flow Percentage subsection 110, click the Save button.

To cancel modifications to the task-to-task flow percentage, press the Cancel button.

Rx's to be Processed (new arrivals and old queues) 112

In this subsection there are three radio buttons: Queues 118, Task Start/End 120, and Task Min/Max 122. The display in this subsection varies depending upon which radio button is activated.

When the Queues radio button 118 is activated, the subsection appears as in FIG. 11.

There is a Task list 124; a Time list 126, in 15-minute increments starting from 4:00 a.m. to 10:00 p.m.; an RX's window 128; a constraint display window 130; a font Size button 132; an Add button 134; and a Remove button 136. The queue sizes for the different areas of the pharmacy area entered in this subsection.

To Add A Constraint

1. Click on the Task 124.
2. click on the Time 126.
3. Enter the number of RX's in the RX's window 128 and click the Add button 134.

For example, if 10,000 prescriptions are delivered to the pharmacy at 4:00 a.m., then the user clicks Mail on the Task list 124, clicks 0400 on the Time listing 126, enter 10,000 in the RX's window 128, and clicks the Add button 134. The queue size for Mail will appear in the constraint window 130: "At 0400 Mail queue is 10000."

To Delete a Constraint

1. Click on the constraint in the constraint display window 130 that is to be added.
2. Click the Remove button 136.

Task Start/End 120

Figure 12:
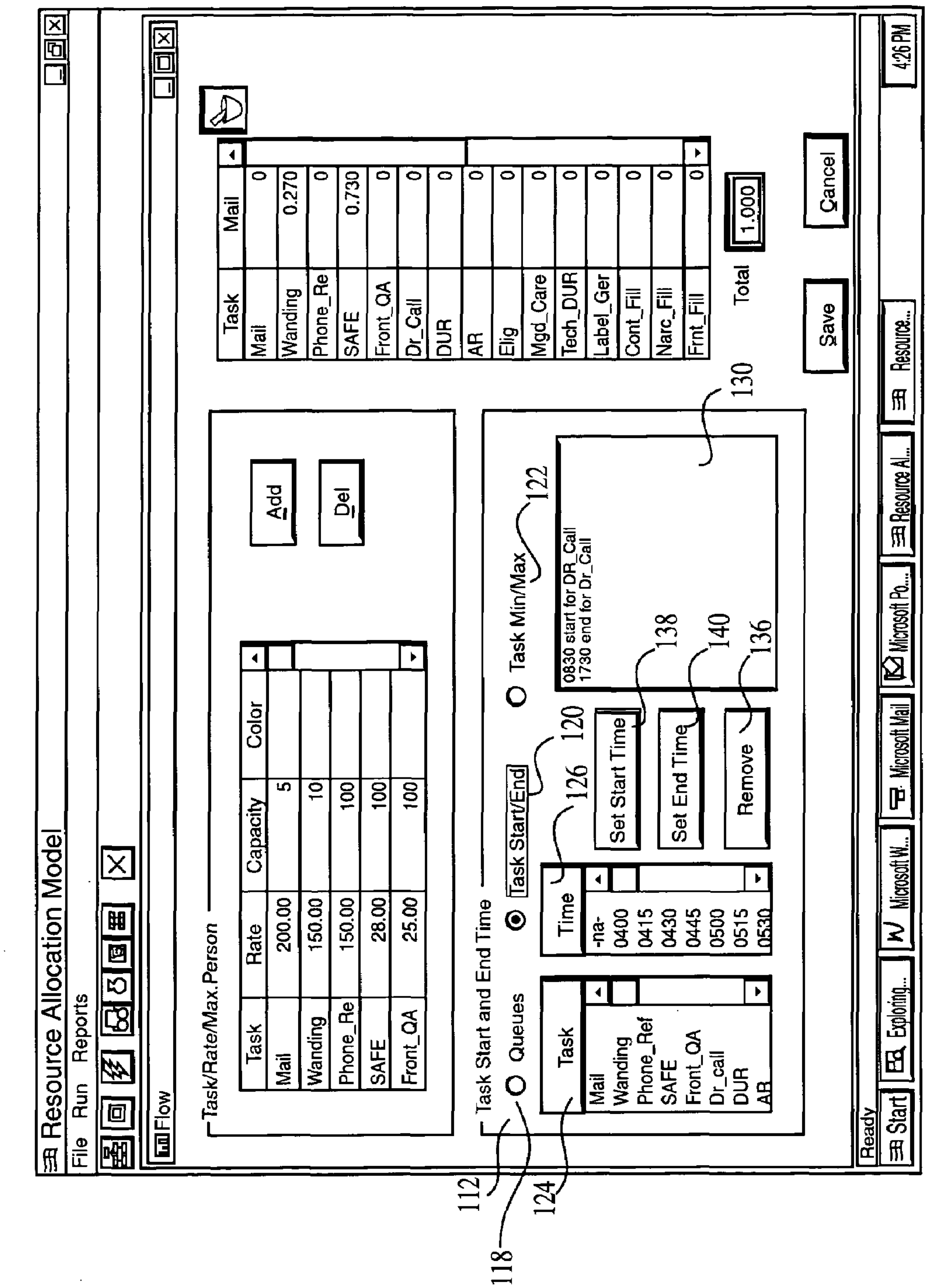
FIG. 12 is an illustration of an example of when the Task Start/End radio button is activated.

When the Task Start/End radio button 120 is activated, the subsection appears as in FIG. 12. Although the Task Start/End display closely resembles the Queues display, the RX's window and the Add button have been replaced by a Set Start Time button 138 and Set End Time button 140. These buttons are used to add the start and end times for a particular Task.

To Set a Start/End Time for a Task

1. Click on the Task 124.
2. Click on the Task 126.
3. Select the Set Start Time button 138 or the Set End Time button 140, whichever is appropriate.

The newly added constraint will appear in the constraint window.

For example, if the user wants to add the constraint that Dr. Calls will begin at 8:30 a.m., then the user clicks on Dr_Call.selects 0830 from the constraint menu 130, and then clicks the Set Start Time button 138.

To Remove a Constraint

1. Click on the constraint that is to be removed from the constraint window 130.
2. Click the Remove button 136.

Task Min/Max

Figure 13:
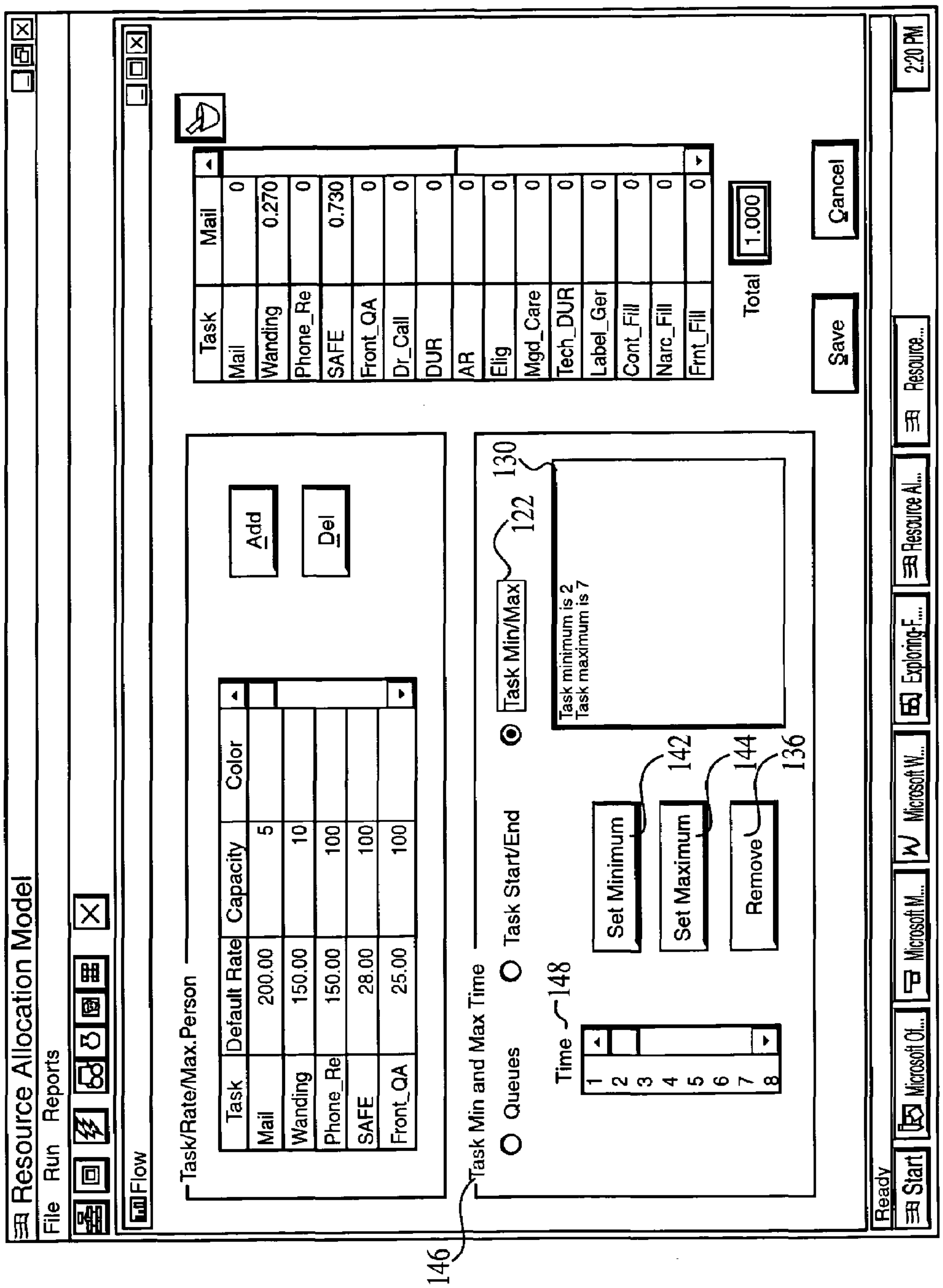
FIG. 13 is an illustration of an example of when the Task Min/Max radio button is activated.

When the Task Min/Max radio button 122 is activated, the subsection appears as in FIG. 13.

Although the Task Min and Max Time display 146 resembles both the Queues and the Task Start/End displays, the Time list has been replaced by a new Time list 148, the Set Start Time button has been replaced by a Set Minimum button 142, and the Set End Time button has been replaced by a Set Maximum button 144.

The Time list 148 and the Set Minimum button 142 are used to set the minimum amount of time a worker must remain at a Task before that worker can change to a different Task. The Time list 148 and the Set Maximum button 144 are used to set the maximum amount of time a worker can work at a Task throughout the day.

The Time list 148 represents the number of time periods in 15 minute increments. If the user wanted to set a two hour minimum for a worker to remain at a Task, then the user would select eight from the Time list 146 (8×15 minutes=120 minutes=2 hours).

To Set a Minimum/Maximum Time Per Task 1. click on the Task in the Task list 130 for which a minimum/maximum time is to be set.
2. Select an amount of time from the Time list 146.
3. If the minimum time is to be set then click the Set Minimum Time button 142. If a maximum time is to be set then click the Set Maximum Time button 144.

For example, if the user wants to add the constraint that a worker must work in the SAFE area for a minimum of two hours, then the user clicks on SAFE from the Task list 130, selects 2 from the Time list 148 and clicks the Set Minimum Time button 142.

To Remove A Constraint

1. Click on the constraint that is to be removed from the constraint window 130.
2. Click the Remove button 136.

Description of the Schedule Section

The Schedule section 150 is divided into four subsections: Person Type 152, Shift Information 154, Pick Day 156, and Roster 158.

Figure 14:
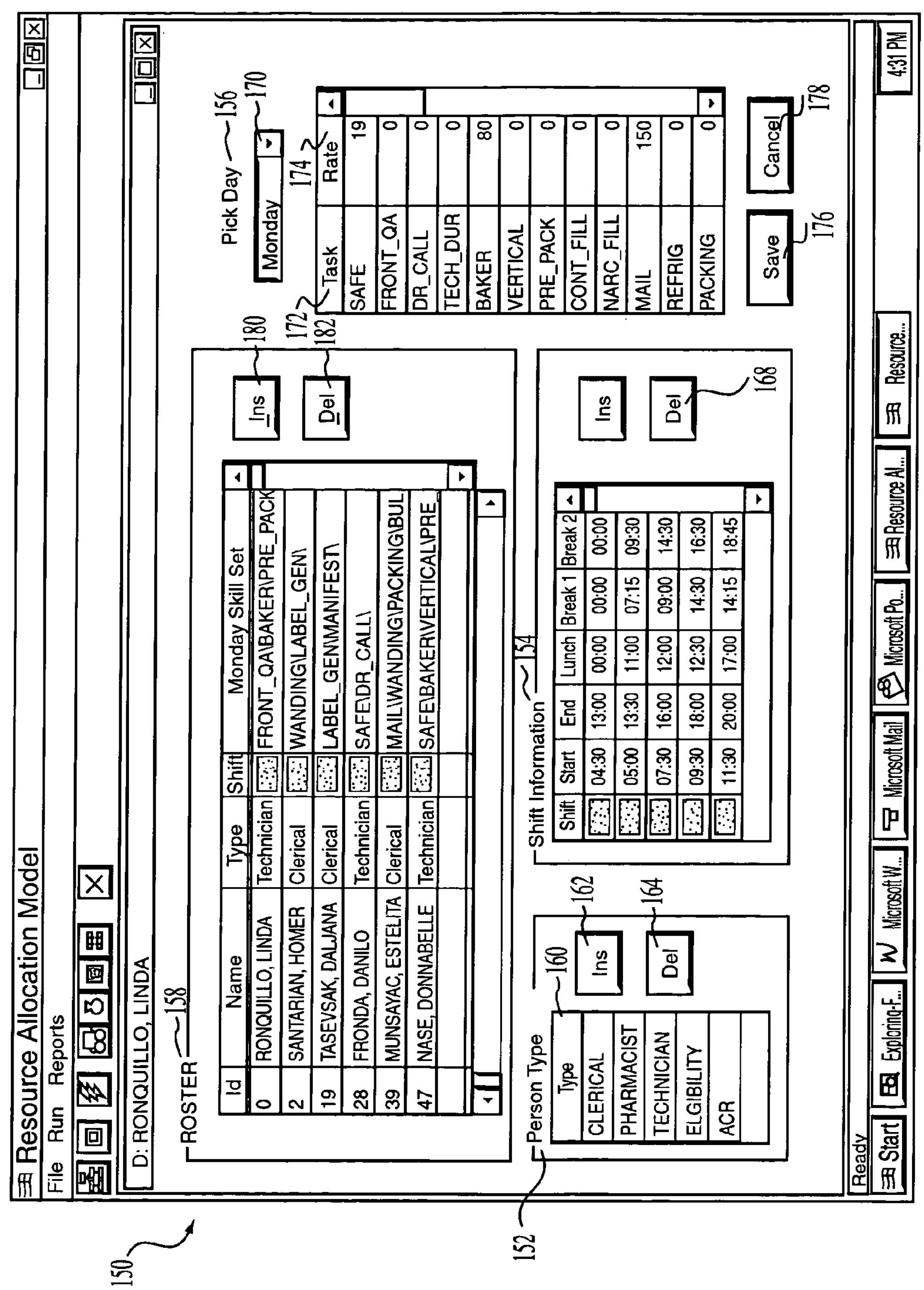
FIG. 14 is an illustration of an example of the Schedule section in the resource allocation model.

An example of the Schedule section in the RAM is illustrated in FIG. 14.

Person Type 152

For person type, the different types of workers in a pharmacy are listed.

To Define a New Type of Worker

1. Click in a cell underneath the Type column heading 160.
2. Click the Ins (insert) button 162.
3. Enter the new Type of worker and press Enter.

To Delete a Defined Type of Worker

1. Click on the defined Type of worker that is to be deleted in the Type column 160.
2. Click the Del (Delete) button 164.

Shift Information 154

For shift information 154, the different shifts that workers have are listed. Each Shift has a two-character alphanumeric designation, a Start time, an End time, a Lunch time, and two Break times.

To Add a New Shift

1. Click in a cell underneath the Shift column heading.
2. Click the Ins (Insert) button 166.
3. Enter the new Shift designation and press Tab.
4. Enter the new Start time and press Tab.
5. Enter the new End time and press Tab.
6. Enter the new Lunch time and press Tab.
7. Enter the new Break 1 and press Tab.
8. Enter the new Break 2 and press Enter.

To Delete a Shift

1. Click on the defined Shift that is to be deleted.
2. Click the Del (Delete) button 168.

Pick Day 156

For pick day 156, there is a day of week selection window 170, a Task list 172, a Rate list 174, a Save button 176, and a Cancel button 178. The Task list 172 displays all the Tasks that are performed in the pharmacy, not just the Tasks that are performed by any one worker.

The day of week selection window 170 allows the user to vary the individual's Rate per Task per day. By clicking on the down arrow next to the selection window, the user is able to select Monday—Saturday.

The Rate list 174 shows the Rate per Task of the individual worker whose name appears on the Schedule section's menu bar beneath the eight icons.

To Modify a Rate

1. Select the worker whose Rate per Task is to be modified by clicking on the worker's Name and the Roster subsection 158. The worker's name will appear on the Schedule section's menu bar beneath the eight icons.
2. Click on the down arrow of the Pick Day of week selection window 170 and select the appropriate day of the week.
3. Highlight the Rate per Task 174 that needs to be modified.
4. Type in the correct value and press Enter.

For example, the user changes John Smith's Wanding Rate on Tuesdays from 150 prescriptions per hour to 175 prescriptions per hour, as follows:

1. The user scrolls through the Roster subsection 158 and clicks on John Smith's name in the Name column.
2. In the Pick Day subsection 170, the user clicks the down arrow of the day of week selection window and selects Tuesday.
3. In the Rate subsection 174, the user highlights the Wanding Rate of 150, types 175 and presses Enter.

Roster 158

For roster information, each worker in the pharmacy is described by their ID number, Name (worker Type, Shift and (Day) Skill Set. In addition to these elements, there are Ins (Insert) 180 and Del (Delete) buttons 182, which allow for the insertion or deletion of workers.

To Insert a New Worker

1. Click in a cell underneath the Id column heading.
2. Click the Ins button 180.
3. Enter the new worker's Id number and press Tab.
4. Enter the new worker's Name and press Tab.
5. Enter the new worker's (worker) Type and press Tab.
6. Enter the new worker's Shift and press Tab.
7. Enter the new worker's (Day) Skill Set and press Tab.

To Delete a Worker

1. Click on Id number of the worker who is to be deleted. The name of the worker should appear in the Schedule section's menu bar.
2. Click the Del button 182.

Figure 15:
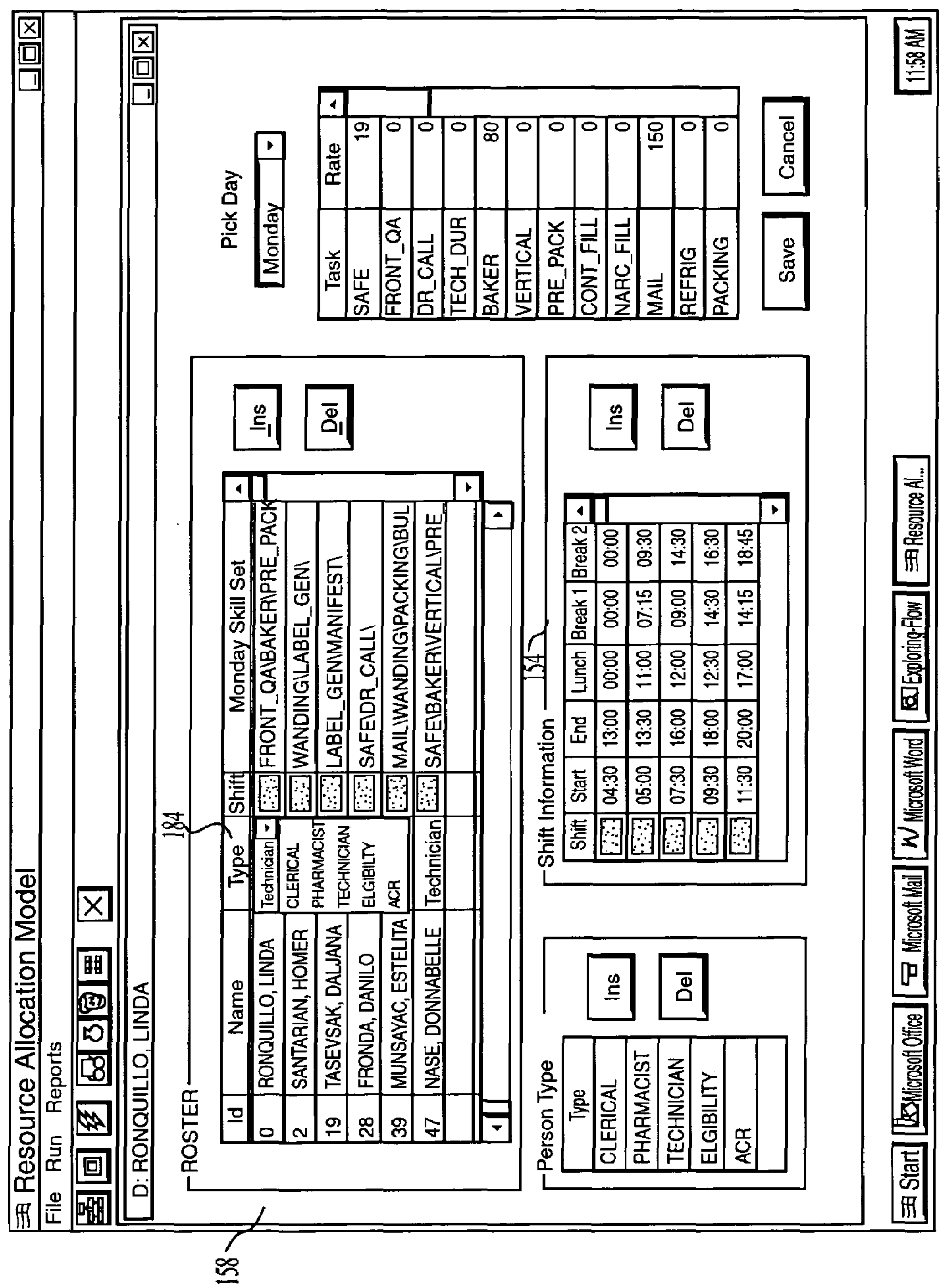
FIG. 15 is an illustration of an example of the Schedule section in the resource allocation model with the worker Type activated.

By double clicking on a cell beneath the Type column heading, a menu appears showing the different types of workers. If a worker were to change from being a clerical to a technician, then the user would double-click on Type and then select he appropriate type of worker. An example of the Schedule section in the RAM, with the (worker) Type 184 activated is illustrated in FIG. 15.

Figure 16:
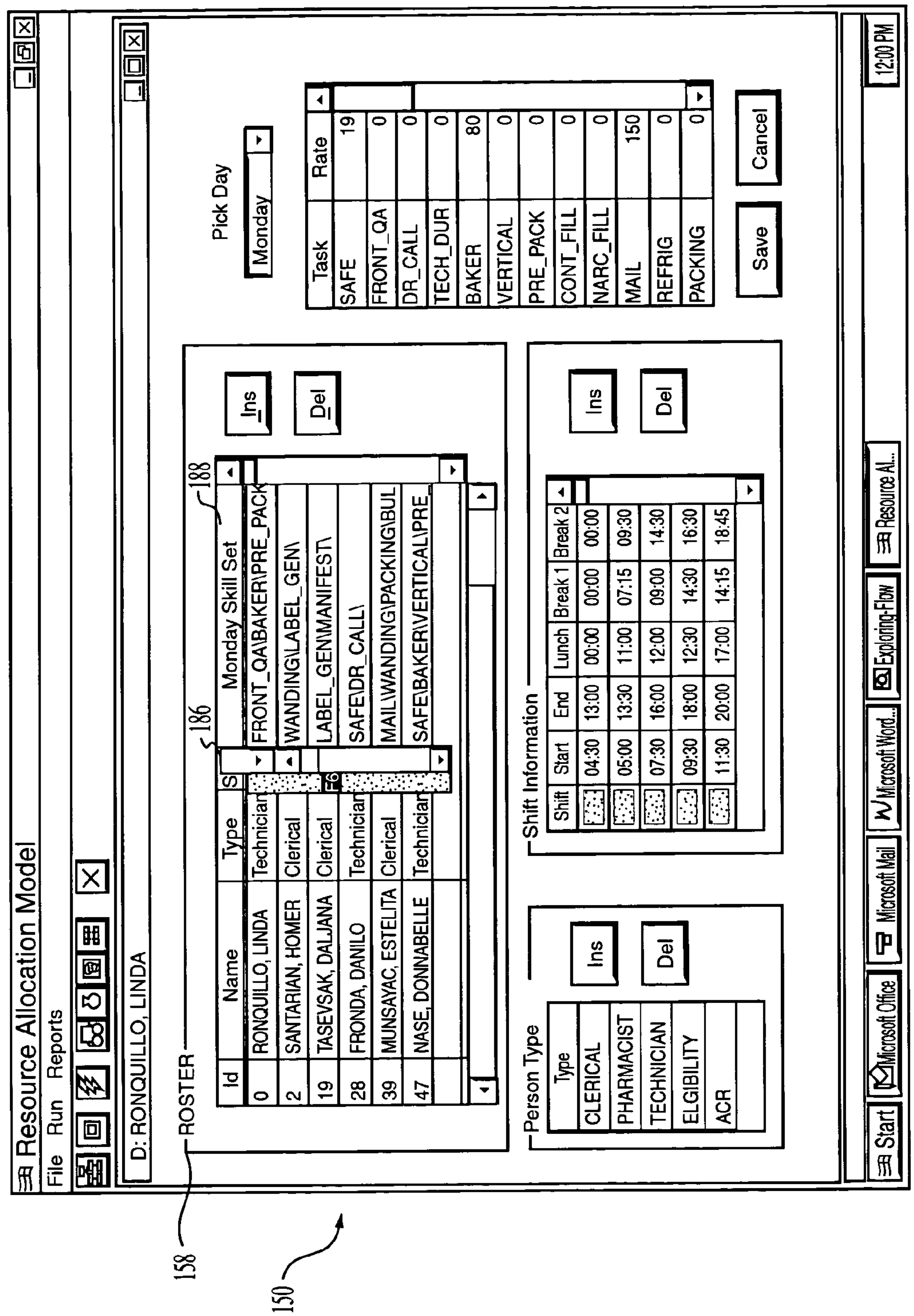
FIG. 16 is an illustration of an example of the Schedule section in the resource allocation model with the Shift activated.

By double-clicking on a cell beneath the Shift column heading, a menu appears showing the different types of shifts. If a worker were to change from one shift to another, then the user would double-click on Shift and then select the appropriate type of shift. To review how each Shift is defined, scroll through the Shift Information 186. An example of the Schedule section in the RAM, with the Shift, activated is illustrated in FIG. 16.

Figure 17:
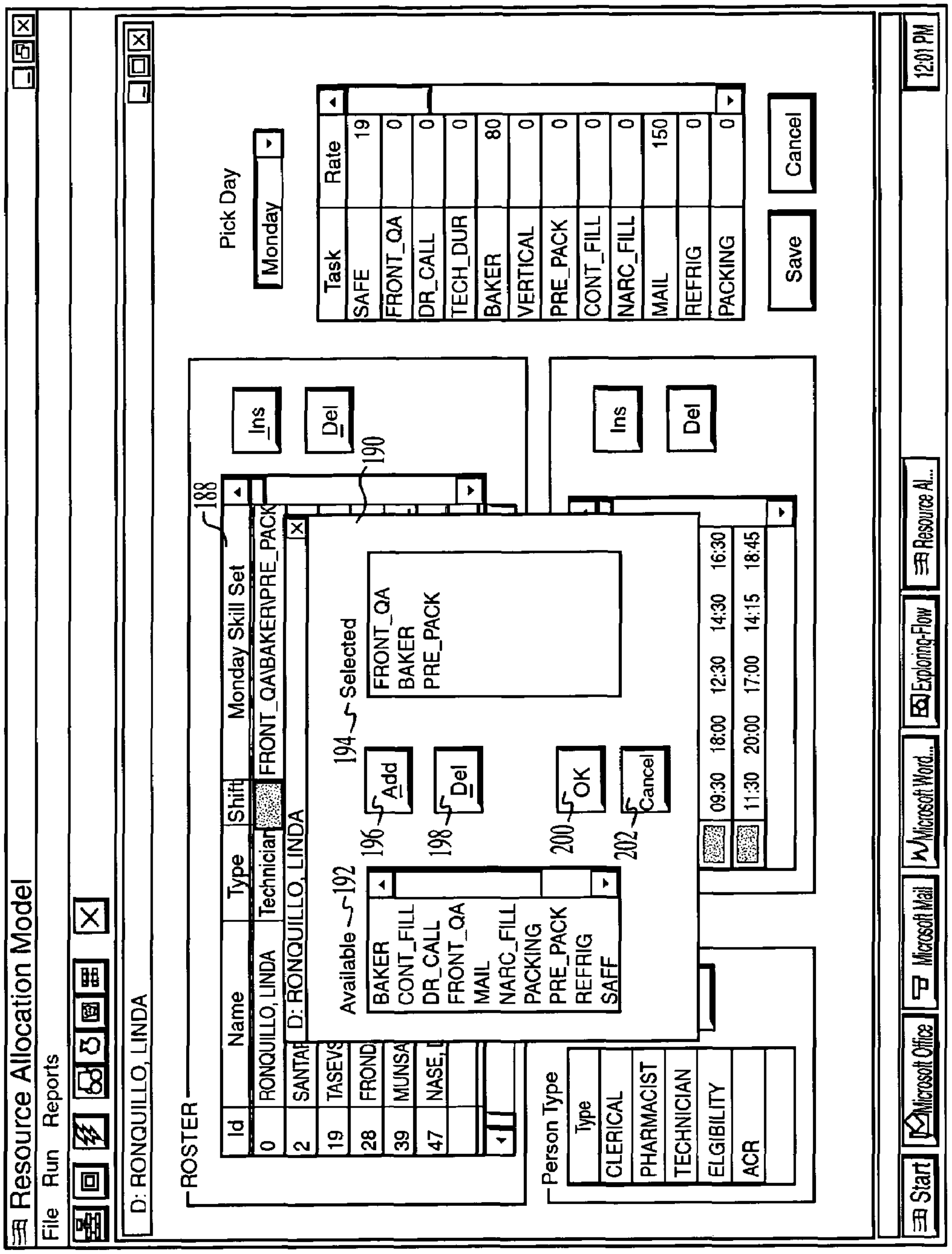
FIG. 17 is an illustration of an example of the Schedule Section in the resource allocation model with the Day Skill Set activated.

By double-clicking on a cell beneath the (Day) Skill Set column heading 188 (illustrated in FIGS. 16–17), a menu 190 appears showing two windows and four buttons as illustrated in FIG. 17. The Available window 192 shows the type of skills that this particular worker has and the Selected window 194 shows the type of skills that the worker will utilize.

An example of the Schedule Section in the RAM, with the (Day) Skill Set activated is illustrated in FIG. 17.

To Add a Skill

1. Click on the skill that is to be added from the Available window 192.
2. Click the Add button 196.
3. Click the OK button 200.

To Delete a Skill

1. Click on the skill that is to be deleted from the Selected window 194.
2. Click the Del button 198.
3. Click the OK button 200.

To Cancel Any Changes

Click the Cancel button 202.

The Reports section is divided into four different types of reports: Rx Cum report, Rx Prox report, People report, and a Gantt chart. The reports section displays the information that is generated by RAM, which uses the data inputs from the Flow and Schedule sections.

Rx Cum Report

The Rx Cum report displays the number of RX's in queue per task for each 15 minutes increment of the workday. To close the RxCum report, click the Close button.

Figure 18:
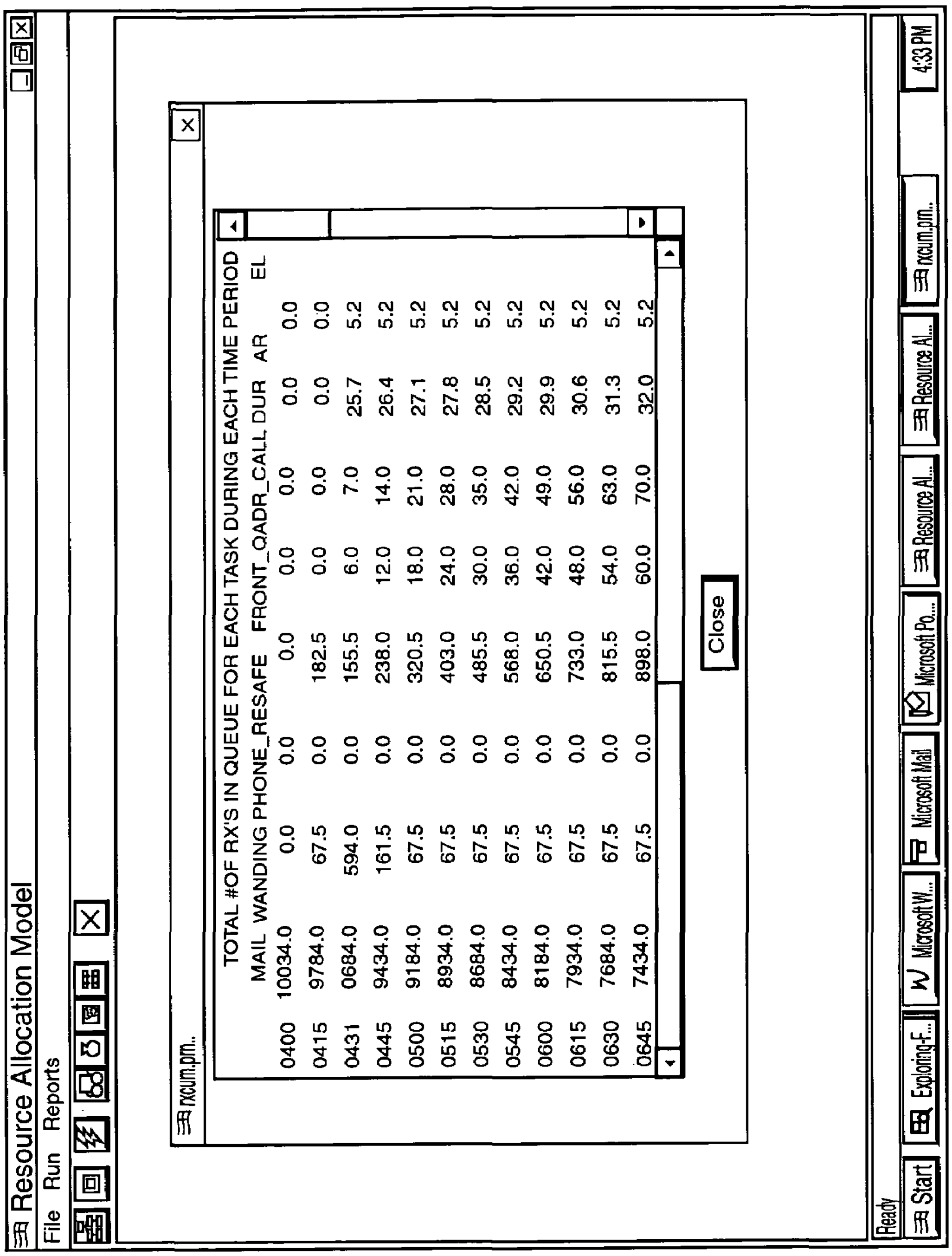
FIG. 18 is an illustration of an example of an RX Cum report.

An example of an RX Cum report is illustrated in FIG. 18.

Rx Proc Report

Figure 19:
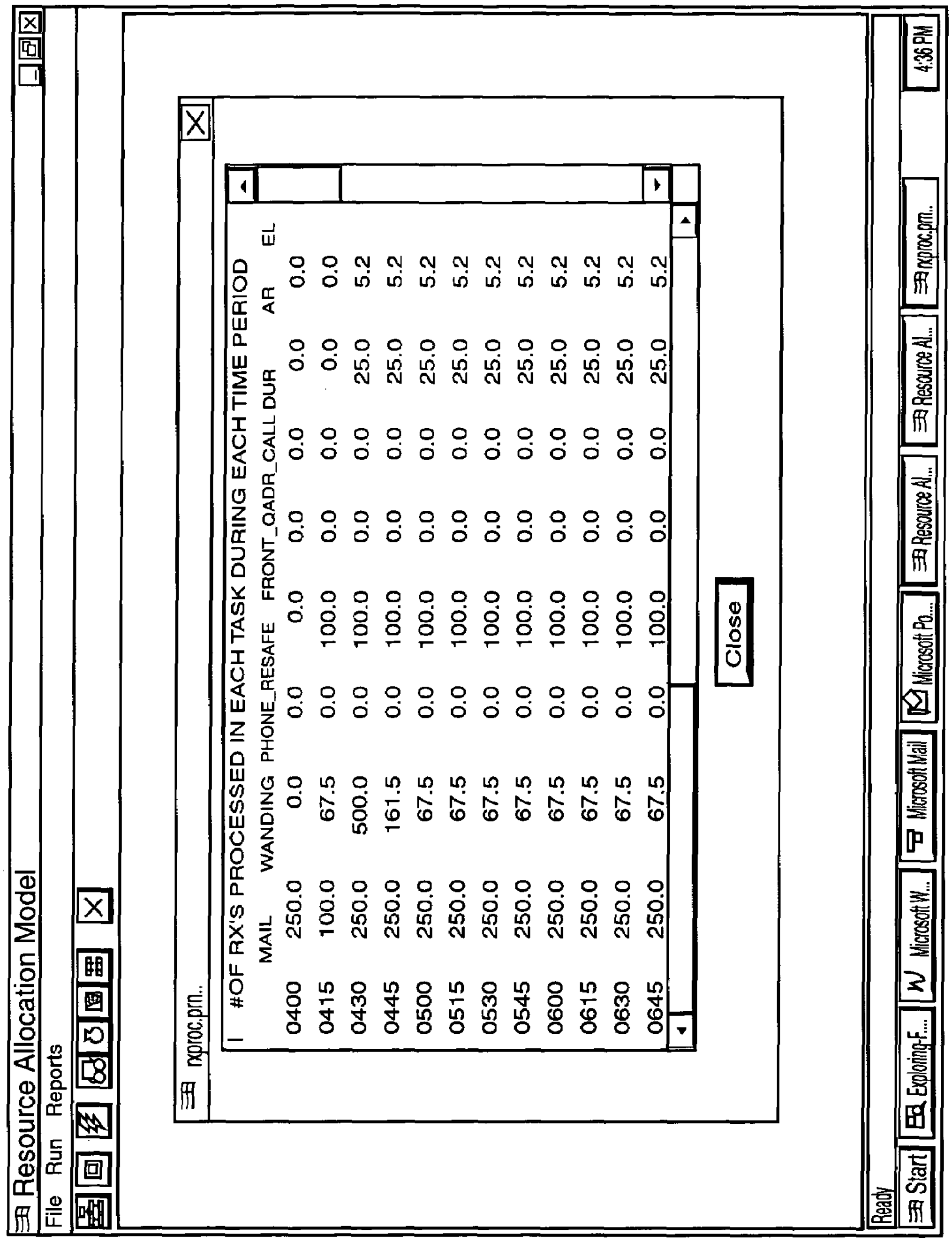
FIG. 19 is an illustration of an example of an Rx Proc report.

The Rx Proc report displays the number of Rx's that have been processed per Task during each 15 minute increments of the workday. To close the Rx Cum report, click the Close button. An example of an Rx Proc report is illustrated in FIG. 19.

People Report

Figure 20:
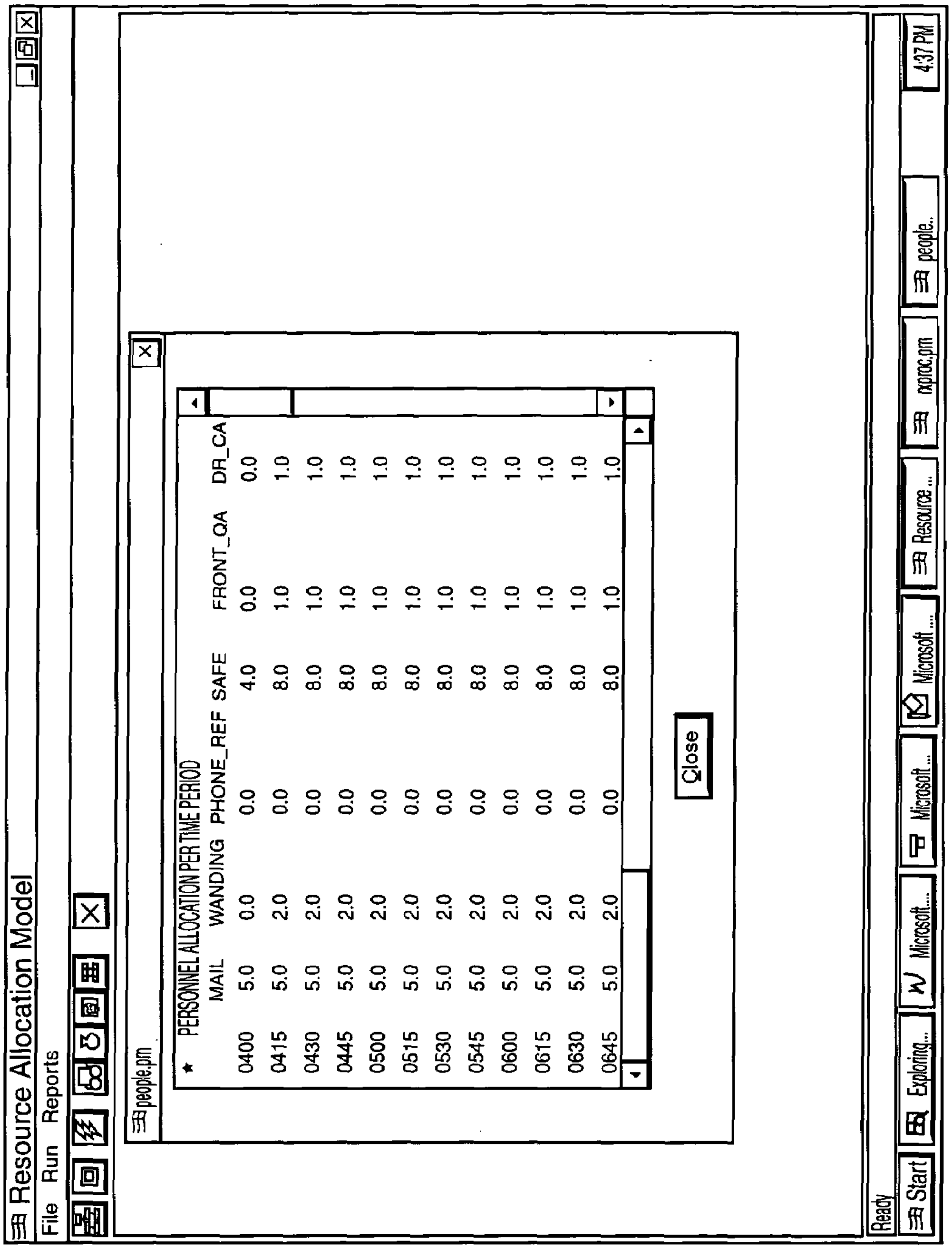
FIG. 20 is an illustration of an example of a People report.

The People report displays the number workers in each Task during each 15 minute increment of the workday. To close the Rx Cum report, click the Close button. An example of a People report is illustrated in FIG. 20.

Gantt Chart

The Gantt chart displays the schedule of Tasks to be performed by each worker in 15 minute increments during the workday. The Gantt chart can be printed, saved and/or stored electronically, as well as other reports. To print a Gantt chart, click on File and then click on Print. To save a copy of the Gantt chart, click on File, click on Save As. Type in a name that you want to save the chart under, and then press Enter.

To close the Gantt chart, click on File and then click on Exit.

Figure 21:
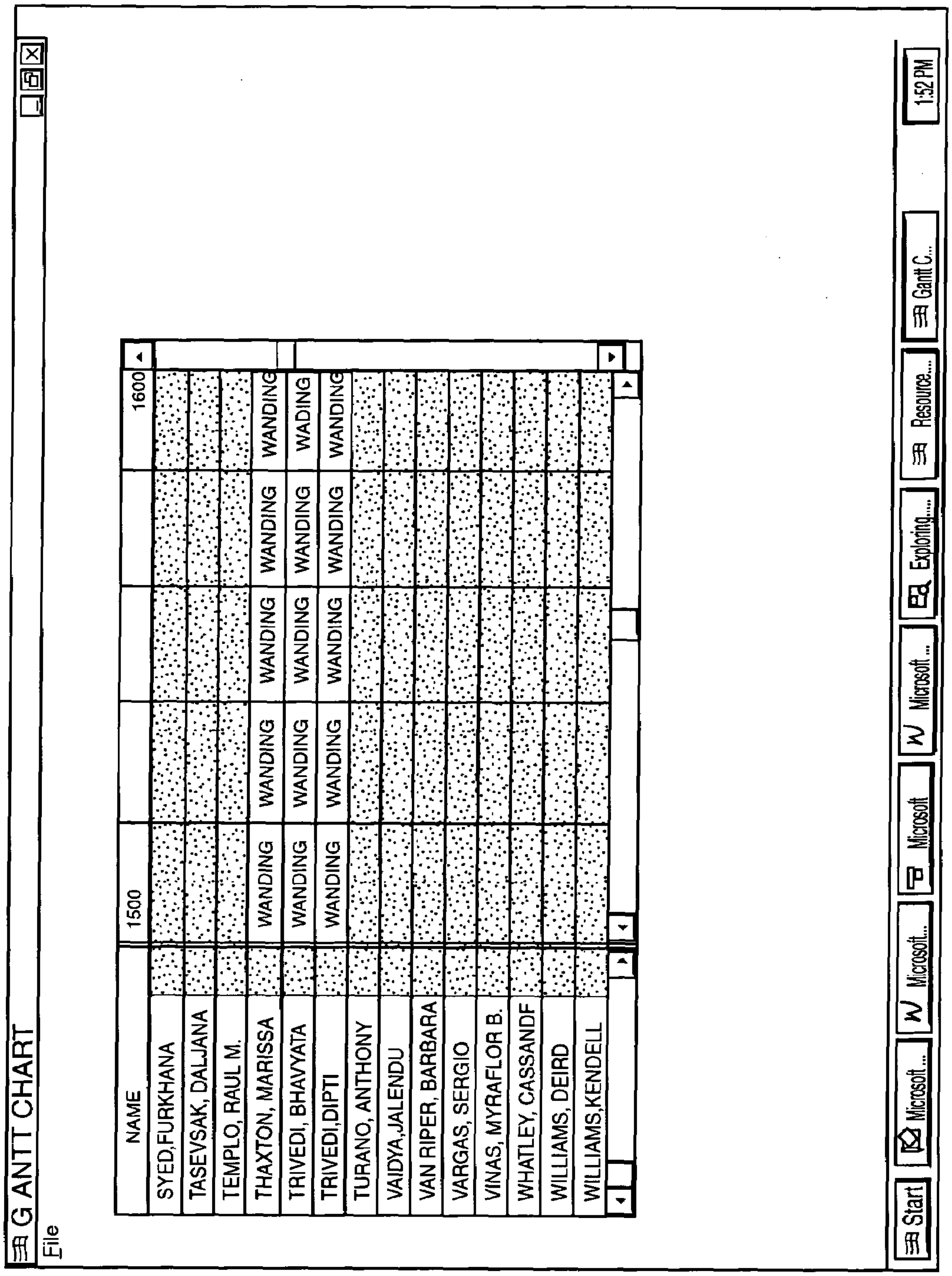
FIG. 21 is an illustration of an example of a Gantt chart.

An example of a Gantt Chart is illustrated in FIG. 21.

Figures 1, 22:
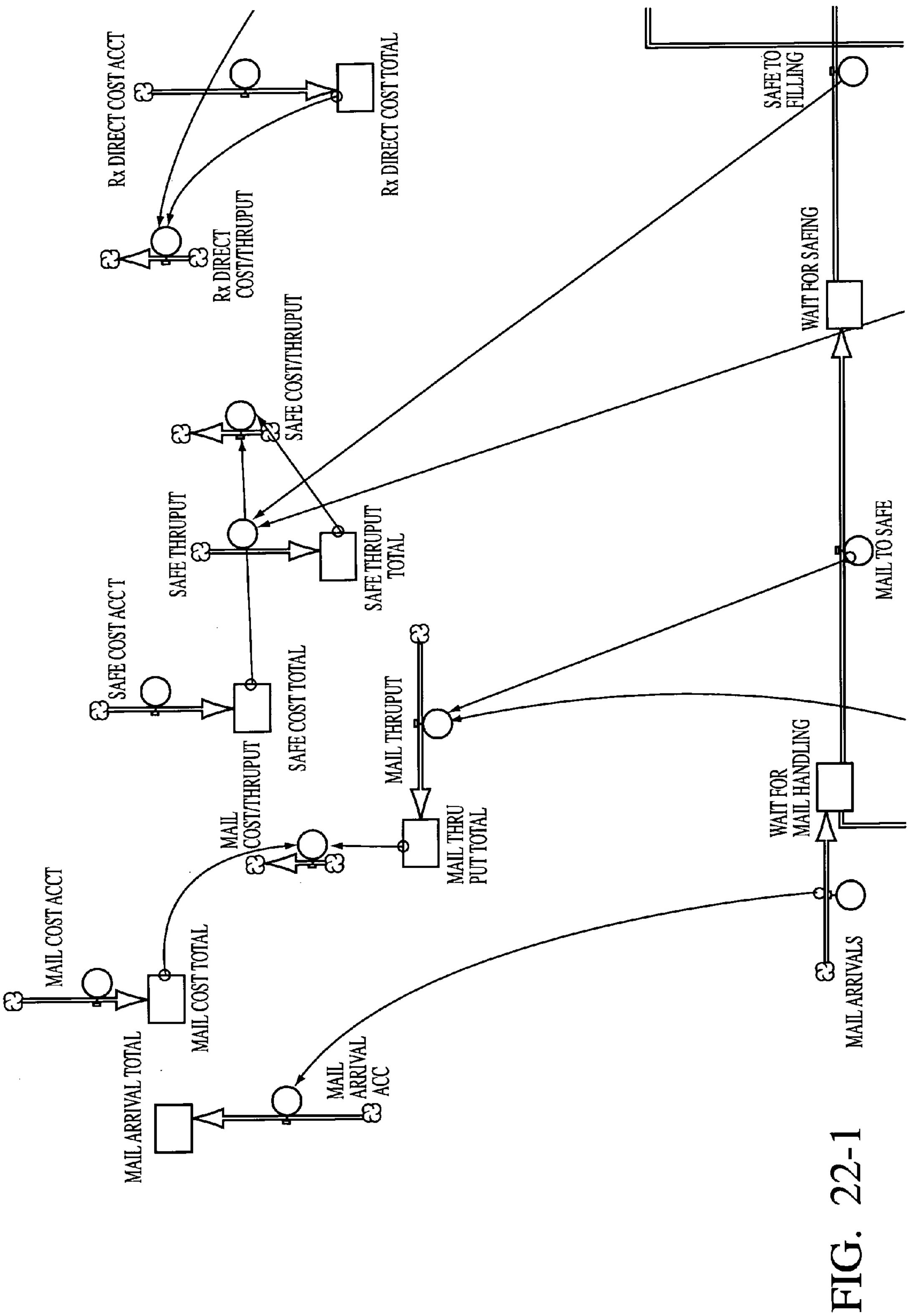
FIGS. 22–26 are block diagrams of simulation models used to simulate different stages of the pharmacy network.
Figures 2, 22:
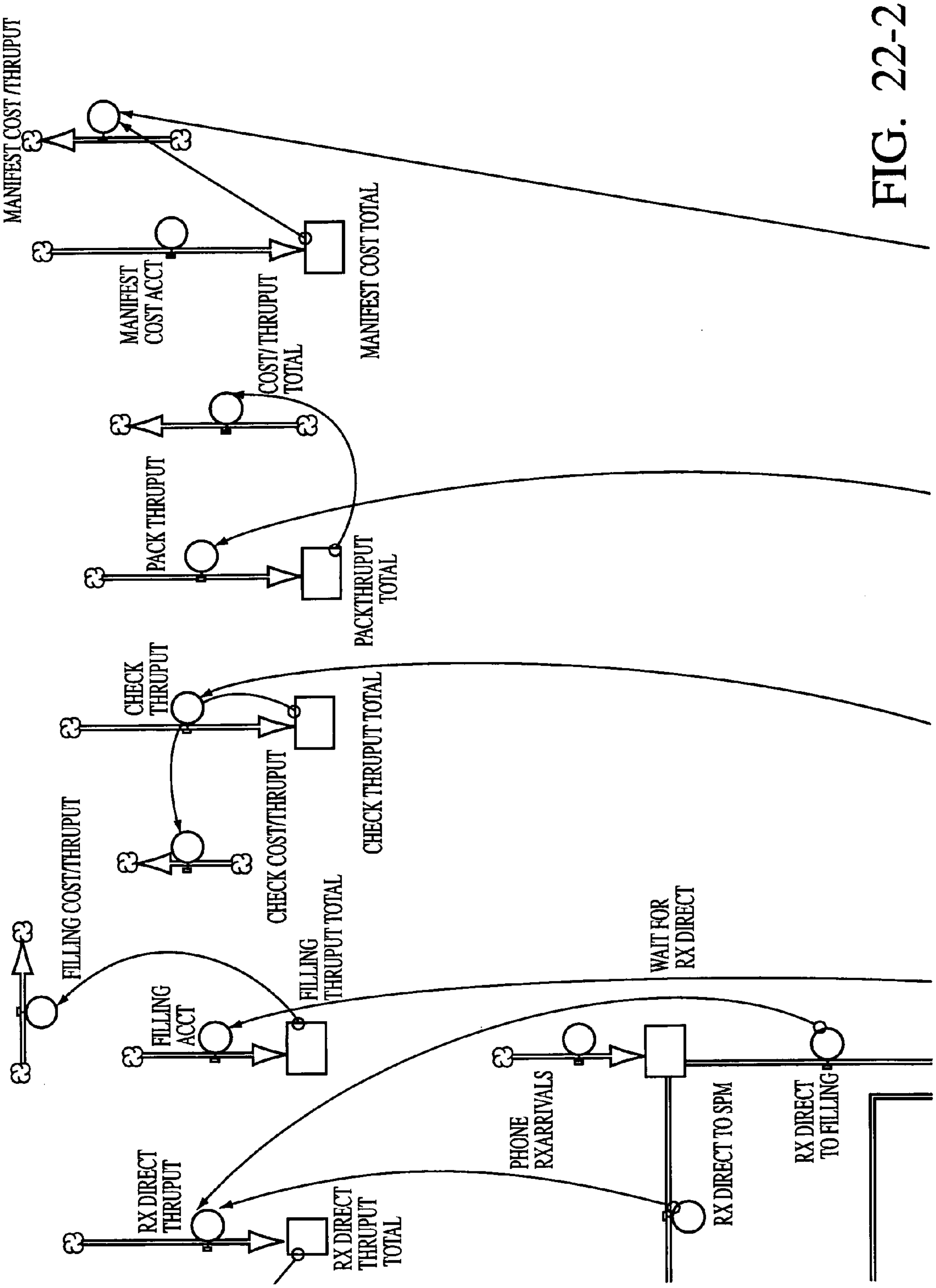
Figures 3, 22:
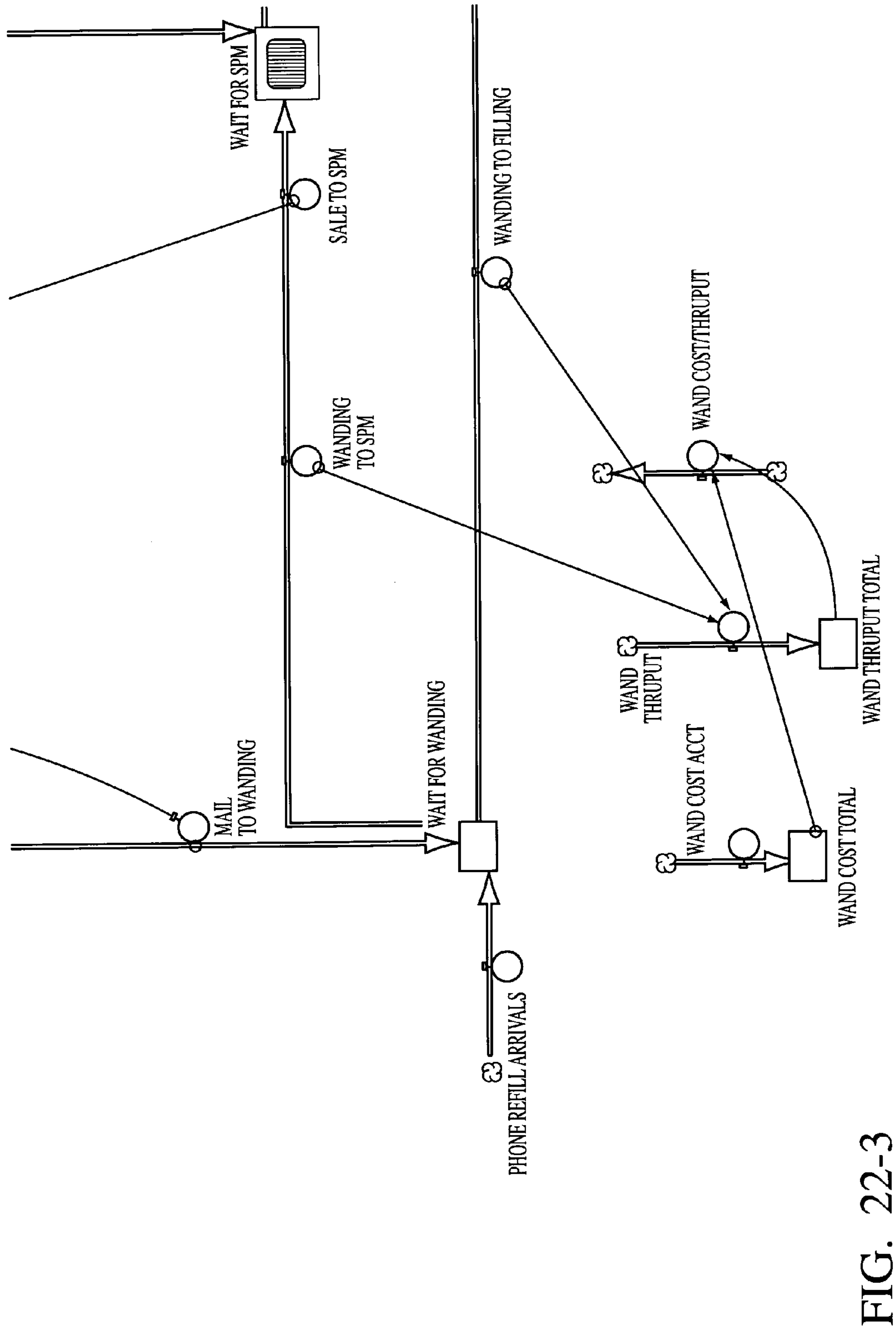
Figures 4, 22:
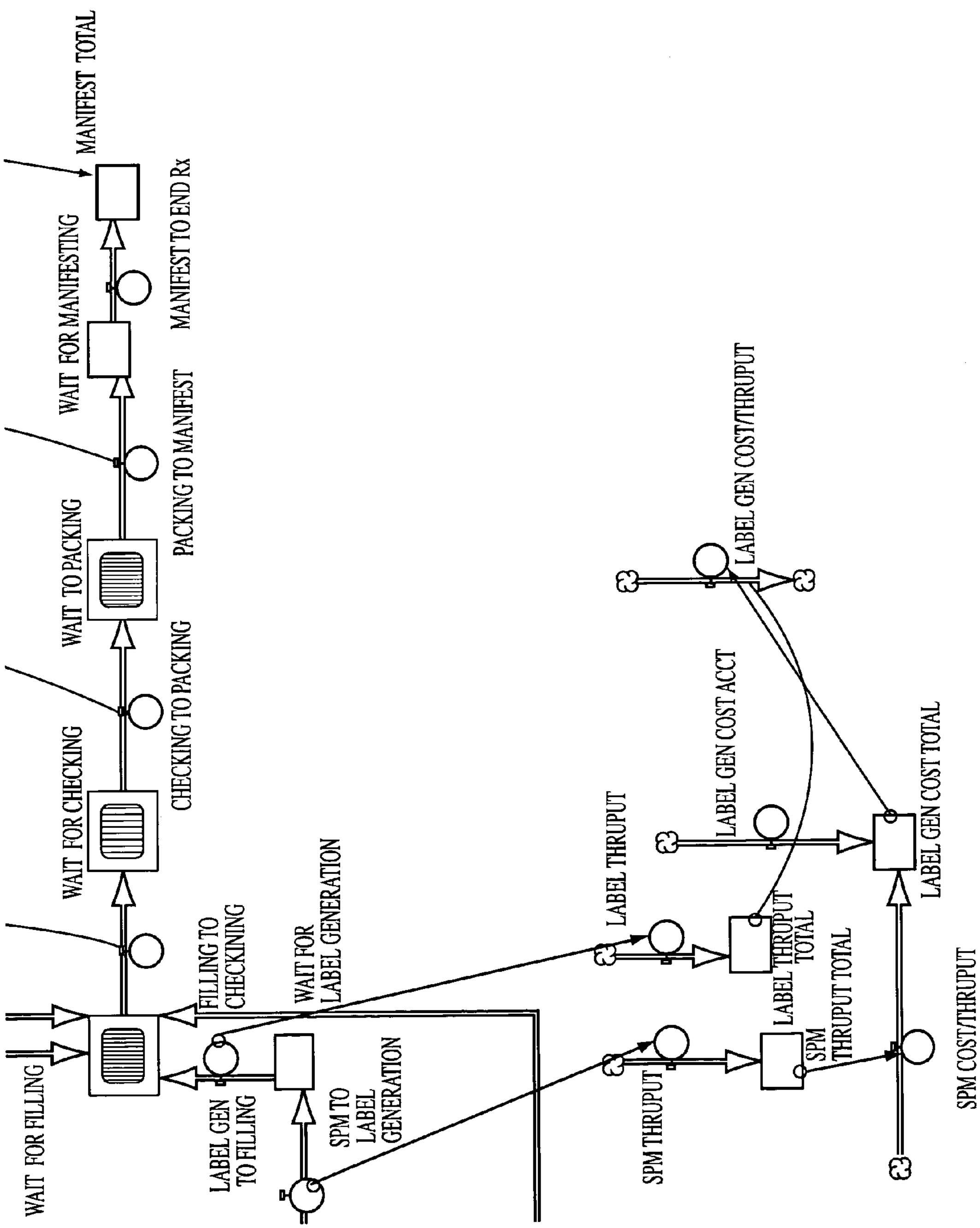
Figure 23:
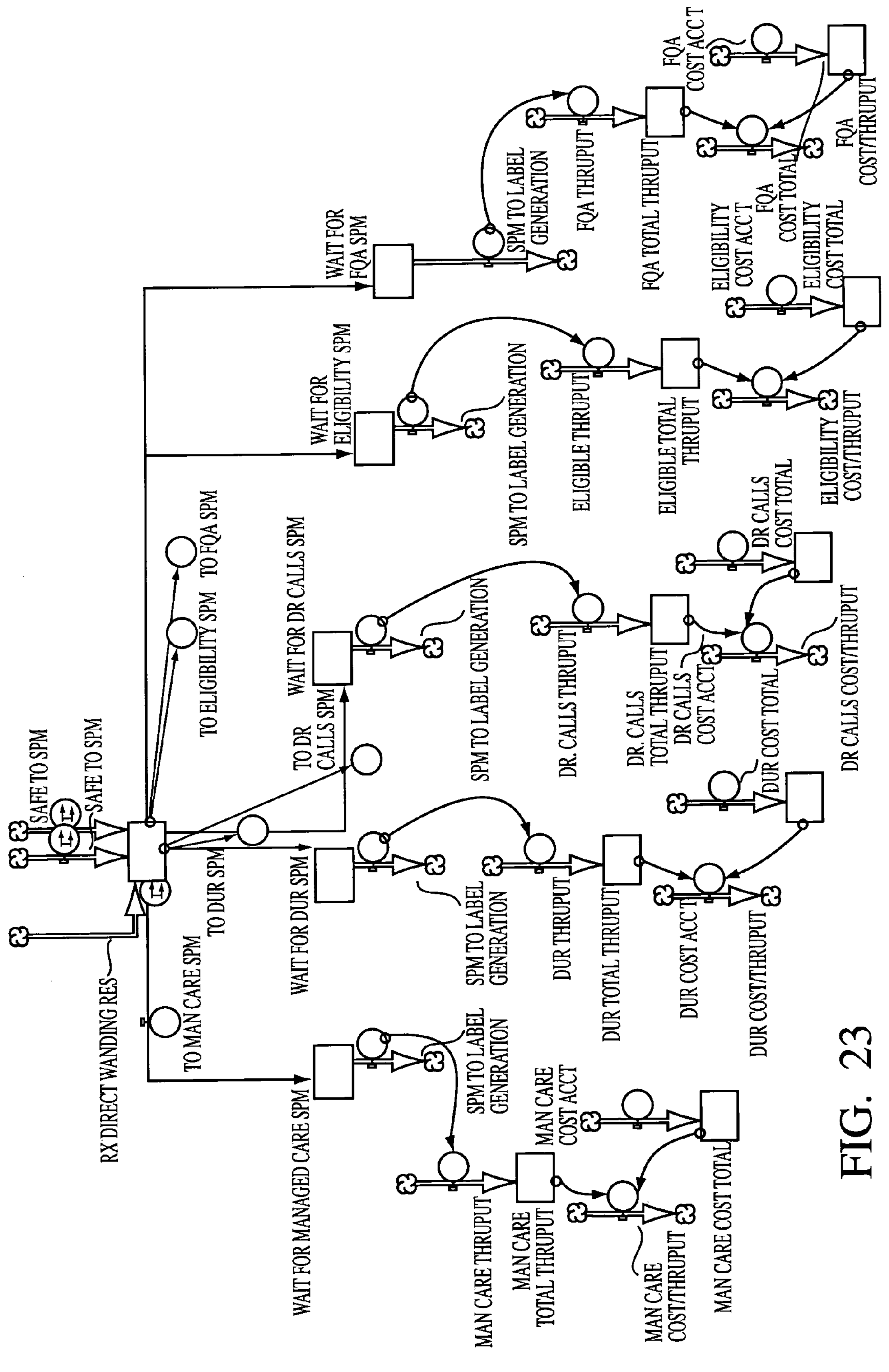
Figure 24:
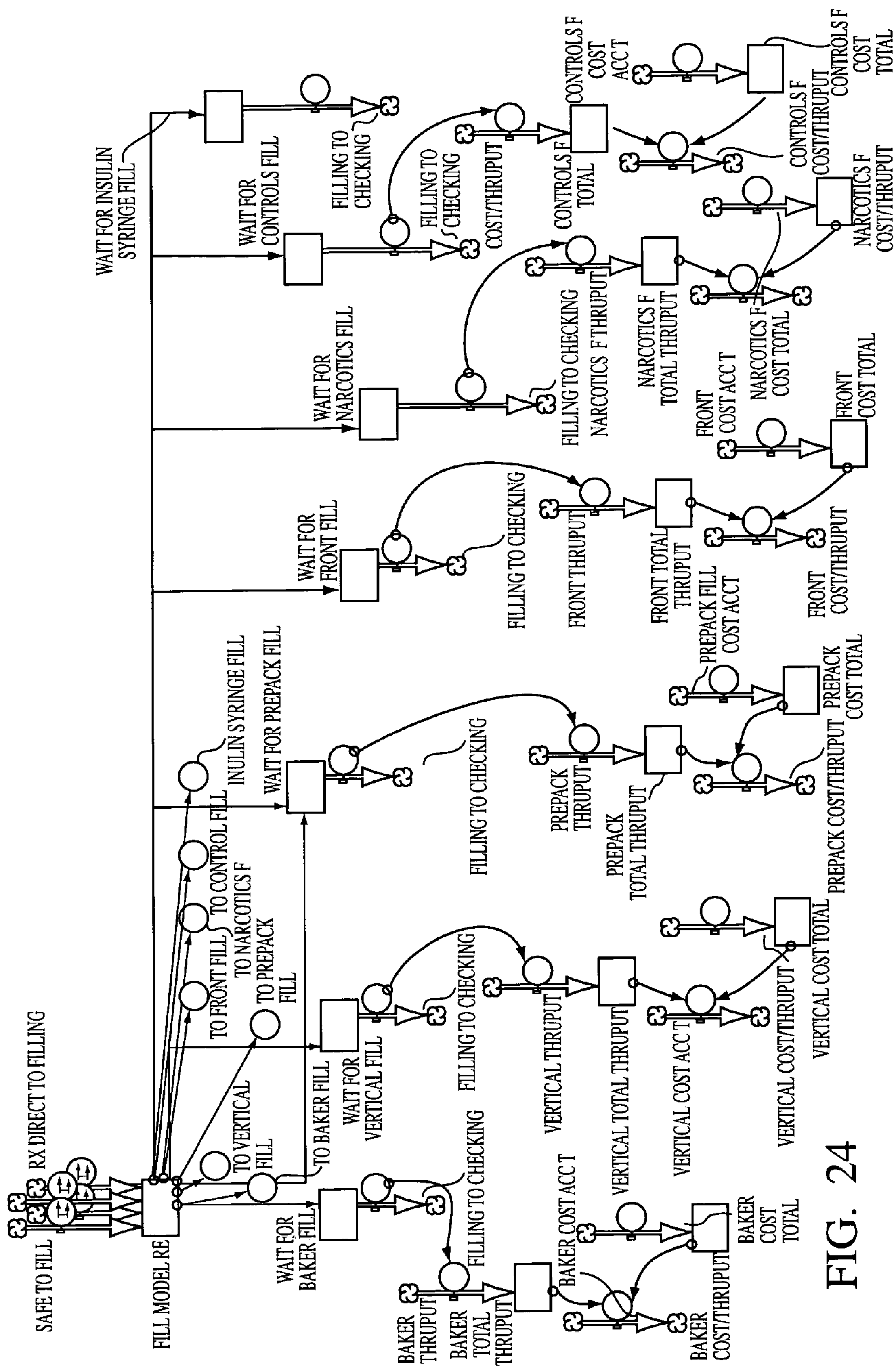
Figure 25:
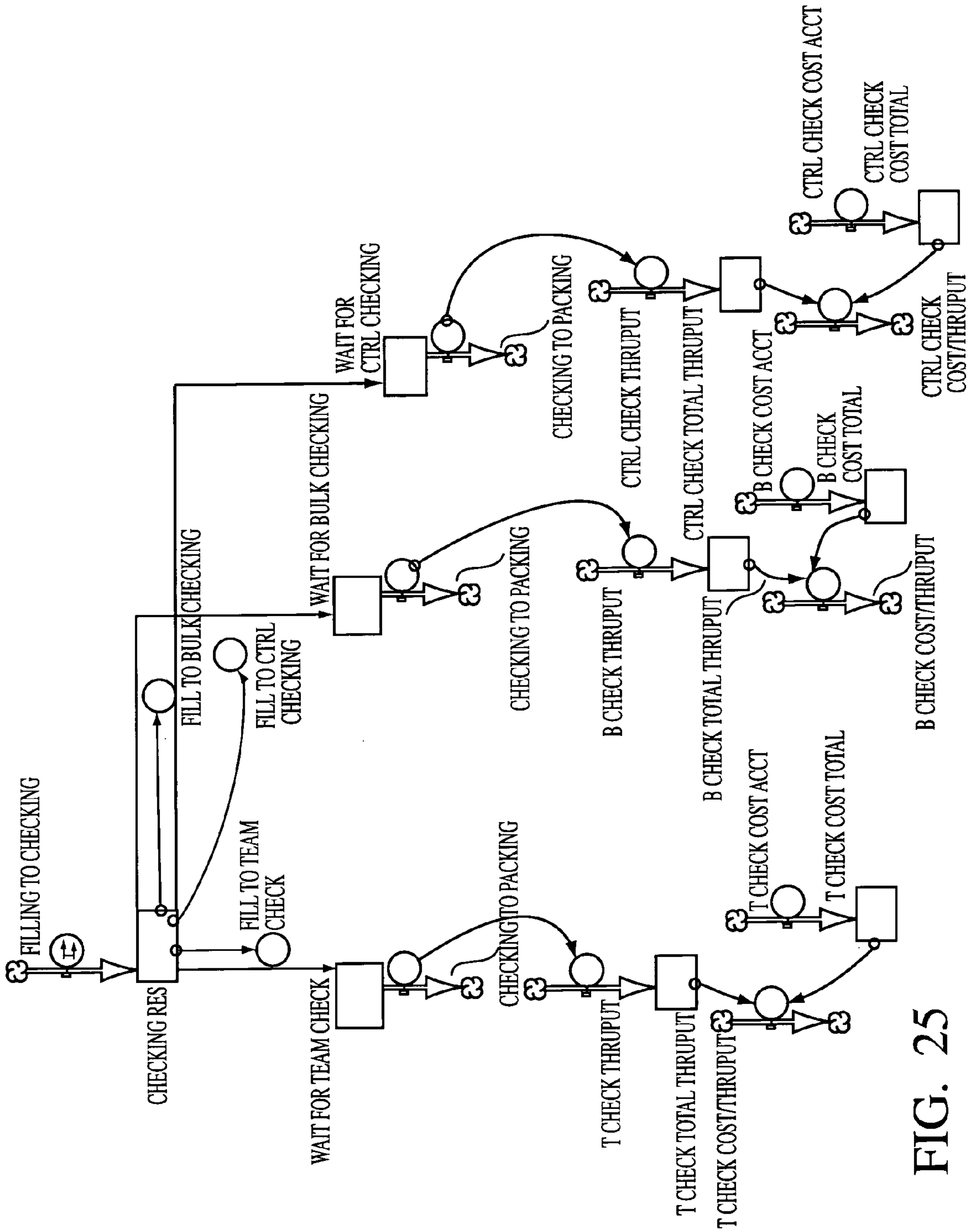
Figure 26:
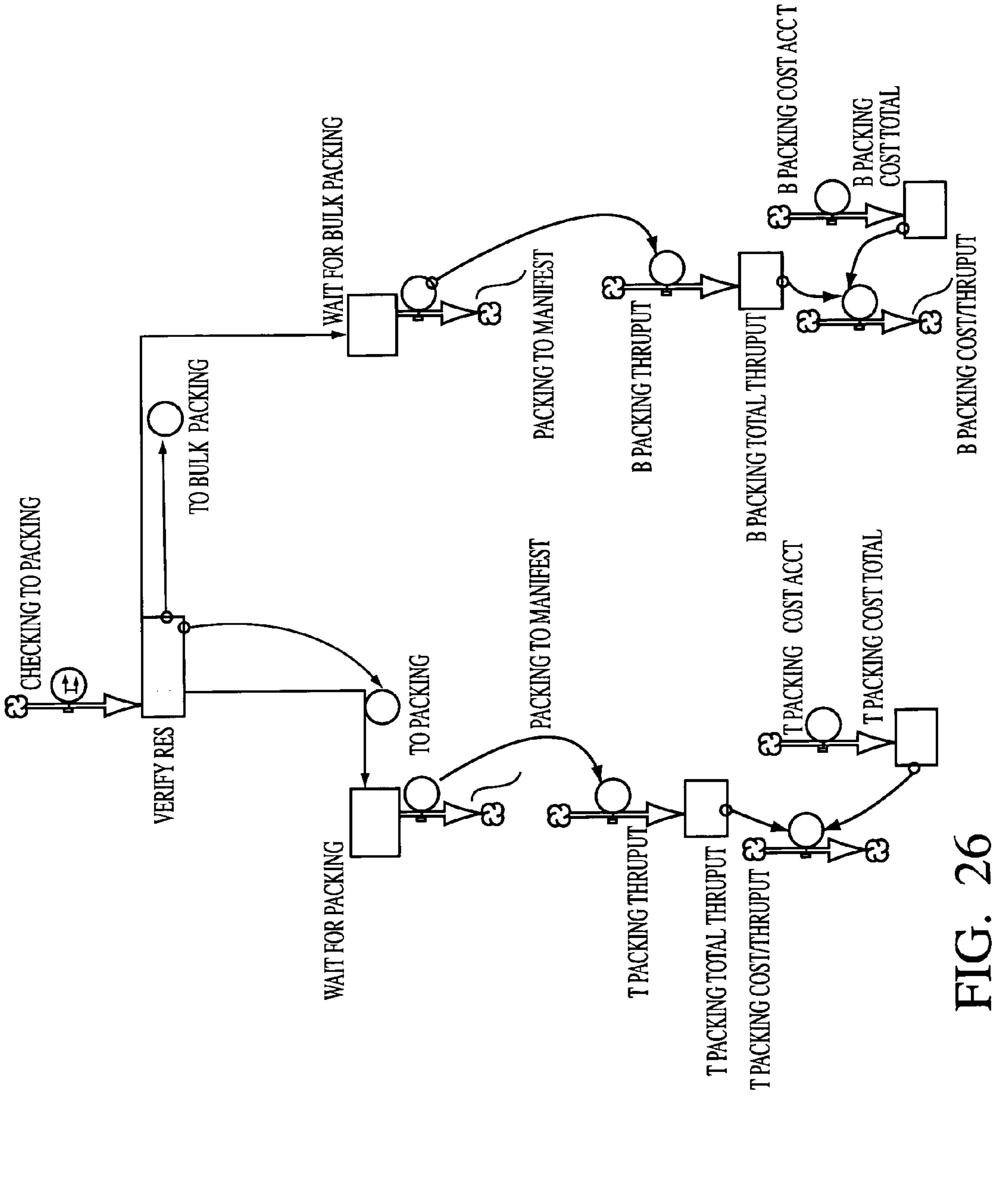
Figure 27:
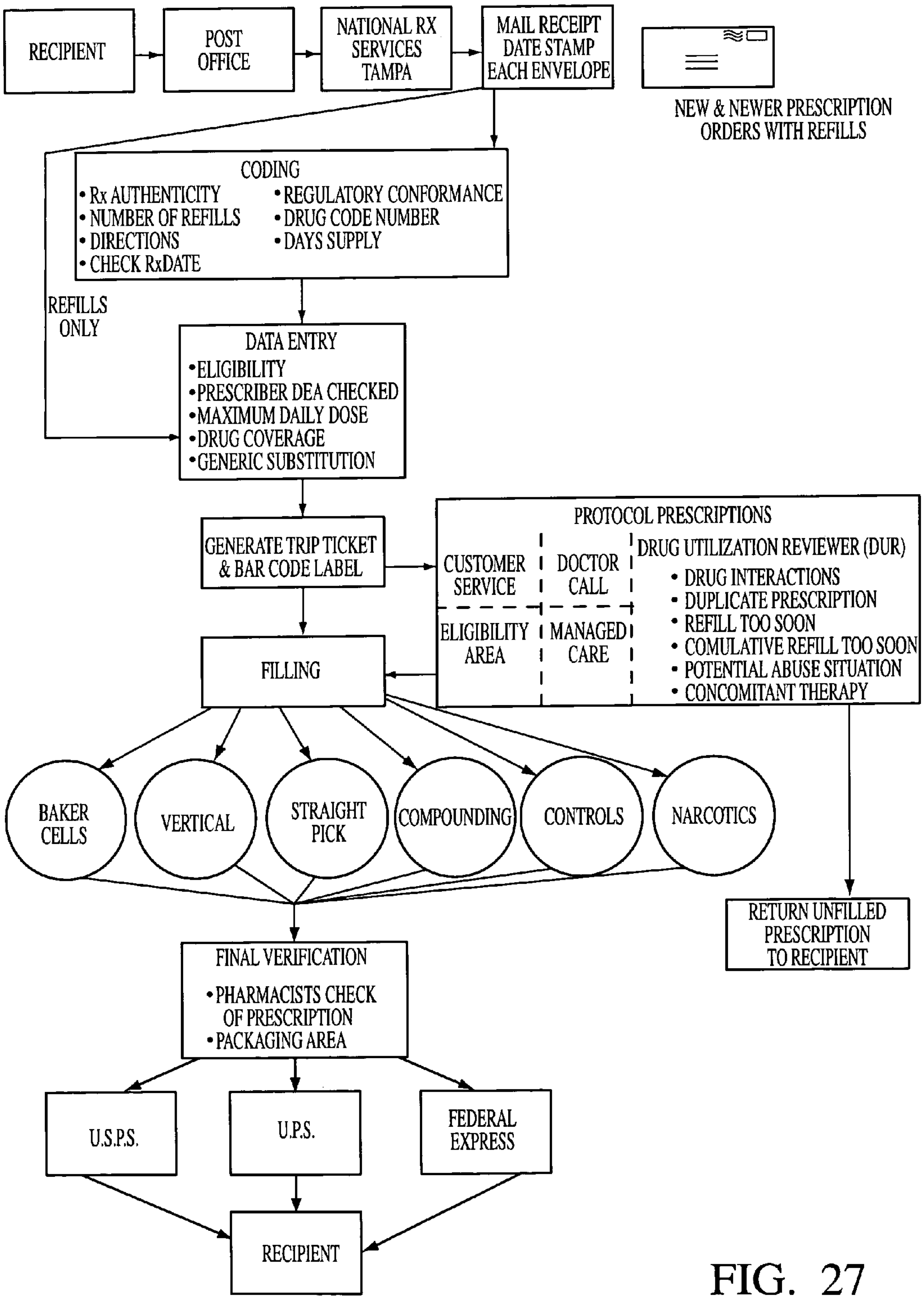
FIGS. 27–36 are flow charts illustrating additional pharmacy operation examples used in the present invention.
Figure 28:
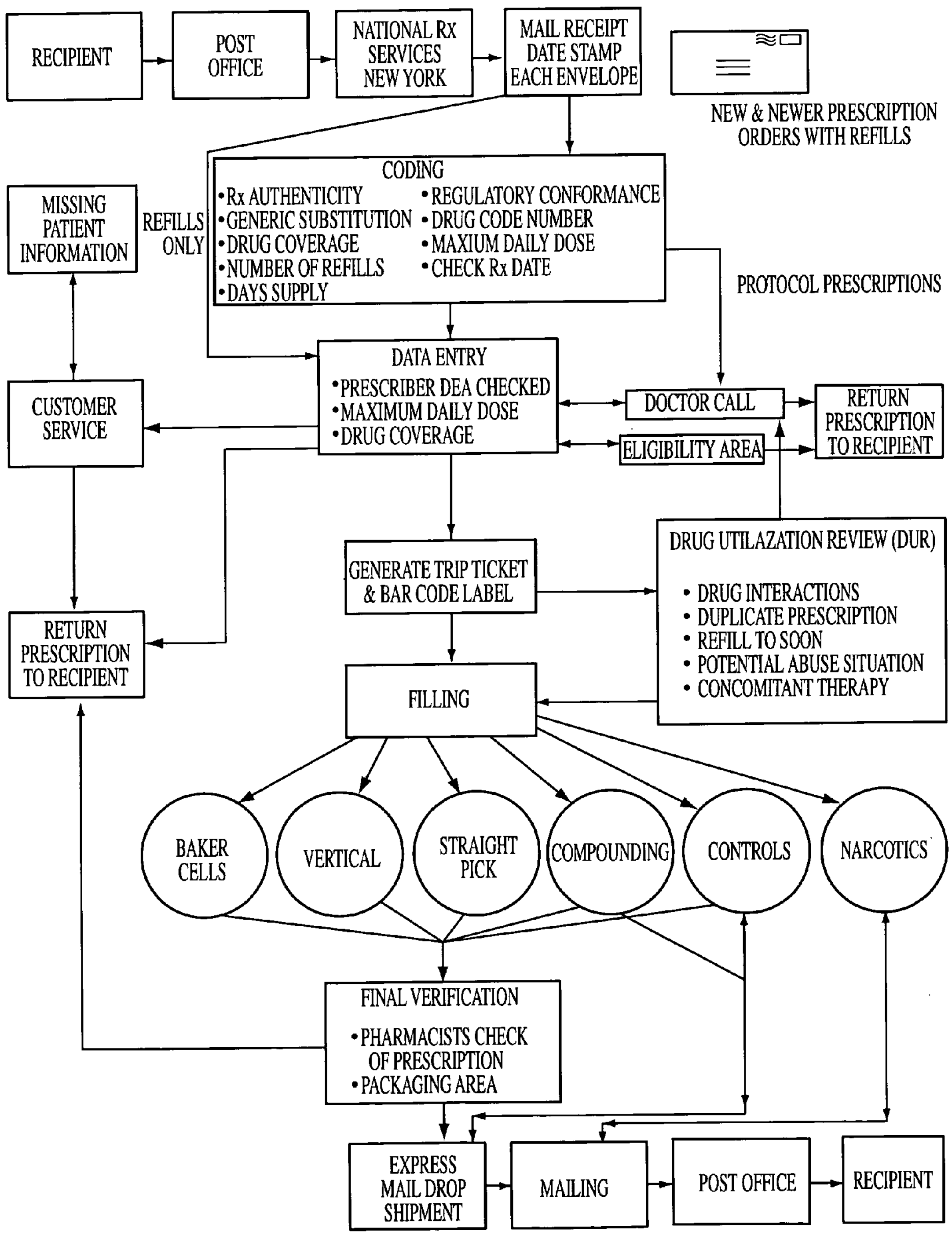
Figure 29:
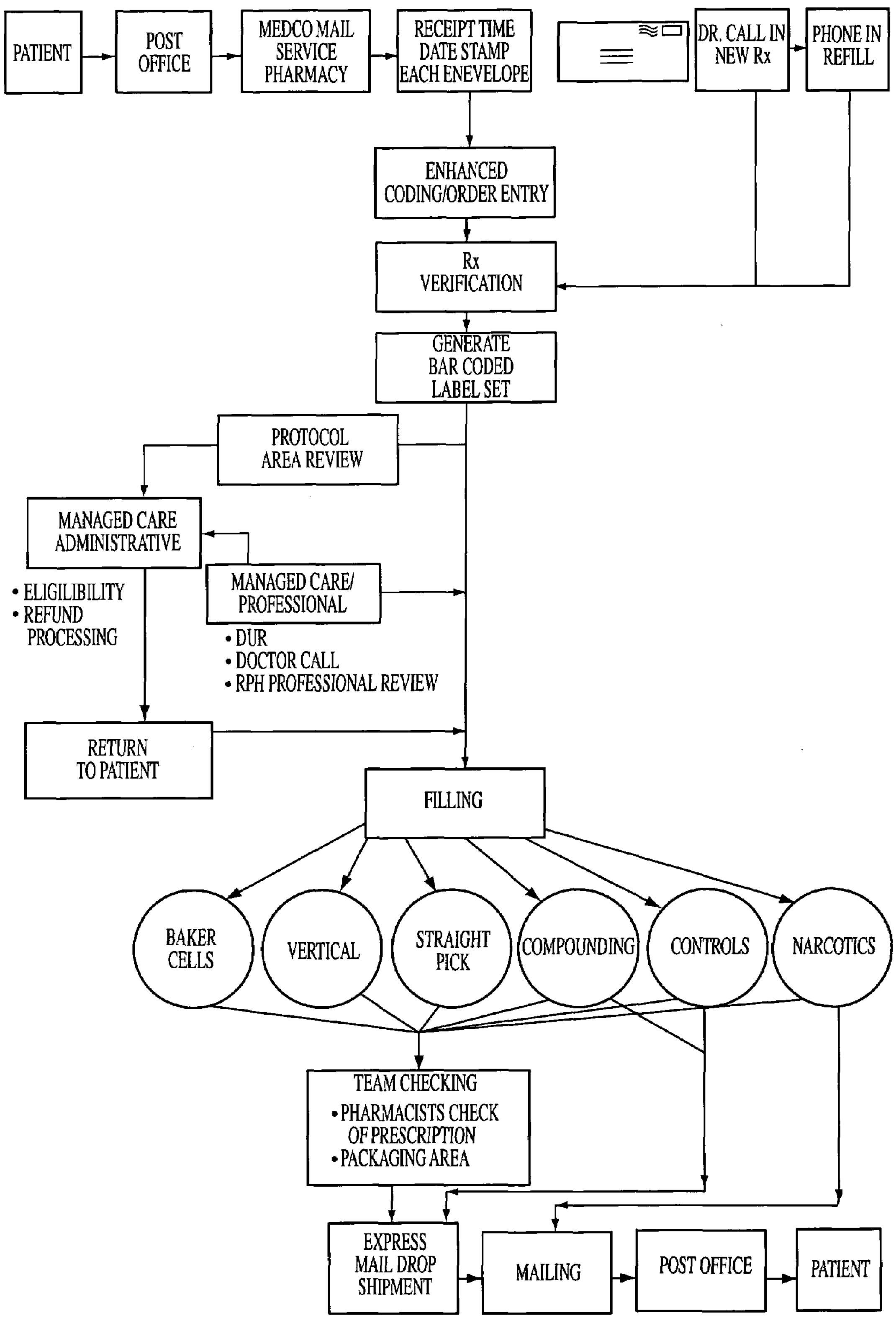
Figure 30:
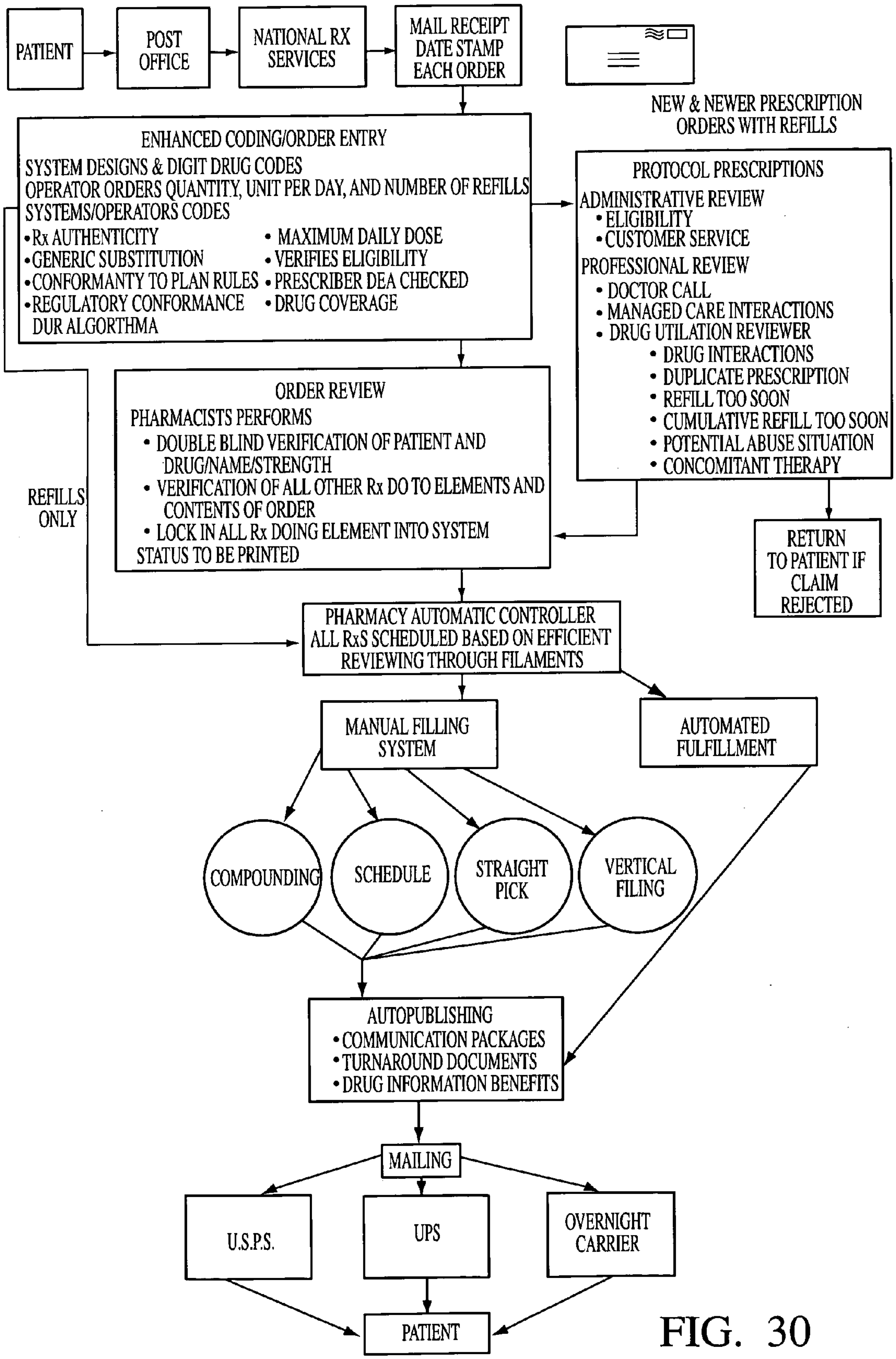
Figure 31:
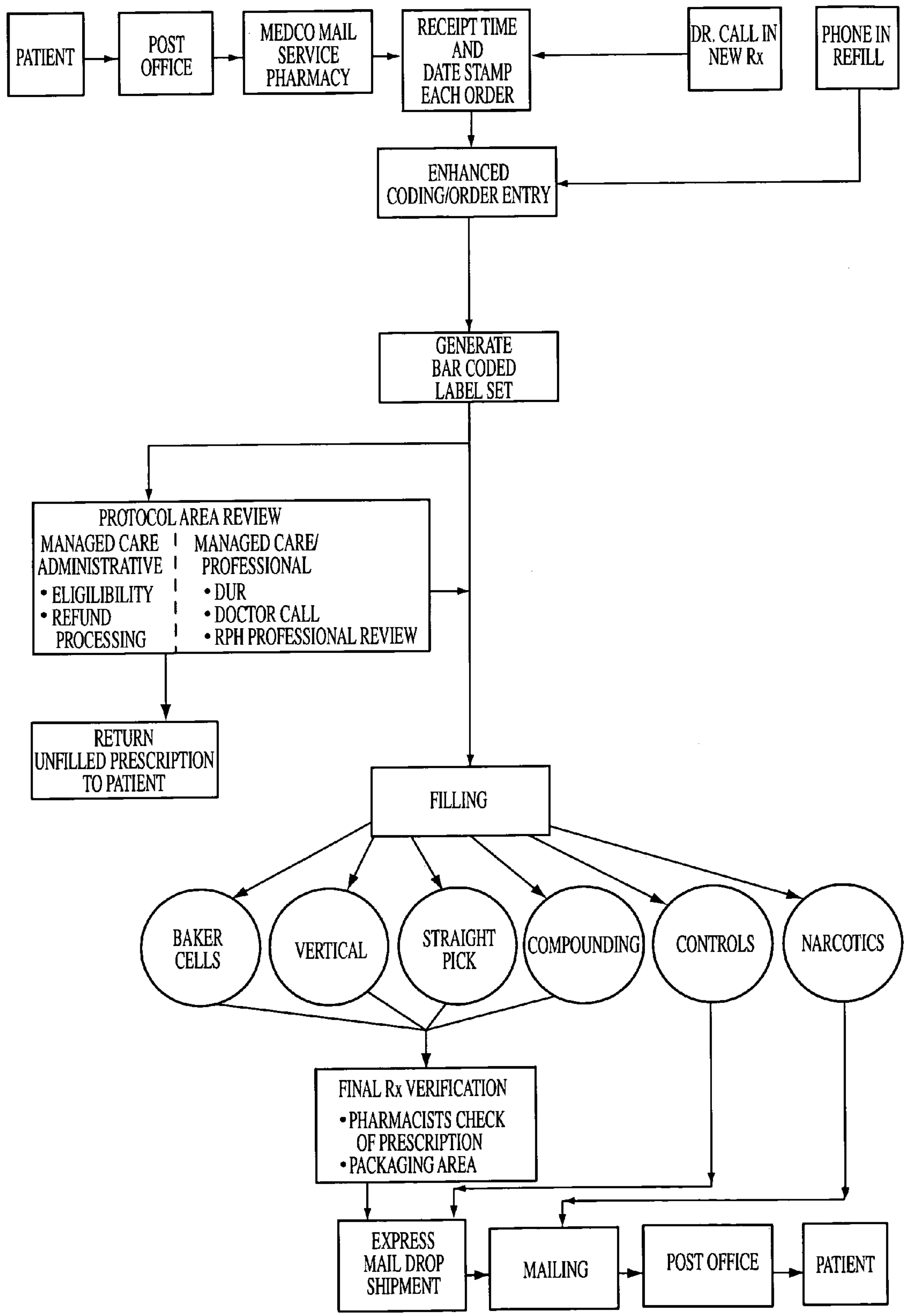
Figure 32:
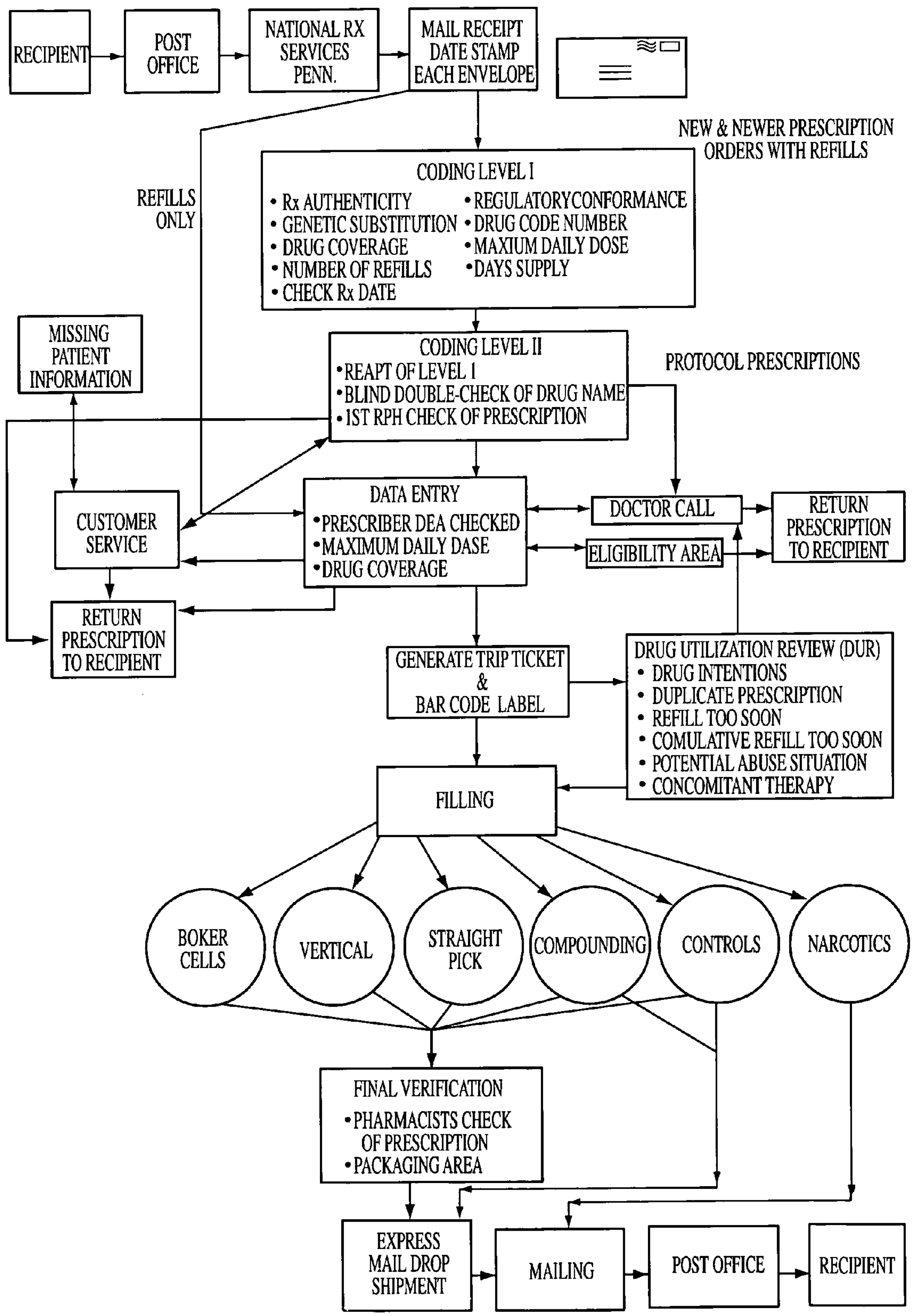
Figure 33:
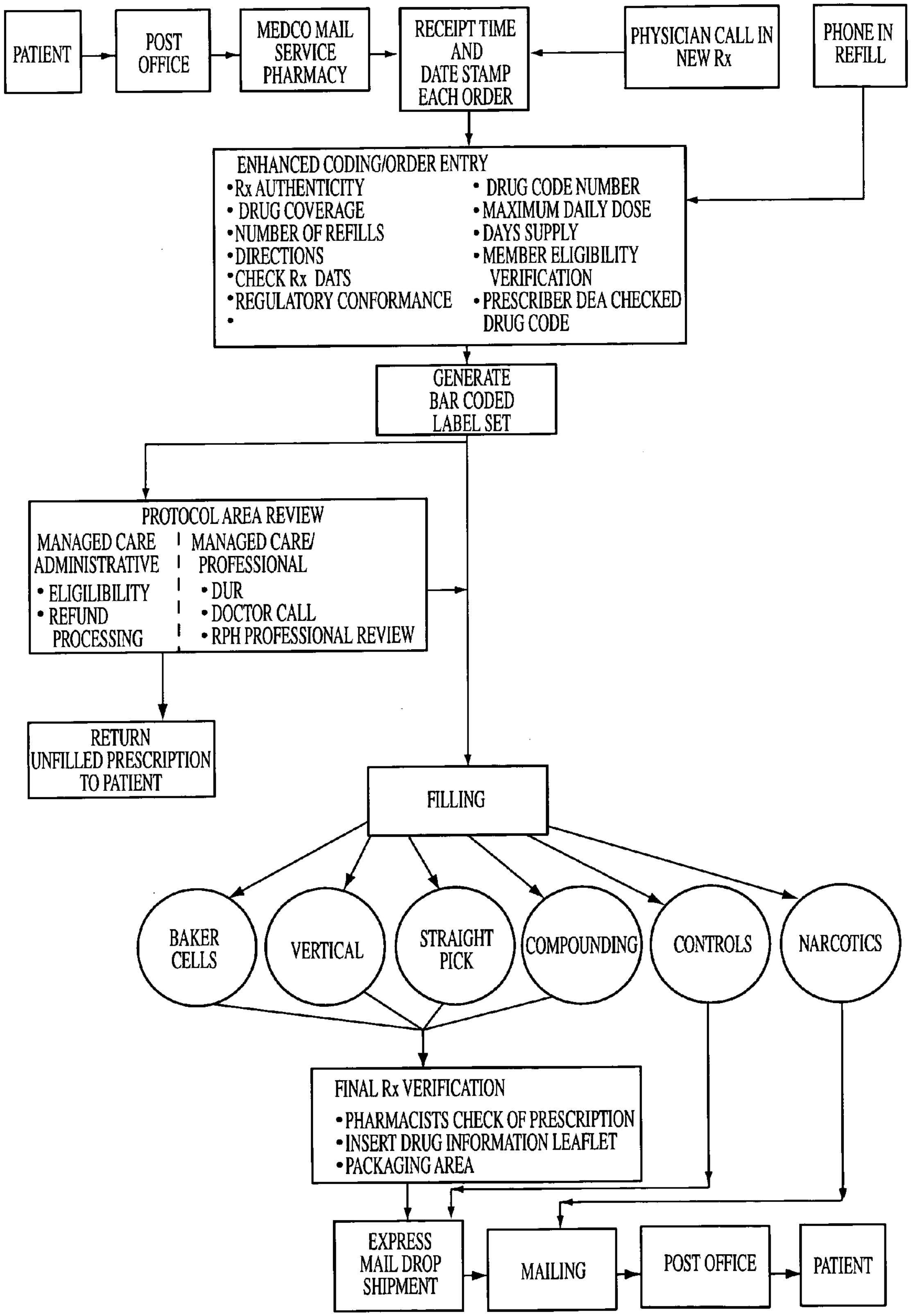
Figure 34:
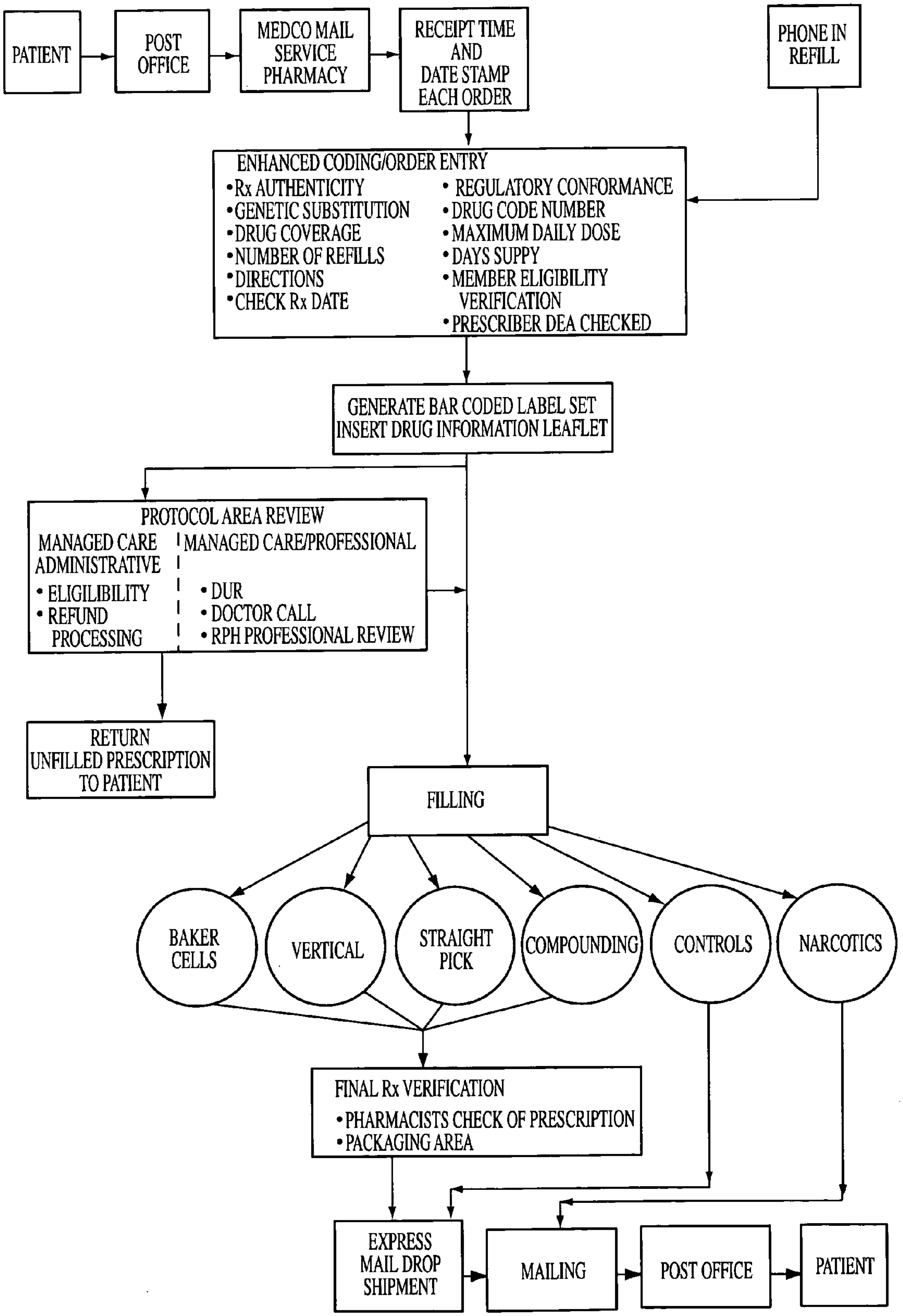
Figure 35:
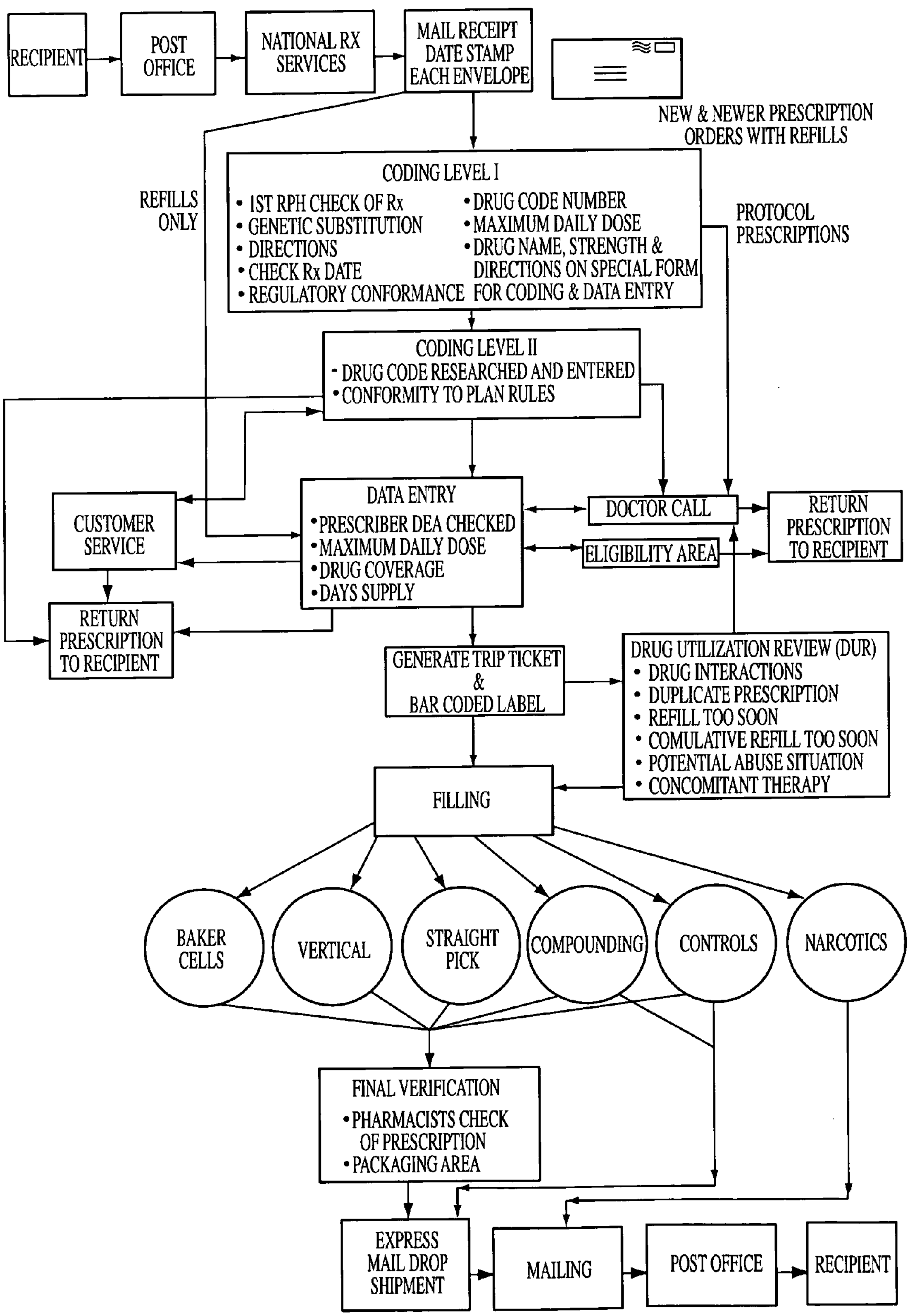
Figure 36:
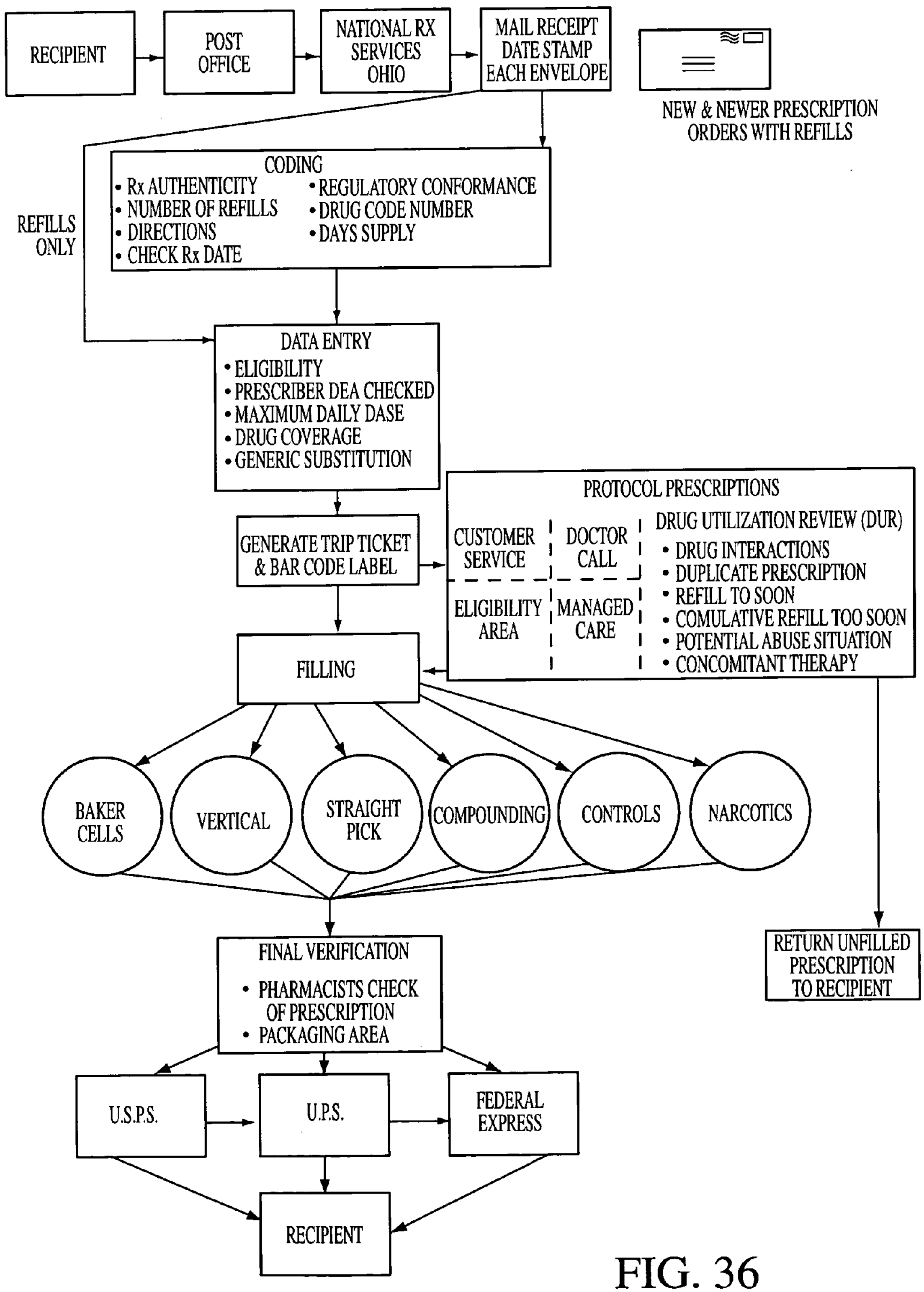
Figures 1, 37:
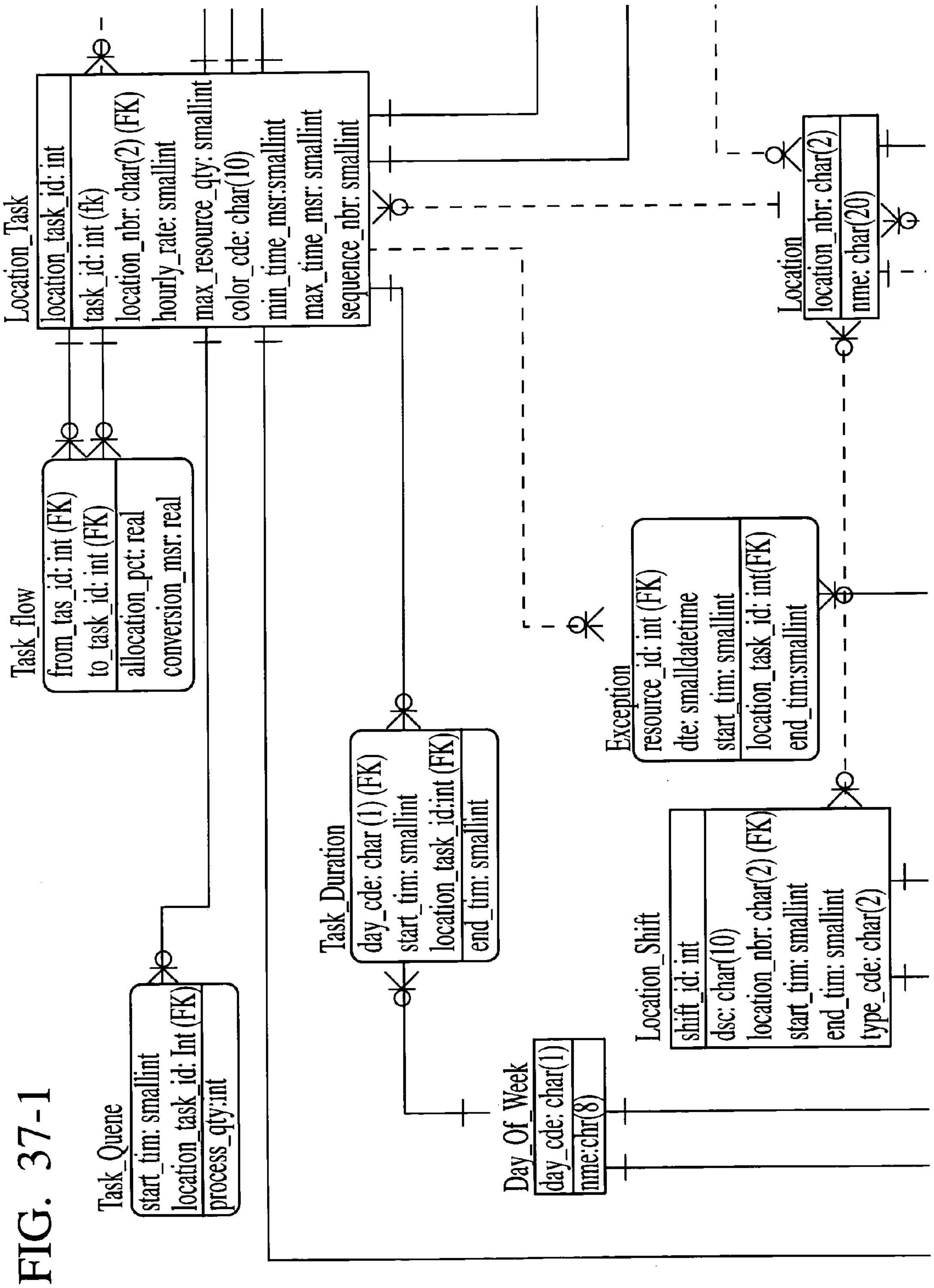
FIG. 37 is a data model of the resource allocation model.
Figures 2, 37:
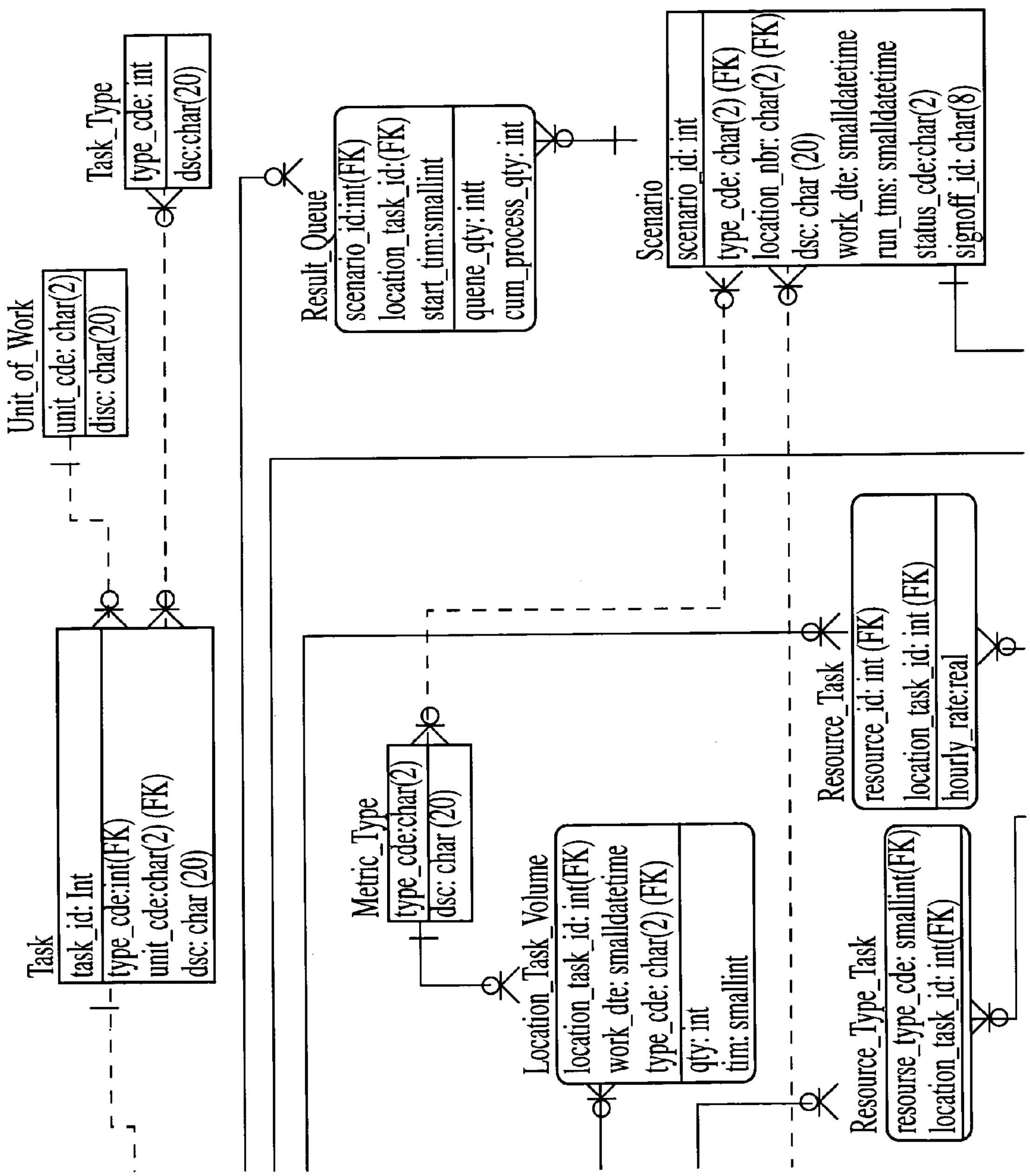
Figures 3, 37:
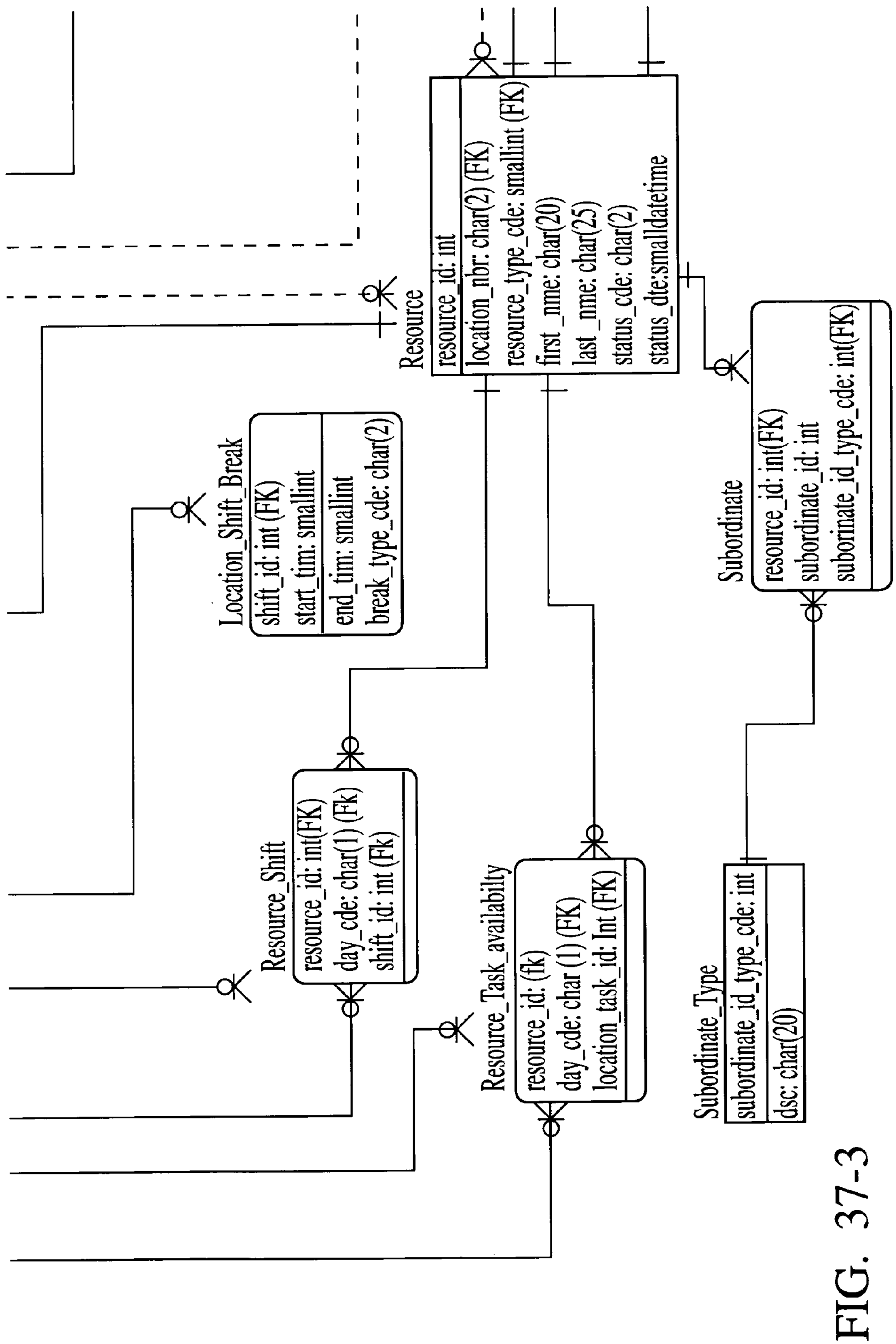
Figures 4, 37:
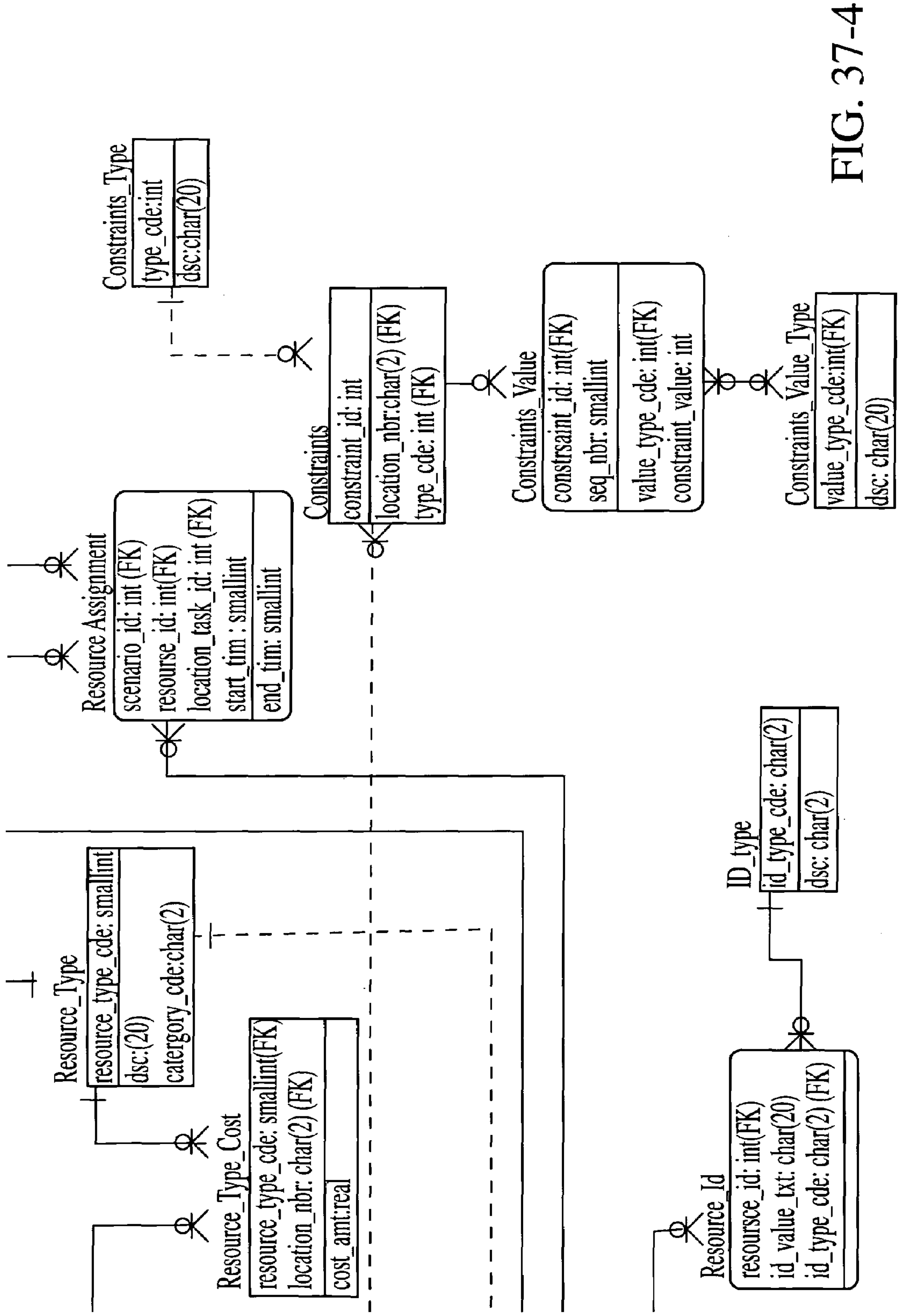

FIGS. 22–26 are block diagrams of simulation models used to simulate different stages of the pharmacy network. FIG. 22 is a block diagram of an example of an overall pharmacy layout used in the present invention. FIG. 23 is a block diagram of an standard protocol management (SPM) sub-model used in a pharmacy operation. FIG. 24 is a block diagram of a filling sub-model used in a pharmacy operation. FIG. 25 is a block diagram of a checking sub-model used in a pharmacy operation. FIG. 26 is a block diagram of a checking sub-model used in a pharmacy operation. FIGS. 27–36 are flowcharts, illustrating additional pharmacy operation examples used in the present invention. FIG. 37 is a data model of the resource allocation model. Appendix B is a data dictionary associated with the data model illustrated in FIG. 37.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of dynamically scheduling an arbitrary number of resources from among a plurality of resources of a work-producing system, wherein the work-producing system comprises a pharmacy, said method comprising the steps of:

(a) in a computer system, sorting, in a predetermined order, available resources by an arbitrary number of tasks from among a plurality of tasks of the work-producing system performable per resource, and rate per task, and determining at least one queue responsive to said sorting, wherein the tasks are subject to an arbitrary number of constraints from among a plurality of constraints of the work-producing system, wherein the rate per task characteristizes the processing of pharmaceutical orders processed in the at least one task for a time period, the at least one task including reviewing a pharmaceutical order, dispensing a pharmaceutical prescription as part of the pharmaceutical order, and verifying the pharmaceutical order; and (b) assigning the available resources to the at least one task from among a plurality of tasks of the work-producing system subject to at least one constraint from among a plurality of constraints of the work-producing system, wherein said sorting step (a), and said assigning step (b) are performed according to a resource allocation model, wherein the resource allocation model includes entities with variable attributes having variable quantities that transform through at least one network of nodes; and wherein each node of the at least one network of nodes includes an associated set of attributes and parameters, the attributes include the resource; each node or at least one network of nodes exists for a pre-determined time period.

2. A method of dynamically scheduling an arbitrary number of resources according to claim 1, further comprising the step of redetermining the at least one queue after assignment of the available resources, and designating the assigned resource unavailable until a predetermined time when the assigned available resources expires.

3. A method of dynamically scheduling an arbitrary number of resources according to claim 1, further comprising the step of incrementing time to time of a next event.

4. A method of dynamically scheduling an arbitrary number of resources according to claim 3, wherein the next event includes at least one of a resource or task that becoming subsequently available, incoming work, a queue reaching zero, and a minimum time in the task.

5. A method of dynamically scheduling an arbitrary number of resources according to claim 1, wherein the at least one task constraint includes maximum resource capacity, defined start and end times, and scheduled down time.

6. A method of dynamically scheduling an arbitrary number of resources according to claim 1, wherein the at least one task constraint includes at least one team assignment constraint defining resource attributes, and the available resources are assigned to the at least one task until the at least one team assignment constraint is satisfied.

7. A method of dynamically scheduling an arbitrary number of resources according to claim 1, wherein said assigning step (b), further comprises the steps of assigning the available resources to the at least one task for a maximum time of task, and removing the at least one task from a resource skill set.

8. A method of dynamically scheduling an arbitrary number of resources according to claim 1, wherein the at least one constraint includes and end of shift constraint, and wherein the available resources are not assigned to the at least one task when the assignment violates the end of shift constraint.

9. A method of dynamically scheduling an arbitrary number of resources according to claim 1, wherein the predetermined order comprises an ascending order.

10. A method of dynamically scheduling an arbitrary number of resources according to claim 1, wherein the attributes are qualitatively defined through at least one of nominal, graphical and symbolic conventions.

11. A method of dynamically scheduling an arbitrary number of resources according to claim 10, wherein the available resources include the attributes of the nodes, and the available resources undergo transformational processes arriving at least one arbitrary state or passing through a series of states that may become the attributes of the resources.

12. A method of dynamically scheduling an arbitrary number of resources according to claim 1, wherein the parameters are specified as at least one of inputs, outputs, capacities, operational processes, functional behaviors, movement logics, and other dynamic parameters.

13. A method of dynamically scheduling an arbitrary number of resources according to claim 1, wherein the resource allocation model stores at least one of historical values, theoretical values, the attributes and constellations of the nodes, and wherein the resource allocation model provides multiple bases of comparison for monitoring, measuring, and evaluating real-time operational data and operational performance for management functions.

14. A method of dynamically scheduling an arbitrary number of resources according to claim 1, wherein the resource allocation model includes significance and performance criteria, associated tableaus and scenarios, and wherein abstract model elements are stored as at least one of the parameters and the attributes, and as at least one of functional, logical, graphical and symbolic forms.

15. A method of dynamically scheduling an arbitrary number of resources according to claim 1, wherein the available resources are characterized by the following information:

person identifier, person name, person type, shift assignment by day of week, task preference, shift name, shift start time, shift end time, lunch start, break 1 start, break 2 start, person type categories, eligible tasks, task name, rate per task, task capacity, task color for Gantt chart, flow percentages between tasks, projected incoming volume by task and time, and start of day queues in each task.

16. A method of dynamically scheduling an arbitrary number of resources according to claim 1, wherein said assigning step (b) assigns the available resources using at least one of the following outputs;

people allocation: number of people assigned to each task for each time period, volume data: number of RX's processed in each task for each time period, queue data: queue length for each task area by time period, and Gantt chart: person task assignment for each time period.

17. A method of dynamically scheduling an arbitrary number of resources according to claim 1, wherein said assigning step (b), further comprises the steps of assigning the available resources to a varying set of tasks having individual rates.

18. A method of dynamically scheduling an arbitrary number of resources according to claim 1, wherein said assigning step (b), further comprises the steps of assigning the available resources to the at least one task with a work flow between tasks following a Markov Chain.

19. A method of dynamically scheduling an arbitrary number of resources according to claim 1, further comprising the step of repeatedly performing said steps (a)–(b) until the end of a predetermined time period is reached.

20. A method of dynamically scheduling an arbitrary number of resources according to claim 1, further comprising the step performing the at least one task responsive to the resource assigned in said assigning step (b).

21. A method of dynamically scheduling an arbitrary number of resources according to claim 1, wherein the filling further includes at least one of: vertical fill, baker fill, prepack fill, front fill, narcotics fill, control fill, and insulin syringe fill.

22. A method of dynamically scheduling an arbitrary number of resources according to claim 1, wherein the tasks further include at least one of: managed care review, Dr. Call verification, eligibility verification, drug utilization review, mail handling, phone refill handling, phone prescription handling, safing, label generation, checking, packing, manifesting, and wanding.

23. A method of dynamically scheduling an arbitrary number of resources according to claim 1, further comprising the step of normalizing the at least one queue by dividing a current task queue by an average rate of the available resources for each task in the current task queue.

24. A method of dynamically scheduling an arbitrary number of resources according to claim 1, wherein the available resources are assigned to the at least one task and associated with a predetermined queue.

25. A method of dynamically scheduling an arbitrary number of resources according to claim 1, wherein the resources include at least one of: humans, machines, and teams.

26. A method of dynamically scheduling an arbitrary number of resources according to claim 1, wherein the tasks include at least one of: filling bottles, packaging bottles, opening pieces of mail, out-bound customer service calls, and in-bound customer service calls.

27. A method of dynamically scheduling an arbitrary number of resources according to claim 1, wherein the constraints include at least one of: physical, logistical, and temporal.

28. A method of dynamically scheduling an arbitrary number of resources from among a plurality of resources of a pharmacy system, said method comprising the steps of:

(a) in a computer system, sorting, in a predetermined order, available resources by a an arbitrary number of tasks from among a plurality of tasks of the pharmacy system performable per resource, and rate per task, and determining at least one queue responsive to said sorting, wherein the tasks are subject to an arbitrary number of constraints from among a plurality of constraints of the pharmacy system, wherein the rate per task characterizes the number of pharmaceutical orders processed in the at least one task for a time period, the at least one task including reviewing a pharmaceutical order, dispensing a pharmaceutical prescription as part of the pharmaceutical order, and verifying the pharmaceutical order;

(b) assigning the available resources to the at least one task from among a plurality of tasks of the pharmacy system subject to at least one constraint from among a plurality of constraints of the pharmacy system; and assigning the available resources to a varying set of tasks having varying individual rates and variable individual demands, wherein the at least one task is performed at least one of manually and automatically, wherein said sorting step (a), and said assigning step (b) are performed according to a resource allocation model, wherein the resource allocation model includes entities with variable attributes having variable quantities that transform through at least one network of nodes; and wherein each node of the at least one network of nodes includes an associated set of attributes and parameters, the attributes include the resource; each node or at least one network of nodes exists for a pre-determined time period.

29. A method of dynamically scheduling an arbitrary number of resources according to claim 28, wherein the available resources are assigned to the at least one task and associated with a predetermined queue.

30. A method of dynamically scheduling an arbitrary number of resources according to claim 29, further comprising the step of normalizing the at least one queue by dividing a current task queue by an average rate of the available resources for each task in the current task queue; wherein the predetermined queue comprises a largest normalized queue.

31. A method of dynamically scheduling an arbitrary number of resources according to claim 28, further comprising the step of redetermining the at least one queue after assignment of the available resources, and designating the assigned resource unavailable until a predetermined time when the assigned available resources expires.

32. A method of dynamically scheduling an arbitrary number of resources according to claim 28, further comprising the step of incrementing time to time of a next event.

33. A method of dynamically scheduling an arbitrary number of resources according to claim 28, wherein the at least one task constraint includes maximum resources capacity, defined start and end times, and scheduled down time.

34. A method of dynamically scheduling an arbitrary number of resources according to claim 28, wherein the at least one task constraint includes at least one learn assignment constraint defining resource attributes, and the available resources are assigned to the at least one task until the at least one team assignment constraint is satisfied.

35. A method of dynamically scheduling an arbitrary number of resources according to claim 28, wherein said assigning step (b), further comprises the steps of assigning the available resources to the at least one task for a maximum time of task, and removing the at least one task from a resource skill set.

36. A method of dynamically scheduling an arbitrary number of resources according to claim 28, wherein the at least constraint includes an end of shift constraint, and wherein the available resources are not assigned to the at least one task when the assignment violates the end of shift constraint.

37. A method of dynamically scheduling an arbitrary number of resources according to claim 28, wherein the predetermined order comprises an ascending order.

38. A method of dynamically scheduling an arbitrary number of resources according to claim 28, wherein the attributes are qualitatively defined through at least one of nominal, graphical and symbolic conventions.

39. A method of dynamically scheduling an arbitrary number of resources according to claim 38, wherein the available resources include the attributes of the nodes, and the available resources undergo transformational processes arriving at least one arbitrary state or passing through a series of states that may become the attributes of the resources.

40. A method of dynamically scheduling an arbitrary number of resources according to claim 38, wherein the parameters are specified as at least one of inputs, outputs, capacities, operational processes, functional behaviors, movement logics, and other dynamic parameters.

41. A method of dynamically scheduling an arbitrary number of resources according to claim 28, wherein the resource allocation model stores at least one of historical values, theoretical values, the attributes and constellations of the nodes, and wherein the resource allocation model provides multiple bases of comparison for monitoring, measuring, and evaluating real-time operational data and operational performance for management functions.

42. A method of dynamically scheduling an arbitrary number of resources according to claim 28, wherein the resource allocation model includes significance and performance criteria, associated tableaus and scenarios, and wherein abstract model elements are stored as at least one of the parameters and the attributes, and as at least one of functional, logical, graphical and symbolic forms.

43. A method of dynamically scheduling an arbitrary number of resources according to claim 28, wherein the available resources are characterized by the following information:

person identifier, person name, person type, shift assignment by day of week, task preference, shift name, shaft start time, shift end time, lunch start time, break 1 start, break 2 start, person type categories, eligible tasks, task name, rate per task, task capacity, task color for Gantt chart, flow percentages between tasks, projected incoming volume by task and time, and start of day queues in each task.

44. A method of dynamically scheduling an arbitrary number of resources according to claim 28, wherein said assigning step (b) assigns the available resources using at least one of the following outputs:

people allocation: number of people assigned to each task for each time period, volume data: number of RX's processed in each task for each time period.

queue data: queue length for each task area by time period, and

Gantt chart: person task assignment for each time period.

45. A method of dynamically scheduling an arbitrary number of resources according to claim 28, wherein said assigning step (b), further comprises the steps of assigning the available resources to the at least one task with a work flow between tasks following a Markov Chain.

46. A method of dynamically scheduling an arbitrary number of resources according to claim 32, wherein the next event includes at least one of: a resource or task that becoming subsequently available, incoming work, a queue reaching zero, and a minimum time in the task.

47. A method of dynamically scheduling an arbitrary number of resources according to claim 28, further comprising the step of repeatedly performing said steps (a)–(b) until the end of a predetermined time period is reached.

48. A method of dynamically scheduling an arbitrary number of resources according to claim 28, further comprising the step performing the at least one task responsive to the resource assigned in said assigning step (b).

49. A method of dynamically scheduling an arbitrary number of resources according to claim 28, wherein the filling further includes at least one of: vertical fill, baker fill, prepack fill, front fill, narcotics fill, control fill, and insulin syringe fill.

50. A method of dynamically scheduling an arbitrary number of resources according to claim 28, wherein the tasks further include at least one of: managed care review, Dr. call verification, eligibility verification, drug utilization review, mail handling, phone refill handling, phone prescription handling, safing, label generation, checking, packing, manifesting, and wanding.

51. A method of dynamically scheduling an arbitrary number of resources according to claim 28, further comprising the step of normalizing the at least one queue by dividing a current task queue by an average rate of the available resources for each task in the current task queue.

52. A method of dynamically scheduling an arbitrary number of resources according to claim 28, wherein the available resources are assigned to the at least one task and associated with a predetermined queue.

53. A method of dynamically scheduling an arbitrary number of resources from among a plurality of resources of a pharmacy system, said method comprising the steps of:

(a) in a computer system, sorting, in a predetermined order, available resources by a an arbitrary number of tasks from a plurality of tasks of the pharmacy system performable per resource, and rate per task, and determining at least one queue responsive to said sorting, wherein the tasks are subject to an arbitrary number of constraints from among a plurality of constraints of the pharmacy system, wherein the rate per task characterizes the number of pharmaceutical orders processed in the at least one task for a time period, the at least one task including reviewing a pharmaceutical order, dispensing a pharmaceutical prescription as part of the pharmaceutical order, and verifying the pharmaceutical order.

(b) assigning the available resources to at least one task from among a plurality of tasks of the pharmacy system with a predetermined queue subject to at least one constraint from among a plurality of constraints of the pharmacy system; and (c) dynamically re-allocating the available resources at the end of a real time period, in a same day, for at least one task, including: repeating steps (a) and (b), redetermining the at least one queue after assignment of the available resources, and designating the assigned resource as unavailable until a predetermined real time when the assigned available resource expires, wherein said sorting step (a), and said assigning step (b) are performed according to a resource allocation model, wherein the resource allocation model includes entities with variable attributes having variable quantities that transform through at least one network of nodes; and wherein each node of the at least one network of nodes includes an associated set of attributes and parameters, the attributes include the resource; each node or at least one network of nodes exists for a pre-determined time period.

54. A method of dynamically scheduling an arbitrary number of resources according to claim 53, further comprising the step of redetermining the at least one queue after assignment of the available resources, and designating the assigned resource unavailable until a predetermined time when the assigned available resources expires.

55. A method of dynamically scheduling an arbitrary number of resources according to claim 53, further comprising the step of incrementing time to time of a next event.

56. A method of dynamically scheduling an arbitrary number of resources according to claim 55, wherein the next event includes at least one of: a resource or task that becoming subsequently available, incoming work, a queue reaching zero, and a minimum time in the task.

57. A method of dynamically scheduling an arbitrary number of resources according to claim 53, wherein the at least one task constraint includes maximum resource capacity, defined start and end times, and scheduled down time.

58. A method of dynamically scheduling an arbitrary number of resources according to claim 53, wherein the at least one task constraint includes at least one team assignment constraint defining resource attributes, and the available resources are assigned to the at least one task until the at least one team assignment constraint is satisfied.

59. A method of dynamically scheduling an arbitrary number of resources according to claim 53, wherein said assigning step (b), further comprises the steps of assigning the available resources to the at least one task for a maximum time of task, and removing the at least one task from a resource skill set.

60. A method of dynamically scheduling an arbitrary number of resources according to claim 53, wherein the at least one task constraint includes an end of shift constraint, and wherein the available resources are not assigned to the at least one task when the assignment violates the end of shift constraint.

61. A method of dynamically scheduling an arbitrary number of resources according to claim 53, wherein the predetermined order comprises an ascending order.

62. A method of dynamically scheduling an arbitrary number of resources according to claim 53, wherein the attributes are qualitatively defined through at least one of nominal, graphical and symbolic conventions.

63. A method of dynamically scheduling an arbitrary number of resources according to claim 62, wherein the available resources include the attributes of the nodes, and the available resources undergo transformational processes arriving at least one arbitrary state or passing through a series of states that may become the attributes of the resources.

64. A method of dynamically scheduling an arbitrary number of resources according to claim 53, wherein the parameters are specified as at least one of inputs, outputs, capacities, operational processes, functional behaviors, movement logics, and other dynamic parameters.

65. A method of dynamically scheduling an arbitrary number of resources according to claim 53, wherein the resource allocation model stores at least one of historical values, theoretical values, the attributes and constellations of the nodes, and wherein the resource allocation model provides multiple bases of comparison for monitoring, measuring, and evaluating real-time operational data and operational performance for management functions.

66. A method of dynamically scheduling an arbitrary number of resources according to claim 53, wherein the resource allocation model includes significance and performance criteria, associated tableaus and scenarios, and wherein abstract model elements are stored as at least one of the parameters and the attributes, and as at least one of functional, logical, graphical and symbolic forms.

67. A method of dynamically scheduling an arbitrary number of resources according to claim 53, wherein the available resources are characterized by the following information:

person identifier, person name, person type, shift assignment by day of week, task preference, shift name, shift start time, shift end time, lunch start, break 1 start, break 2 start, person type categories, eligible tasks, task name, rate per task, task capacity, task color for Gantt chart, flow percentages between tasks, projected incoming volume by task and time, and start of day queues in each task.

68. A method of dynamically scheduling an arbitrary number of resources according to claim 53, wherein said assigning step (b) assigns the available resources using at least one of the following outputs:

people allocation: number of people assigned to each task for each time period, volume data: number of RX's processed in each task for each time period, queue data: queue length for each task area by time period, and Gantt chart: person task assignment for each time period.

69. A method of dynamically scheduling an arbitrary number of resources according to claim 53, wherein said assigning step (b), further comprises the steps of assigning the available resources to a varying set of tasks having varying individual rates.

70. A method of dynamically scheduling an arbitrary number of resources according to claim 53, wherein said assigning step (b), further comprises the steps of assigning the available resources to the at least one task with a work flow between tasks following a Markov Chain.

71. A method of dynamically scheduling an arbitrary number of resources according to claim 53, further comprising the step of repeatedly performing said steps (a)–(b) until the end of a predetermined time period is reached.

72. A method of dynamically scheduling an arbitrary number of resources according to claim 53, further comprising the step of performing the at least one task responsive to the resource assigned in said assigning step (b).

73. A method of dynamically scheduling an arbitrary number of resources according to claim 53, wherein the filling further includes at least one of: vertical fill, baker fill, prepack fill, front fill, narcotics fill, control fill, and insulin syringe fill.

74. A method of dynamically scheduling an arbitrary number of resources according to claim 53, wherein the tasks further include at least one of: managed care review, Dr. call verification, eligibility verification, drug utilization review, mail handling, phone refill handling, phone prescription handling, safing, label generation, checking, packing, manifesting, and wanding.

75. A method of dynamically scheduling an arbitrary number of resources according to claim 53, further comprising the step of normalizing the at least one queue by dividing a current task queue by an average rate of the available resources for each task in the current task queue.

76. A method of dynamically scheduling an arbitrary number of resources according to claim 53, wherein the available resources are assigned to the at least one task and associated with a predetermined queue.

* * * * *